US007553922B2

(12) United States Patent
Kenmoku et al.

(10) Patent No.: US 7,553,922 B2
(45) Date of Patent: Jun. 30, 2009

(54) POLYHYDROXYALKANOATE HAVING ESTER GROUP, CARBOXYL GROUP, AND SULFONIC GROUP, AND METHOD OF PRODUCING THE SAME

(75) Inventors: Takashi Kenmoku, Fujisawa (JP); Chieko Mihara, Isehara (JP); Tatsuki Fukui, Yokohama (JP); Ako Kusakari, Tokyo (JP); Tetsuya Yano, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 433 days.

(21) Appl. No.: 10/579,805

(22) PCT Filed: Jun. 9, 2005

(86) PCT No.: PCT/JP2005/010997

§ 371 (c)(1),
(2), (4) Date: May 18, 2006

(87) PCT Pub. No.: WO2005/121205

PCT Pub. Date: Dec. 22, 2005

(65) Prior Publication Data

US 2007/0155912 A1 Jul. 5, 2007

(30) Foreign Application Priority Data

Jun. 11, 2004 (JP) ............................ 2004-174783
Jun. 8, 2005 (JP) ............................ 2005-168916

(51) Int. Cl.
*C08G 12/34* (2006.01)

(52) U.S. Cl. ...................................................... 528/256

(58) Field of Classification Search .................. 528/256
See application file for complete search history.

(56) References Cited

U.S. PATENT DOCUMENTS

| | | | | |
|---|---|---|---|---|
| 4,265,247 | A | 5/1981 | Lenz et al. | |
| 5,135,859 | A | 8/1992 | Witholt et al. | |
| 5,292,860 | A | 3/1994 | Shiotani et al. | |
| 5,334,698 | A | 8/1994 | Witholt et al. | |
| 6,083,729 | A * | 7/2000 | Martin et al. | 435/135 |
| 6,635,782 | B2 | 10/2003 | Honma et al. | |
| 6,649,380 | B1 | 11/2003 | Yano et al. | |
| 6,808,907 | B2 | 10/2004 | Honma et al. | |
| 2001/0029039 | A1 | 10/2001 | Honma et al. | |
| 2004/0081906 | A1 | 4/2004 | Kenmoku et al. | 430/108.4 |
| 2005/0054063 | A1 | 3/2005 | Honma et al. | |
| 2005/0196521 | A1 | 9/2005 | Kozaki et al. | |
| 2005/0260514 | A1 | 11/2005 | Mihara et al. | 430/108.4 |
| 2006/0247414 | A1 | 11/2006 | Kenmoku et al. | |
| 2007/0073006 | A1 | 3/2007 | Kenmoku et al. | |
| 2007/0117937 | A1 | 5/2007 | Kenmoku et al. | |

FOREIGN PATENT DOCUMENTS

| | | | |
|---|---|---|---|
| EP | 1 336 635 | A1 | 8/2003 |
| JP | 2-3415 | A | 1/1990 |
| JP | 5-93049 | A | 4/1993 |
| JP | 7-13452 | B2 | 2/1995 |
| JP | 7-265065 | A | 10/1995 |
| JP | 8-19227 | B2 | 2/1996 |
| JP | 2642937 | B2 | 5/1997 |
| JP | 2000-166587 | A | 6/2000 |
| JP | 2001-288256 | A | 10/2001 |
| JP | 2002-306190 | A | 10/2002 |
| JP | 2003-319792 | A | 11/2003 |
| WO | WO 2004/038512 | A1 | 5/2004 |
| WO | WO 2004/044213 | A1 | 5/2004 |
| WO | WO 2004/061530 | A1 | 7/2004 |
| WO | 2005/121204 | A2 | 12/2005 |

OTHER PUBLICATIONS

Mikael Trollsås et al., "Hydrophilic Aliphatic Polyesters: Design, Synthesis, and Ring-Opening Polymerization of Functional Cyclic Esters," 33 Macromol. 4619-27 (2000).

S. Ponsart et al., "A Novel Route to Poly(ϵ-caprolactone)-Based Copolymers via Anionic Derivatization," 1 Biomolecules 275-81 (2000).

Benjamin Saulnier et al., "Lactic Acid-Based Functionalized Polymers via Copolymerization and Chemical Modification," 4 Macromol. Biosci. 232-37 (2004).

Bryan Parrish et al., "Functional Polyesters by Ring-Opening Polymerization of α-ally(δ-valerolactone)," 87 Polymer. Mater.: Sci. & Eng. 254-55 (2002).

C.P. Radano et al., "Synthesis of Novel Biodegradable Copolyesters Using Olefin Metathesis," 43(2) Polymer Reprints 727-28 (2002).

Tetsuji Yamaoka et al., "Synthesis and Properties of Malic Acid-Containing Functional Polymers," 25 Intl. J. Biol. Macromol. 265-71 (1999).

Katharina Fritzsche et al., "Bacterial Polyesters Containing Branched Poly(β-hydroxyalkanoate) Units," 12 Int. J. Biol. Macromol. 92-101 (1990).

* cited by examiner

*Primary Examiner*—Randy Gulakowski
*Assistant Examiner*—Shane Fang
(74) *Attorney, Agent, or Firm*—Fitzpatrick, Cella, Harper & Scinto

(57) ABSTRACT

A novel polyhydroxyalkanoate having a reactive functional group in a molecule and a method of producing the same; and a novel polyhydroxyalkanoate having a new function obtained by chemically modifying the polyhydroxyalkanoate having a reactive functional group and a method of producing the same. A polyhydroxyalkanoate containing units having a carboxyl group, an amide group, and a sulfonic group in a molecule is induced.

6 Claims, No Drawings

POLYHYDROXYALKANOATE HAVING ESTER GROUP, CARBOXYL GROUP, AND SULFONIC GROUP, AND METHOD OF PRODUCING THE SAME

TECHNICAL FIELD

The present invention relates to a novel polyhydroxyalkanoate and a method of producing the same.

BACKGROUND ART

Biodegradable polymer materials are used in a wide variety of applications, including medical materials, drug delivery systems, and environmentally compatible materials. In recent years, in addition to those applications, there is a need for the biodegradable polymer materials with new functions, and hence, various studies have been conducted. In particular, the introduction of a chemically modifiable functional group into a molecule of a polyhydroxyalkanoate typified by polylactic acid has been examined. There has been reported a compound into which a carboxyl group or a vinyl group is introduced. For example, polymalic acid has been known as a polyhydroxyalkanoate having a carboxyl group at a side chain thereof. An α-type represented by the chemical formula (39) and a β-type represented by the chemical formula (40) have been known as polymers of polymalic acid depending on the form of a polymer.

(39)

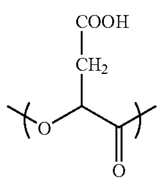

(40)

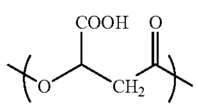

Of those, a polymer obtained by ring-opening polymerization of a benzyl ester of β-malolactone represented by the chemical formula (41) is disclosed in U.S. Pat. No. 4,265,247 (Patent Document 1) as β-type polymalic acid or a copolymer thereof.

(41)

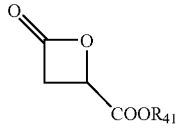

($R_{41}$: benzyl group.)

In addition, a polymer obtained by copolymerization of a six-membered ring diester monomer represented by the chemical formula (42) and a glicolide or lactide as a cyclic diester or a lactone as an intramolecular ring closure reaction ester of ω-hydroxycarboxylic acid is disclosed in JP-A 02-3415 (Patent Document 2) as a copolymer containing any one of other hydroxyalkanoic acids typified by α-type polymalic acid-glycolic acid copolymer and glycolic acid.

(42)

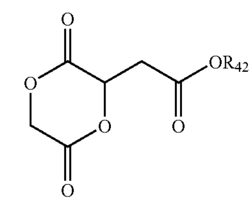

($R_{42}$ represents a lower alkyl group such as a methyl group, an ethyl group, an n-propyl group, an isopropyl group, or a t-butyl group, or a benzyl group.)

Macromolecules 2000, 33 (13), 4619-4627 (Non-Patent Document 1) discloses that 7-oxo-4-oxepanonecarboxylate is subjected to ring-opening polymerization to produce a polymer having an ester group at a side chain thereof, and the polymer is further subjected to hydrogenolysis to produce a polymer having a carboxylic acid at a side chain thereof as a polyhydroxyalkanoate having a carboxyl group at a side chain thereof. Biomacromolecules 2000, 1, 275 (Non-Patent Document 2) discloses a polymer in which a benzyloxycarbonyl group is introduced into a methylene group at α-position of a carbonyl group in the main chain of poly(ε-caprolactone), the polymer being obtained by: allowing lithium diisopropylamide to react with poly(ε-caprolactone); and allowing the resultant to react with benzyl chloroformate. Macromolecular Bioscience 2004, 4, 232 (Non-Patent Document 3) discloses a polymer in which a (benzyloxycarbonyl) methyl group is introduced into a methylene group at α-position of a carbonyl group in the main chain of polylactic acid, the polymer being obtained by: allowing lithium diisopropylamide to react with polylactic acid; and allowing the resultant to react with benzyl bromoacetate.

Polymeric Materials Science & Engineering 2002, 87, 254 (Non-Patent Document 4) discloses, as a polyhydroxyalkanoate having a vinyl group at a side chain thereof, a polymer obtained by ring-opening polymerization of α-allyl(δ-valerolactone). Similarly, Polymer Preprints 2002, 43 (2), 727 (Non-Patent Document 5) discloses, as a polyhydroxyalkanoate having a vinyl group at a side chain thereof, a polymer obtained by ring-opening polymerization of 3,6-diallyl-1,4-dioxane-2,5-dione as a six-membered ring diester monomer.

There has been reported a polymer having a new function into which a structure providing functional properties for a polyhydroxyalkanoate into which a chemically modifiable functional group is introduced as described above is introduced. International Journal of Biological Macromolecules 25 (1999) 265 (Non-Patent Document 6) discloses the following. A copolymer of α-type malic acid and glycolic acid is obtained by ring-opening polymerization of a cyclic dimer of α-type malic acid and glycolic acid, and the resultant polymer is deprotected to obtain a polyester having a carboxyl group at a side chain thereof. Tripeptide is chemically modified to the carboxyl group at the side chain, and the resultant polymer is evaluated for cell adhesion. At this time, a good result is obtained.

DISCLOSURE OF THE INVENTION

It may be possible that new functional properties can be provided by introducing a unit having a carboxyl group that is a reactive functional group, in a molecule as described above; and chemically modifying the reactive functional group. However, there have been a small number of reports concerning it. In view of the above, the present invention provides: a novel polyhydroxyalkanoate having a reactive functional group in a molecule and a method of producing the same; and a novel polyhydroxyalkanoate having a new function obtained by chemically modifying the polyhydroxyalkanoate having a reactive functional group and a method of producing the same.

The inventors of the present invention have made extensive studies with a view to developing a novel polyhydroxyalkanoate having a reactive functional group in a molecule and a novel polyhydroxyalkanoate having a new function obtained by chemically modifying the polyhydroxyalkanoate having a reactive functional group, thereby completing the invention described below.

The polyhydroxyalkanoate according to the present invention includes the following.

(1) A polyhydroxyalkanoate, comprising one or more units each represented by the chemical formula (1).

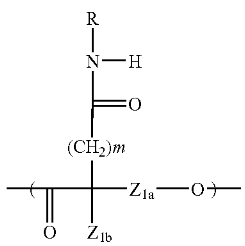
(1)

(In the formula, R represents $-A_1-SO_2R_1$. $R_1$ represents OH, a halogen atom, ONa, OK, or $OR_{1a}$. $R_{1a}$ and $A_1$ each independently represent a group having a substituted or unsubstituted aliphatic hydrocarbon structure, a substituted or unsubstituted aromatic ring structure, or a substituted or unsubstituted heterocyclic structure. $Z_{1a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{1b}$ represents a hydrogen atom, a linear or branched alkyl group, aryl group, or aralkyl group which may be substituted by an aryl group. In addition, m represents an integer selected from 0 to 8. When multiple units exist, R, $R_1$, $R_{1a}$, $A_1$, $Z_{1a}$, $Z_{1b}$, and m each independently have the above meaning for each unit.)

(2) A polyhydroxyalkanoate, comprising one or more units each represented by the chemical formula (5).

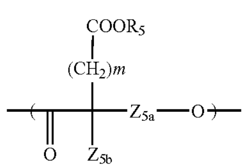
(5)

(In the formula, $R_5$ represents hydrogen, a group for forming a salt, or $R_{5a}$. $R_{5a}$ represents a linear or branched alkyl or aralkyl group having 1 to 12 carbon atoms, or a group having a saccharide. m represents an integer selected from 0 to 8. $Z_{5a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{5b}$ represents a hydrogen atom, or a linear or branched alkyl group, aryl group, or aralkyl group which may be substituted by an aryl group. When multiple units exist, $R_5$, $R_{5a}$, $Z_{5a}$, $Z_{5b}$, and m each independently have the above meaning for each unit.)

On the other hand, the method of producing polyhydroxyalkanoate according to the present invention includes the following.

(A) A method of producing a polyhydroxyalkanoate containing a unit represented by the chemical formula (1), characterized by comprising the step of subjecting a polyhydroxyalkanoate containing a unit represented by the chemical formula (29) and at least one kind of amine compound represented by the chemical formula (30) to a condensation reaction.

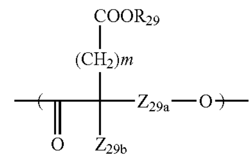
(29)

(In the formula, $R_{29}$ represents hydrogen or a group for forming a salt. m represents an integer selected from 0 to 8. $Z_{29a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{5b}$ represents a hydrogen atom, or a linear or branched alkyl group, aryl group, or aralkyl group which may be substituted by an aryl group. When multiple units exist, $R_{29}$, $Z_{29a}$, $Z_{29b}$, and m each independently have the above meaning for each unit.)

$$H_2N\text{-}A\text{-}SO_2R_{30} \quad (30)$$

(In the formula, $R_{30}$ represents OH, a halogen atom, ONa, OK, or $OR_{30a}$. $R_{30a}$ and $A_3$ each independently represent a group having a substituted or unsubstituted aliphatic hydrocarbon structure, a substituted or unsubstituted aromatic ring structure, or a substituted or unsubstituted heterocyclic structure. When multiple units exist, $R_{30}$, $R_{30a}$, and $A_3$, and m each independently have the above meaning for each unit.)

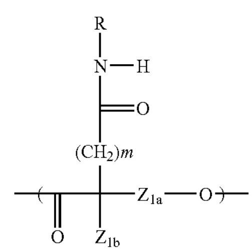
(1)

(In the formula, R represents $-A_1-SO_2R_1$. $R_1$ represents OH, a halogen atom, ONa, OK, or $OR_{1a}$. $R_{1a}$ and $A_1$ each independently represent a group having a substituted or unsubstituted aliphatic hydrocarbon structure, a substituted or unsubstituted aromatic ring structure, or a substituted or unsubstituted heterocyclic structure. $Z_{1a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{1b}$ represents a hydrogen atom, or a linear or branched alkyl group, aryl group, or aralkyl group which may be substituted by an aryl group. In addition, m represents an integer selected from 0 to 8. When multiple units exist, R, $R_1$, $R_{1a}$, $A_1$, $Z_{1a}$, $Z_{1b}$, and m each independently have the above meaning for each unit.)

(B) A method of producing a polyhydroxyalkanoate containing a unit represented by the chemical formula (32), characterized by comprising the step of hydrolyzing a polyhydroxyalkanoate containing a unit represented by the chemical formula (31) in the presence of an acid or an alkali, or the step of subjecting the polyhydroxyalkanoate to hydrogenolysis including catalytic reduction.

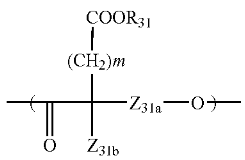
(31)

(In the formula, $R_{31}$ represents a linear or branched alkyl or aralkyl group having 1 to 12 carbon atoms. $Z_{31a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{31b}$ represents a hydrogen atom, or a linear or branched alkyl group, aryl group, or aralkyl group which may be substituted by an aryl group. In addition, m represents an integer selected from 0 to 8. When multiple units exist, $R_{31}$, $Z_{31a}$, $Z_{31b}$, and m each independently have the above meaning for each unit.)

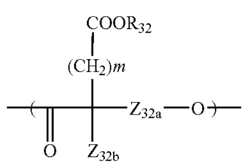
(32)

(In the formula, $R_{32}$ represents hydrogen or a group for forming a salt. $Z_{32a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{32b}$ represents a hydrogen atom, or a linear or branched alkyl group, aryl group, or aralkyl group which may be substituted by an aryl group. m represents an integer selected from 0 to 8. When multiple units exist, $R_{32}$, $Z_{32a}$, $Z_{32b}$, and m each independently have the above meaning for each unit.)

(C) A method of producing a polyhydroxyalkanoate containing a unit represented by the chemical formula (35), characterized by including the steps of: allowing a polyhydroxyalkanoate containing a unit represented by the chemical formula (33) to react with a base; and allowing the compound obtained in the foregoing step to react with a compound represented by the chemical formula (34).

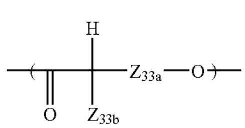
(33)

(In the formula, $Z_{33a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{33b}$ represents a hydrogen atom, or a linear or branched alkyl group, aryl group, or aralkyl group which may be substituted by an aryl group. When multiple units exist, $Z_{33a}$ and $Z_{33b}$ each independently have the above meaning for each unit.)

$$X(CH_2)mCOOR_{34} \quad (34)$$

(In the formula, m represents an integer selected from 0 to 8. X represents a halogen atom. $R_{34}$ represents a linear or branched alkyl or aralkyl group having 1 to 12 carbon atoms.)

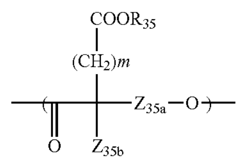
(35)

(In the formula, $R_{35}$ represents a linear or branched alkyl or aralkyl group having 1 to 12 carbon atoms. $Z_{35a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{35b}$ represents a hydrogen atom, or a linear or branched alkyl group, aryl group, or aralkyl group which may be substituted by an aryl group. In addition, m represents an integer selected from 0 to 8. When multiple units exist, $R_{35}$, $Z_{35a}$, $Z_{35b}$, and m each independently have the above meaning for each unit.)

(D) A method of producing a polyhydroxyalkanoate containing a unit represented by the chemical formula (38), characterized by including the steps of: allowing a polyhydroxyalkanoate containing a unit represented by the chemical formula (36) to react with a base; and allowing the compound obtained in the foregoing step to react with a compound represented by the chemical formula (37).

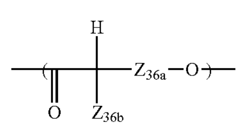
(36)

(In the formula, $Z_{36a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{36b}$ represents a hydrogen atom, or a linear or branched alkyl group, aryl group, or aralkyl group which may be substituted by an aryl group. When multiple units exist, $Z_{36a}$ and $Z_{36b}$ each independently have the above meaning for each unit.)

(37)

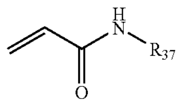

(In the formula, $R_{37}$ represents $-A_{37}-SO_2R_{37a}$. $R_{37a}$ represents OH, a halogen atom, ONa, OK, or $OR_{37b}$. $R_{37b}$ and $A_{37}$ are each independently selected from groups each having a substituted or unsubstituted aliphatic hydrocarbon structure, a substituted or unsubstituted aromatic ring structure, or a substituted or unsubstituted heterocyclic structure. When multiple units exist, $R_{37}$, $R_{37a}$, $R_{37b}$, and $A_{37}$ each independently have the above meaning for each unit.)

(38)

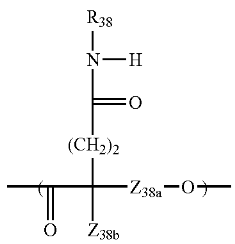

(In the formula, $R_{38}$ represents $-A_{38}-SO_2R_{38a}$. $R_{38a}$ represents OH, a halogen atom, ONa, OK, or $OR_{38b}$. $R_{38b}$ and $A_{38}$ each independently represent a group having a substituted or unsubstituted aliphatic hydrocarbon structure, a substituted or unsubstituted aromatic ring structure, or a substituted or unsubstituted heterocyclic structure. $Z_{38a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{38b}$ represents a hydrogen atom, or a linear or branched alkyl group, aryl group, or aralkyl group which may be substituted by an aryl group. When multiple units exist, $R_{38}$, $R_{38a}$, $R_{38b}$, $A_{38}$, $Z_{38a}$, and $Z_{38b}$ each independently have the above meaning for each unit.)

BEST MODE FOR CARRYING OUT THE INVENTION

Hereinafter, the contents of the present invention will be described. A polyhydroxyalkanoate containing a unit represented by the chemical formula (1) as a target in the present invention can be produced by a reaction between a polyhydroxyalkanoate containing a unit represented by the chemical formula (29) to be used as a starting material and at least one kind of aminosulfonic acid compound represented by the chemical formula (30).

(29)

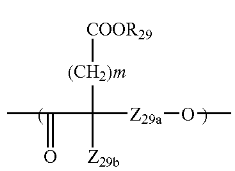

(In the formula, $R_{29}$ represents hydrogen or a group for forming a salt. m represents an integer selected from 0 to 8. $Z_{29a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{29b}$ represents a hydrogen atom, or a linear or branched alkyl group, aryl group, or aralkyl group which may be substituted by an aryl group. When multiple units exist, $R_{29}$, $Z_{29a}$, $Z_{29b}$, and m each independently have the above meaning for each unit.)

$$H_2N-A_3-SO_2R_{30} \quad (30)$$

(In the formula, $R_{30}$ represents OH, a halogen atom, ONa, OK, or $OR_{30a}$. $R_{30a}$ and $A_3$ are each independently selected from groups each having a substituted or unsubstituted aliphatic hydrocarbon structure, a substituted or unsubstituted aromatic ring structure, or a substituted or unsubstituted heterocyclic structure ($R_{30a}$ represents a monovalent group having a structure selected from them, and $A_3$ represents a divalent group having a structure selected from them). When multiple units exist, $R_{30}$, $R_{30a}$, and $A_3$ each independently have the above meaning for each unit.)

More specifically, in the compound represented by the chemical formula (29) to be used in the present invention, $Z_{29}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. The linear alkylene chain structure represented by $Z_{29}$ is preferably selected from the following (A) to (D).

(A) When the linear alkylene chain has 1 carbon atom, in the linear alkylene chain structure represented by the chemical formula (43), one of $Z_{43c}$ and $Z_{43d}$ represents a linear or branched alkyl group, or an alkyl group containing a residue having any one of a phenyl structure, a thienyl structure, and a cyclohexyl structure at a terminal thereof.

(43)

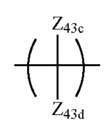

(B) When the linear alkylene chain has 2 carbon atoms, in the linear alkylene chain structure represented by the chemical formula (44), one of $Z_{44c}$, $Z_{44d}$, $Z_{44e}$, and $Z_{44f}$ represents a linear or branched alkyl group, or an alkyl group containing a residue having any one of a phenyl structure, a thienyl structure, and a cyclohexyl structure at a terminal thereof.

(44)

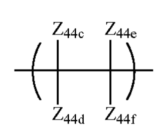

(C) When the linear alkylene chain has 3 carbon atoms, in the linear alkylene chain structure represented by the chemical formula (45), one of $Z_{45c}$, $Z_{45d}$, $Z_{45e}$, $Z_{45f}$, $Z_{45g}$, and $Z_{45h}$ represents a linear or branched alkyl group, or an alkyl group containing a residue having any one of a phenyl structure, a thienyl structure, and a cyclohexyl structure at a terminal thereof.

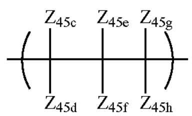

(45)

(D) When the linear alkylene chain has 4 carbon atoms, in the linear alkylene chain structure represented by the chemical formula (46), one of $Z_{46c}$, $Z_{46d}$, $Z_{46e}$, $Z_{46f}$, $Z_{46g}$, $Z_{46h}$, $Z_{46i}$, and $Z_{46h}$ represents a linear or branched alkyl group, or an alkyl group containing a residue having any one of a phenyl structure, a thienyl structure, and a cyclohexyl structure at a terminal thereof.

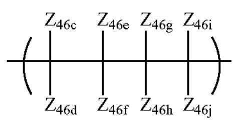

(46)

When a substituent selected from $Z_{43c}$, $Z_{43d}$, $Z_{44c}$, $Z_{44d}$, $Z_{44e}$, $Z_{44f}$, $Z_{45c}$, $Z_{45d}$, $Z_{45e}$, $Z_{45f}$, $Z_{45g}$, $Z_{45h}$, $Z_{46c}$, $Z_{46d}$, $Z_{46e}$, $Z_{46f}$, $Z_{46g}$, $Z_{46h}$, $Z_{46i}$, and $Z_{46j}$ described in the chemical formulae (43), (44), (45), and (46) represents a linear or branched alkyl group, or an alkyl group containing a residue having any one of a phenyl structure, a thienyl structure, and a cyclohexyl structure at a terminal thereof, the substituent is more preferably selected from substituents represented by the chemical formulae (14), (15), (16), and (17).

$$—(CH_2)k_{14}—CH_3 \quad (14)$$

(In the formula, $k_{14}$ represents an integer selected from 0 to 8. When multiple units exist, $k_{14}$'s each independently have the above meaning for each unit.)

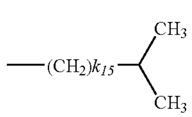

(15)

(In the formula, $k_{15}$ represents an integer selected from 0 to 7. When multiple units exist, $k_{15}$'s each independently have the above meaning for each unit.)

$$—(CH_2)k_{16}—R_{16} \quad (16)$$

(In the formula, $k_{16}$ represents an integer selected from 1 to 8. $R_{16}$ represents a substituent containing a residue having any one of a phenyl structure and a thienyl structure. When multiple units exist, $k_{15}$ and $R_{16}$ each independently have the above meaning for each unit.)

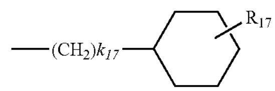

(17)

(In the formula, $R_{17}$ represents a substituent to a cyclohexyl group selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group. $k_{17}$ represents an integer selected from 0 to 8. When multiple units exist, $k_{17}$ and $R_{17}$ each independently have the above meaning for each unit.)

In addition, $R_{16}$ in the chemical formula (16), that is, a residue having any one of a phenyl structure and a thienyl structure is selected from the group of residues represented by the chemical formulae (18), (19), (20), (21), (22), (23), (24), (25), (26), (27), and (28).

Here, the chemical formula (18) represents a group of unsubstituted or substituted phenyl groups.

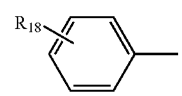

(18)

(In the formula, $R_{18}$ represents a substituent to an aromatic ring selected from an H atom, a halogen atom, a CN group, an $NO_2$ group, a $CH_3$ group, a $C_2H_5$ group, a $C_3H_7$ group, a $CH{=}CH_2$ group, $COOR_{18a}$ ($R_{18a}$ represents an H atom, an Na atom, or a K atom.), a $CF_3$ group, a $C_2F_5$ group, and a $C_3F_7$ group. When multiple units exist, $R_{18}$'s may be different for each unit.)

The chemical formula (19) represents a group of unsubstituted or substituted phenoxy groups.

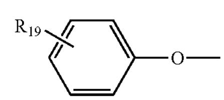

(19)

(In the formula, $R_{19}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group. When multiple units exist, $R_{19}$'s may be different for each unit.)

The chemical formula (20) represents a group of unsubstituted or substituted benzoyl groups.

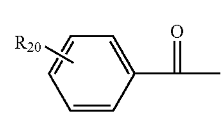

(20)

(In the formula, $R_{20}$ represents a substituent to an aromatic ring selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group. When multiple units exist, $R_{20}$'s may be different for each unit.)

The chemical formula (21) represents a group of unsubstituted or substituted phenylsulfanyl groups.

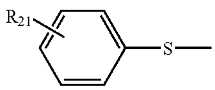

(21)

(In the formula, $R_2$ , represents a substituent to an aromatic ring selected from an H atom, a halogen atom, a CN group, an $NO_2$ group, $COOR_{21a}$, $SO_2R_{21b}$ ($R_{21a}$ represents H, Na, K, $CH_3$, or $C_2H_5$, and $R_{21b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{21}$'s may be different for each unit.)

The chemical formula (22) represents a group of unsubstituted or substituted (phenylmethyl)sulfanyl groups.

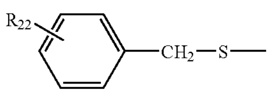

(22)

(In the formula, $R_{22}$ represents a substituent to an aromatic ring selected from an H atom, a halogen atom, a CN group, an $NO_2$ group, $COOR_{22a}$, $SO_2R_{22b}$ ($R_{22a}$ represents H, Na, K, $CH_3$, or $C_2H_5$, and $R_{22b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{22}$'s may be different for each unit.)

The chemical formula (23) represents a 2-thienyl group.

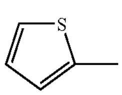

(23)

The chemical formula (24) represents a 2-thienylsulfanyl group.

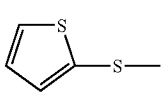

(24)

The chemical formula (25) represents a 2-thienylcarbonyl group.

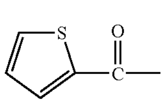

(25)

The chemical formula (26) represents a group of unsubstituted or substituted phenylsulfinyl groups.

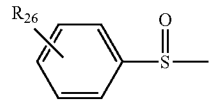

(26)

(In the formula, $R_{26}$ represents a substituent to an aromatic ring selected from an H atom, a halogen atom, a CN group, an $NO_2$ group, $COOR_{26a}$, $SO_2R_{26b}$ ($R_{26a}$ represents H, Na, K, $CH_3$, or $C_2H_5$, and $R_{26b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{26}$'s may be different for each unit.)

The chemical formula (27) represents a group of unsubstituted or substituted phenylsulfonyl groups.

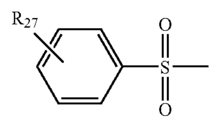

(27)

(In the formula, $R_{27}$ represents a substituent to an aromatic ring selected from an H atom, a halogen atom, a CN group, an $NO_2$ group, $COOR_{27a}$, $SO_2R_{27b}$ ($R_{27a}$ represents H, Na, K, $CH_3$, or $C_2H_5$, and $R_{27b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{27}$'s may be different for each unit.)

The chemical formula (28) represents a (phenylmethyl) oxy group.

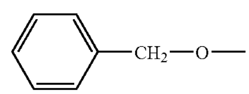

(28)

On the other hand, in the compound represented by the chemical formula (30) to be used in the present invention, $R_{30}$ represents OH, a halogen atom, ONa, OK, or $OR_{30}$. $R_{30}$ represents a linear or branched alkyl group having 1 to 8 carbon atoms, or a substituted or unsubstituted phenyl group.

$A_3$ represents a liner or branched and substituted or unsubstituted alkylene group having 1 to 8 carbon atoms, a substituted or unsubstituted phenylene group, a substituted or unsubstituted naphthalene group, or a substituted or unsubstituted heterocyclic structure containing one or more of N, S, and O. When $A_3$ represents a ring structure, an unsubstituted ring may be further condensed. In addition, when multiple units exist, $R_{30}$, $R_{30a}$, and $A_3$ each independently have the above meaning for each unit.

When $A_3$ represents a linear and substituted or unsubstituted alkylene group, an aminosulfonic acid compound represented by the following chemical formula (47) is exemplified.

$$H_2N\text{-}A_4\text{-}SO_2R_{47} \qquad (47)$$

(In the formula, $R_{47}$ represents OH, a halogen atom, ONa, OK, or $OR_{47a}$. $R_{47a}$ represents a linear or branched alkyl group having 1 to 8 carbon atoms, or a substituted or unsubstituted phenyl group. $A_4$ represents a liner or branched and substituted or unsubstituted alkylene group having 1 to 8 carbon atoms, which may be substituted by an alkyl group having 1 to 20 carbon atoms, an alkoxy group having 1 to 20 carbon atoms, or the like as a substituent.)

Examples of the compound represented by the chemical formula (47) include 2-aminoethanesulfonic acid (taurine), 3-aminopropanesulfonic acid, 4-aminobutanesulfonic acid, 2-amino-2-methylpropanesulfonic acid, and alkali metal salts and esterified products thereof.

When $A_3$ represents a substituted or unsubstituted phenylene group, an aminosulfonic acid compound represented by the following chemical formula (48) is exemplified.

(48)

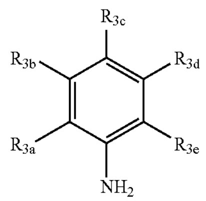

(In the formula, $R_{3a}$, $R_{3b}$, $R_{3c}$, $R_{3d}$, and $R_{3e}$ each independently represent $SO_2R_{3f}$ ($R_{3f}$ represents OH, a halogen atom, ONa, OK, or $OR_{3f1}$ ($R_{3f1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$ ($R_{3g}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{3f}$.)

A polyhydroxyalkanoate having one or more units each represented by the chemical formula (3) can be obtained by using a compound represented by the chemical formula (48).

(3)

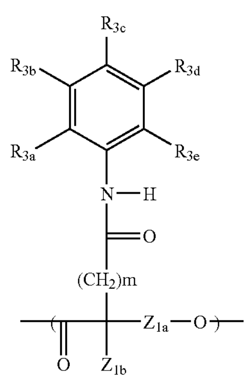

(In the formula, $R_{3a}$, $R_{3b}$, $R_{3c}$, $R_{3d}$, and $R_{3e}$ each independently represent $SO_2R_{3f}$ ($R_{3f}$ represents OH, a halogen atom, ONa, OK, or $OR_{3f1}$. ($R_{3f1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$ ($R_{3g}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{3f}$. $Z_{3a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{3b}$ represents a hydrogen atom, or a linear or branched alkyl group, aryl group, or aralkyl group which may be substituted by an aryl group. In addition, m represents an integer selected from 0 to 8. When multiple units exist, $R_{3a}$, $R_{3b}$, $R_{3c}$, $R_{3d}$, $R_{3e}$, $R_{3f}$, $R_{3f1}$, $R_{3g}$, $Z_{1a}$, $Z_{1b}$, and m each independently have the above meaning for each unit.)

Examples of the compound represented by the chemical formula (48) include p-aminobenzenesulfonic acid (sulfanilic acid), m-aminobenzenesulfonic acid, o-aminobenzenesulfonic acid, m-toluidine-4-sulfonic acid, sodium o-toluidine-4-sulfonate, p-toluidine-2-sulfonic acid, 4-methoxyaniline-2-sulfonic acid, o-anisidine-5-sulfonic acid, p-anisidine-3-sulfonic acid, 3-nitroaniline-4-sulfonic acid, sodium 2-nitroaniline-4-sulfonate, sodium 4-nitroaniline-2-sulfonate, 1,5-dinitroaniline-4-sulfonic acid, 2-aminophenol-4-hydroxy-5-nitrobenzenesulfonic acid, sodium 2,4-dimethylaniline-5-sulfonate, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, 4-carboxyaniline-6-sulfonic acid, and alkali metal salts and esterified products thereof.

When $A_3$ represents a substituted or unsubstituted naphthalene group, an aminosulfonic acid compound represented by the following chemical formula (49A) or (49B) is exemplified.

(49A)

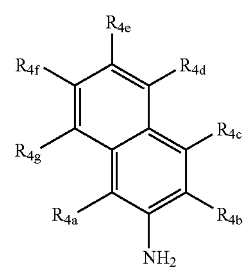

(In the formula, $R_{4a}$, $R_{4b}$, $R_{4c}$, $R_{4d}$, $R_{4e}$, $R_{4f}$, and $R_{4g}$ each independently represent $SO_2R_{4o}$ ($R_{4o}$ represents OH, a halogen atom, ONa, OK, or $OR_{4o1}$. ($R_{4o1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{4o}$.)

(49B)

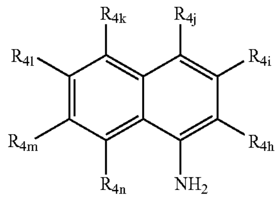

(In the formula, $R_{4h}$, $R_{4i}$, $R_{4j}$, $R_{4k}$, $R_{4l}$, $R_{4m}$, and $R_{4n}$ each independently represent $SO_2R_{4o}$ ($R_{4o}$ represents OH, a halogen atom, ONa, OK, or $OR_{4o1}$. ($R_{4o1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{4o}$.)

A polyhydroxyalkanoate having one or more units each represented by the chemical formula (4A) or (4B) can be obtained by using a compound represented by the chemical formula (49A) or (49B).

(4A)

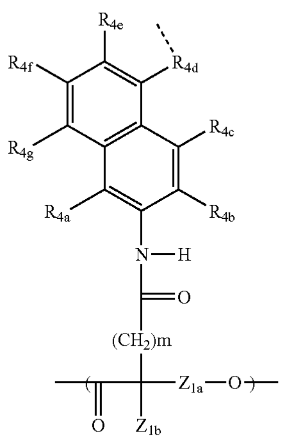

(In the formula, $R_{4a}$, $R_{4b}$, $R_{4c}$, $R_{4d}$, $R_{4e}$, $R_{4f}$, and $R_{4g}$ each independently represent $SO_2R_{4o}$ ($R_{4o}$ represents OH, a halogen atom, ONa, OK, or $OR_{4o1}$. ($R_{4o1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{4o}$. $Z_{1a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{1b}$ represents a hydrogen atom, or a linear or branched alkyl group, aryl group, or aralkyl group which may be substituted by an aryl group. In addition, m represents an integer selected from 0 to 8. When multiple units exist, $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, m, $Z_{1a}$, $Z_{1b}$, and n each independently have the above meaning for each unit.)

(4B)

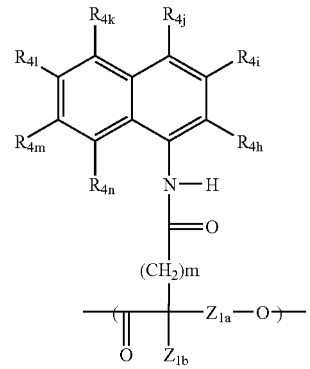

(In the formula, $R_{4h}$, $R_{4i}$, $R_{4j}$, $R_{4k}$, $R_{4l}$, $R_{4m}$, and $R_{4n}$ each independently represent $SO_2R_4$, ($R_{4o}$ represents OH, a halogen atom, ONa, OK, or $OR_{4o1}$. ($R_{4o1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{4o}$. In addition, m represents an integer selected from 0 to 8. $Z_{1a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{1b}$ represents a hydrogen atom, or a linear or branched alkyl group, aryl group, or aralkyl group which may be substituted by an aryl group. When multiple units exist, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, $Z_{1a}$, $Z_{1b}$, and m each independently have the above meaning for each unit.)

Examples of the compound represented by the chemical formula (49A) or (49B) include: sulfonic acids such as 1-naphthylamine-5-sulfonic acid, 1-naphthylamine-4-sulfonic acid, 1-naphthylamine-8-sulfonic acid, 2-naphthylamine-5-sulfonic acid, 1-naphthylamine-6-sulfonic acid, 1-naphthylamine-7-sulfonic acid, 1-naphthylamine-2-ethoxy-6-sulfonic acid, 1-amino-2-naphthol-4-sulfonic acid, 6-amino-1-naphthol-3-sulfonic acid, sodium 1-amino-8-naphthol-2,4-sulfonate, sodium 1-amino-8-naphthol-3,6-sulfonate; and alkali metal salts and esterified products of the sulfonic acids.

When $A_3$ represents a substituted or unsubstituted heterocyclic structure containing one or more of N, S, and O, $A_3$ may represent any one of a pyridine ring, a piperazine ring, a furan ring, and a thiol ring as a heterocyclic ring. Examples of such a compound include: sulfonic acids such as 2-aminopyridine-6-sulfonic acid and 2-aminopiperazine-6-sulfonic acid; and alkali metal salts and esterified products of the sulfonic acids.

As described above, examples of a group forming an ester bond with a sulfonic acid in the case of a sulfonate include a group containing a substituted or unsubstituted aliphatic hydrocarbon structure, a substituted or unsubstituted aromatic ring structure, and a substituted or unsubstituted heterocyclic structure. Furthermore, a linear or branched alkyl group having 1 to 8 carbon atoms, a substituted or unsubstituted phenyl group, or the like is preferable. From the viewpoint of, for example, ease of esterification, one having a group such as $OCH_3$, $OC_2H_5$, $OC_6H_5$, $OC_3H_7$, $OC_4H_9$, $OCH(CH_3)_2$, $OCH_2C(CH_3)_3$, or $OC(CH_3)_3$ is more preferable.

(Method of Producing Polyhydroxyalkanoate Having Unit Represented by Chemical Formula (1))

A reaction between a polyhydroxyalkanoate containing a unit represented by the chemical formula (29) and an aminosulfonic acid compound represented by the chemical formula (30) in the present invention will be described in detail.

The amount of the compound represented by the chemical formula (30) to be used in the present invention is in the range of 0.1 to 50.0 times mole, or preferably 1.0 to 20.0 times mole with respect to the unit represented by the chemical formula (29) to be used as a starting material. An example of a method of producing an amide bond from a carboxylic acid and an amine in the present invention includes a condensation reaction by virtue of heat dehydration. In particular, from the viewpoint of achieving a mild reaction condition under which an ester bond of a polymer main chain is not cleaved, a method is effective, which involves: activating a carboxylic acid portion with an activator to produce an active acyl intermediate; and allowing the intermediate to react with an amine. Examples of the active acyl intermediate include an acid halide, an acid anhydride, and an active ester. In particular, a method of forming an amide bond in an identical reaction field by using a condensing agent is preferable from the viewpoint of simplifying a production process.

If required, the active acyl intermediate may be isolated as an acid halide before being subjected to a condensation reaction with an amine.

A phosphoric acid-based condensing agent used for polycondensation of an aromatic polyamide, a carbodiimide-based condensing agent used for synthesizing a peptide, an acid chloride-based condensing agent, or the like can be appropriately selected as a condensing agent to be used depending on the combination of the chemical formulae (30) and (29).

Examples of the phosphoric acid-based condensing agent include a phosphite-based condensing agent, a phosphorus chloride-based condensing agent, a phosphoric anhydride-based condensing agent, a phosphate-based condensing agent, and a phosphoric amide-based condensing agent.

A phosphite-based condensing agent or the like can be used in the reaction of the present invention. Examples of a phosphite used at this time include triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, di-p-chlorophenyl phosphite, trimethyl phosphite, and triethyl phosphite. Of those, triphenyl phosphite is preferably used. A metal salt such as lithium chloride or calcium chloride may be added for improving the solubility, reactivity, and the like of a polymer.

Examples of the carbodiimide-based condensing agent include dicyclohexyl carbodiimide (DCC), N-ethyl-N'-3-dimethylaminopropyl carbodiimide (EDC=WSCI), and diisopropyl carbodiimide (DIPC). DCC or WSCI may be used in combination with N-hydroxysuccinimide (HONSu), 1-hydroxybenzotriazole (HOBt), 3-hydroxy-4-oxo-3,4-dihydro-1,2,3-benzotriazine (HOObt), or the like.

The amount of the condensing agent to be used is in the range of 0.1 to 50 times mole, or preferably 1 to 20 times mole with respect to the compound represented by the chemical formula (29).

A solvent may be used as required in the reaction of the present invention. Examples of an available solvent include: hydrocarbons such as hexane, cyclohexane, and heptane; ketones such as acetone and methyl ethyl ketone; ethers such as dimethyl ether, diethyl ether, and tetrahydrofuran; halogenated hydrocarbons such as dichloromethane, chloroform, carbon tetrachloride, dichloroethane, and trichloroethane; aromatic hydrocarbons such as benzene and toluene; aprotic polar solvents such as N,N-dimethylformamide, dimethyl sulfoxide, dimethyl acetamide, and hexamethylphosphoramide; pyridine derivatives such as pyridine and picoline; and N-methylpyrrolidone. Pyridine, N-methylpyrrolidone, or the like is particularly preferably used. The amount of the solvent to be used can be appropriately determined in accordance with kinds of a starting material and a base, a reaction condition, and the like.

A reaction temperature is not particularly limited in the method of the present invention, but is generally in the range of −20° C. to the boiling point of a solvent. However, it is preferable to perform the reaction at an optimum temperature suited for a condensing agent to be used.

In the method of the present invention, a reaction time is generally in the range of 1 to 48 hours. The reaction time is particularly preferably in the range of 1 to 10 hours.

A thus produced reaction solution containing a polyhydroxyalkanoate having a unit represented by the chemical formula (1) in the present invention can be collected and purified by, for example, distillation as an ordinary method. Alternatively, the reaction solution can be collected by mixing a solvent (for example, water, an alcohol such as methanol or ethanol, or an ether such as dimethyl ether, diethyl ether, or tetrahydrofuran) evenly with the reaction solution; and reprecipitating a target polyhydroxyalkanoate having a unit represented by the chemical formula (1). The resultant polyhydroxyalkanoate having a unit represented by the chemical formula (1) can be subjected to isolation purification as required. A method for the isolation purification is not particularly limited, and a method involving reprecipitation using a solvent insoluble in the polyhydroxyalkanoate represented by the chemical formula (1), a method according to column chromatography, dialysis, or the like can be used.

When an R portion in the chemical formula (1) is $-A_1-SO_3H$, a method can be adopted as another production method of the present invention, which involves methyl esterifying the R portion in the chemical formula (1) into $-A_1-SO_3CH_3$— using a methyl-esterifying agent after a condensation reaction with an amine. Examples of an available methyl-esterifying agent include those used for methyl esterification of an aliphatic acid in gas chromatography. Examples of a methyl esterification method include: acid catalyst methods such as a hydrochloric acid-methanol method, a boron trifluoride-methanol method, and a sulfuric acid-methanol method; and base catalyst methods such as a sodium methoxide method, a tetramethylguanidine method, and a trimethylsilyldiazomethane method. Of those, a trimethylsilyldiazomethane method is preferable because methylation can be performed under a moderate condition.

Examples of a solvent to be used in the reaction of the present invention include: hydrocarbons such as hexane, cyclohexane, and heptane; alcohols such as methanol and ethanol; halogenated hydrocarbons such as dichloromethane, chloroform, carbon tetrachloride, dichloroethane, and trichloroethane; and aromatic hydrocarbons such as benzene and toluene. Halogenated hydrocarbons and the like are particularly preferably used. The amount of the solvent to be used can be appropriately determined in accordance with a starting material, a reaction condition, and the like. A reaction temperature is not particularly limited in the method of the present invention, but is generally in the range of −20° C. to 30° C. However, it is preferable to perform the reaction at an optimum temperature suited for a condensing agent and a reagent to be used.

In addition, in the present invention, a polyhydroxyalkanoate containing a unit represented by the chemical formula (38) can be produced through the steps of: allowing a polyhydroxyalkanoate having a unit represented by the chemical formula (36) to react with a base; and allowing the compound obtained in the foregoing step to react with a compound represented by the chemical formula (37).

(36)

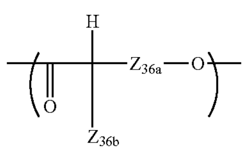

(In the formula, $Z_{36a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{36b}$ represents a hydrogen atom, or a linear or branched alkyl group, aryl group, or aralkyl group which may be substituted by an aryl group. When multiple units exist, $Z_{36a}$ and $Z_{36b}$ each independently have the above meaning for each unit.)

(37)

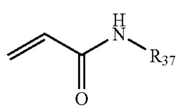

(In the formula, $R_{37}$ represents -$A_{37}$-$SO_2R_{37a}$. $R_{37a}$ represents OH, a halogen atom, ONa, OK, or $OR_{37b}$. $R_{37b}$ and $A_{37}$ are each independently selected from groups each having a substituted or unsubstituted aliphatic hydrocarbon structure, a substituted or unsubstituted aromatic ring structure, or a substituted or unsubstituted heterocyclic structure. When multiple units exist, $R_{37}$, $R_{37a}$, $R_{37b}$, and $A_{37}$ each independently have the above meaning for each unit.)

(38)

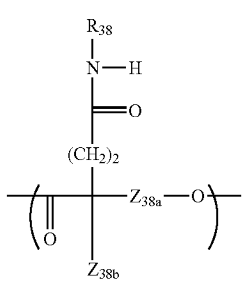

(In the formula, $R_{38}$ represents -$A_{38}$-$SO_2R_{38a}$. $R_{38a}$ represents OH, a halogen atom, ONa, OK, or $OR_{38b}$. $R_{38b}$ and $A_{38}$ each independently represent a group having a substituted or unsubstituted aliphatic hydrocarbon structure, a substituted or unsubstituted aromatic ring structure, or a substituted or unsubstituted heterocyclic structure. $Z_{38a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{38b}$ represents a hydrogen atom, or a linear or branched alkyl group, aryl group, or aralkyl group which may be substituted by an aryl group. When multiple units exist, $R_{38}$, $R_{38a}$, $R_{38b}$, $A_{38}$, $Z_{38a}$, and $Z_{38b}$ each independently have the above meaning for each unit.)

More specifically, in the compound represented by the chemical formulae (36) and (38) to be used in the present invention, $Z_{36a}$ and $Z_{38a}$ each represent a linear alkylene chain having 1 to 4 carbon atoms. The linear alkylene chain is arbitrarily substituted by at least one linear or branched alkyl group, or at least one alkyl group containing a residue having any one of a phenyl structure, a thienyl structure, and a cyclohexyl structure at a terminal thereof. The linear alkylene chain structure represented by each of $Z_{36a}$ and $Z_{38a}$ is preferably selected from the following (A) to (D).

(A) When the linear alkylene chain has 1 carbon atom, in the linear alkylene chain structure represented by the chemical formula (50), one of $Z_{50c}$ and $Z_{50d}$ represents a linear or branched alkyl group, or an alkyl group containing a residue having any one of a phenyl structure, a thienyl structure, and a cyclohexyl structure at a terminal thereof.

(50)

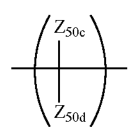

(B) When the linear alkylene chain has 2 carbon atoms, in the linear alkylene chain structure represented by the chemical formula (51), one of $Z_{50c}$, $Z_{51d}$, $Z_{51e}$, and $Z_{51f}$ represents a linear or branched alkyl group, or an alkyl group containing a residue having any one of a phenyl structure, a thienyl structure, and a cyclohexyl structure at a terminal thereof.

(51)

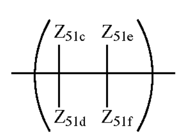

(C) When the linear alkylene chain has 3 carbon atoms, in the linear alkylene chain structure represented by the chemical formula (52), one of $Z_{52c}$, $Z_{52d}$, $Z_{52e}$, $Z_{52f}$, $Z_{52g}$, and $Z_{52h}$ represents a linear or branched alkyl group, or an alkyl group containing a residue having any one of a phenyl structure, a thienyl structure, and a cyclohexyl structure at a terminal thereof.

(52)

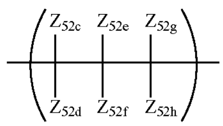

(D) When the linear alkylene chain has 4 carbon atoms, in the linear alkylene chain structure represented by the chemical formula (53), one of $Z_{53c}$, $Z_{53d}$, $Z_{53e}$, $Z_{53f}$, $Z_{53g}$, $Z_{53h}$, $Z_{53i}$, and $Z_{53j}$ represents a linear or branched alkyl group, or an alkyl group containing a residue having any one of a phenyl structure, a thienyl structure, and a cyclohexyl structure at a terminal thereof.

(53)

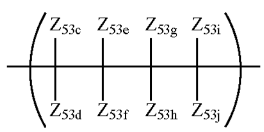

When a substituent selected from $Z_{50c}$, $Z_{50d}$, $Z_{51c}$, $Z_{51d}$, $Z_{51e}$, $Z_{51f}$, $Z_{52c}$, $Z_{52d}$, $Z_{52e}$, $Z_{52f}$, $Z_{52g}$, $Z_{52h}$, $Z_{53c}$, $Z_{53d}$, $Z_{53e}$, $Z_{53f}$, $Z_{53g}$, $Z_{53h}$, $Z_{53i}$, and $Z_{53j}$ described in the chemical formulae (50), (51), (52), and (53) represents an alkyl group containing a residue having any one of a phenyl structure, a thienyl structure, and a cyclohexyl structure at a terminal thereof, the substituent is more preferably selected from substituents represented by the chemical formulae (14), (15), (16), and (17).

$$—(CH_2)k_{14}—CH_3 \quad (14)$$

(In the formula, $k_{14}$ represents an integer selected from 0 to 8. When multiple units exist, $k_{14}$'s each independently have the above meaning for each unit.)

(15)

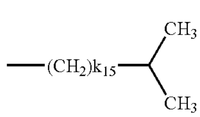

(In the formula, $k_{15}$ represents an integer selected from 0 to 7. When multiple units exist, $k_{15}$'s each independently have the above meaning for each unit.)

$$—(CH_2)k_{16}—R_{16} \quad (16)$$

(In the formula, $k_{16}$ represents an integer selected from 1 to 8. $R_{16}$ represents a substituent containing a residue having any one of a phenyl structure and a thienyl structure. When multiple units exist, $k_{16}$ and $R_{16}$ each independently have the above meaning for each unit.)

(17)

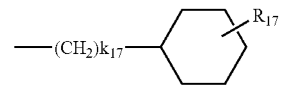

(In the formula, $R_{17}$ represents a substituent to a cyclohexyl group selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group. $k_{17}$ represents an integer selected from 0 to 8. When multiple units exist, $k_{17}$ and $R_{17}$ each independently have the above meaning for each unit.)

In addition, $R_{16}$ in the chemical formula (16), that is, a residue having any one of a phenyl structure and a thienyl structure is selected from the group of residues represented by the chemical formulae (18), (19), (20), (21), (22), (23), (24), (25), (26), (27), and (28).

Here, the chemical formula (18) represents a group of unsubstituted or substituted phenyl groups.

(18)

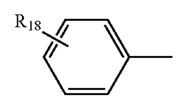

(In the formula, $R_{18}$ represents a substituent to an aromatic ring selected from an H atom, a halogen atom, a CN group, an $NO_2$ group, a $CH_3$ group, a $C_2H_5$ group, a $C_3H_7$ group, a $CH{=}CH_2$ group, $COOR_{18a}$ ($R_{18a}$ represents an H atom, an Na atom, or a K atom.), a $CF_3$ group, a $C_2F_5$ group, and a $C_3F_7$ group. When multiple units exist, $R_{18}$'s may be different for each unit.)

The chemical formula (19) represents a group of unsubstituted or substituted phenoxy groups.

(19)

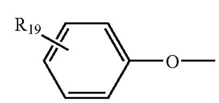

(In the formula, $R_{19}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group. When multiple units exist, $R_{19}$'s may be different for each unit.)

The chemical formula (20) represents a group of unsubstituted or substituted benzoyl groups.

(20)

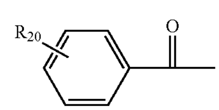

(In the formula, $R_{20}$ represents a substituent to an aromatic ring selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group. When multiple units exist, $R_{20}$'s may be different for each unit.)

The chemical formula (21) represents a group of unsubstituted or substituted phenylsulfanyl groups.

(21)

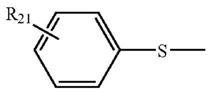

(In the formula, $R_{21}$ represents a substituent to an aromatic ring selected from an H atom, a halogen atom, a CN group, an $NO_2$ group, $COOR_{21a}$, $SO_2R_{21b}$ ($R_{21a}$ represents H, Na, K, $CH_3$, or $C_2H_5$, and $R_{21b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{21}$'s may be different for each unit.)

The chemical formula (22) represents a group of unsubstituted or substituted (phenylmethyl)sulfanyl groups.

(22)

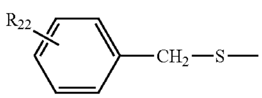

(In the formula, $R_{22}$ represents a substituent to an aromatic ring selected from an H atom, a halogen atom, a CN group, an $NO_2$ group, $COOR_{22a}$, $SO_2R_{22b}$ ($R_{22a}$ represents H, Na, K, $CH_3$, or $C_2H_5$, and $R_{22b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{22}$'s may be different for each unit.)

The chemical formula (23) represents a 2-thienyl group.

(23)

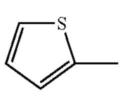

The chemical formula (24) represents a 2-thienylsulfanyl group.

(24)

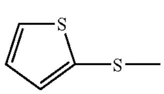

The chemical formula (25) represents a 2-thienylcarbonyl group.

(25)

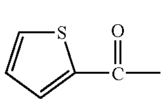

The chemical formula (26) represents a group of unsubstituted or substituted phenylsulfinyl groups.

(26)

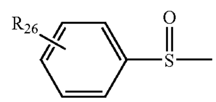

(In the formula, $R_{26}$ represents a substituent to an aromatic ring selected from an H atom, a halogen atom, a CN group, an $NO_2$ group, $COOR_{26a}$, $SO_2R_{26b}$ ($R_{26a}$ represents H, Na, K, $CH_3$, or $C_2H_5$, and $R_{26b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{26}$'s may be different for each unit.)

The chemical formula (27) represents a group of unsubstituted or substituted phenylsulfonyl groups.

(27)

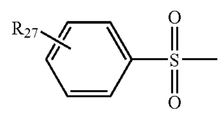

(In the formula, $R_{27}$ represents a substituent to an aromatic ring selected from an H atom, a halogen atom, a CN group, an $NO_2$ group, $COOR_{27a}$, $SO_2R_{27b}$ ($R_{27a}$ represents H, Na, K, $CH_3$, or $C_2H_5$, and $R_{27b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{27}$'s may be different for each unit.)

The chemical formula (28) represents a (phenylmethyl) oxy group.

(28)

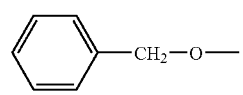

On the other hand, examples of the compound represented by the chemical formula (37) to be used in the present invention include 2-acrylamide-2-methylpropanesulfonic acid, and alkali metal salts and esterified products thereof.

(Method of Producing Polyhydroxyalkanoate Represented by Chemical Formula (38))

A reaction between the polyhydroxyalkanoate containing a unit represented by the chemical formula (36) and the compound represented by the chemical formula (37) in the present invention will be described in detail.

The present invention can be achieved by subjecting a α-methylene or a α-methine adjacent to a carbonyl group in a polymer main chain to a Michael addition reaction with the compound represented by the chemical formula (37). To be specific, the present invention can be achieved by allowing the polyhydroxyalkanoate containing a unit represented by the chemical formula (36) to react with a base capable of forming a α-methylene or a α-methine, which is adjacent to a carbonyl group in the polymer main chain of the polyhydroxyalkanoate containing a unit represented by the chemical formula (36), into an anion under a Michael addition reaction condition; and allowing the resultant to react with the compound represented by the chemical formula (37). In the present invention, the amount of the compound represented by the chemical formula (37) to be used is 0.001 to 100 times mole, or preferably 0.01 to 10 times mole with respect to the unit represented by the chemical formula (36).

A solvent to be used in the reaction of the present invention is not particularly limited as long as it is inactive to the reaction and dissolves the staring material to some extent. Examples of such a solvent include: aliphatic hydrocarbons such as hexane, cyclohexane, heptane, ligroin, and petroleum ether; aromatic hydrocarbons such as benzene, toluene, and xylene; ethers such as diethyl ether, diisopropyl ether, tetrahydrofuran, dioxane, dimethoxyethane, and diethyleneglycoldimethylether; and amides such as formamide, N,N-dimethylformamide, N,N-dimethylacetamide, N-methyl-2-pyrrolidone, N-methylpyrrolidinone, and hexamethylphosphortriamide. Of those, tetrahydrofuran is preferable.

The reaction is performed in the presence of a base. Examples of a base to be used include: lithium alkyls such as methyl lithium and butyl lithium; alkali metal disilazides such as lithium hexamethyl disilazide, sodium hexamethyl disilazide, and potassium hexamethyl disilazide; and lithium amides such as lithium diisopropylamide and lithium dicyclohexylamide. Of those, lithium diisopropylamide is preferable. In addition, the amount of the base to be used is 0.001 to 100 times mole, or preferably 0.01 to 10 times mole with respect to the unit represented by the chemical formula (36).

In the method of the present invention, a reaction temperature is generally in the range of −78° C. to 40° C., or preferably in the range of −78° C. to 30° C.

In the method of the present invention, a reaction time is generally in the range of 10 minutes to 24 hours. The reaction time is particularly preferably in the range of 10 minutes to 4 hours.

In addition, in the polyhydroxyalkanoate having a unit represented by the chemical formula (5) of the present invention, the polyhydroxyalkanoate having a unit represented by the chemical formula (32) can be produced by hydrolyzing a side chain ester portion of a polyhydroxyalkanoate having a unit represented by the chemical formula (31) as a starting material in the presence of an acid or an alkali, or by subjecting the polyhydroxyalkanoate to hydrogenolysis including catalytic reduction.

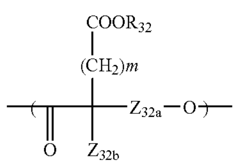

(32)

(In the formula, $R_{32}$ represents hydrogen or a group for forming a salt. $Z_{32a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{32b}$ represents a hydrogen atom, or a linear or branched alkyl group, aryl group, or aralkyl group which may be substituted by an aryl group. m represents an integer selected from 0 to 8. When multiple units exist, $R_{32}$, $Z_{32a}$, $Z_{32b}$, and m each independently have the above meaning for each unit.)

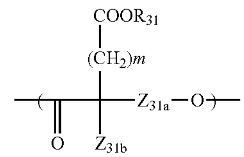

(31)

(In the formula, $R_{31}$ represents a linear or branched alkyl or aralkyl group having 1 to 12 carbon atoms. $Z_{31a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{31b}$ represents a hydrogen atom, or a linear or branched alkyl group, aryl group, or aralkyl group which may be substituted by an aryl group. m represents an integer selected from 0 to 8. When multiple units exist, $R_{31}$, $Z_{31a}$, $Z_{31b}$, and m each independently have the above meaning for each unit.)

More specifically, in each of the compounds represented by the chemical formulae (31) and (32) to be used in the present invention, $Z_{31a}$ and $Z_{32a}$ each represent a linear alkylene chain having 1 to 4 carbon atoms. The linear alkylene chain is arbitrarily substituted by at least one linear or branched alkyl group, or at least one alkyl group containing a residue having any one of a phenyl structure, a thienyl structure, and a cyclohexyl structure at a terminal thereof. The linear alkylene chain structure represented by each of $Z_{31a}$ and $Z_{32a}$ is preferably selected from the following (A) to (D).

(A) When the linear alkylene chain has 1 carbon atom, in the linear alkylene chain structure represented by the chemical formula (54), one of $Z_{54c}$ and $Z_{54d}$ represents a linear or branched alkyl group, or an alkyl group containing a residue having any one of a phenyl structure, a thienyl structure, and a cyclohexyl structure at a terminal thereof.

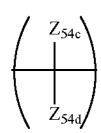

(54)

(B) When the linear alkylene chain has 2 carbon atoms, in the linear alkylene chain structure represented by the chemical formula (55), one of $Z_{55c}$, $Z_{55d}$, $Z_{55e}$, and $Z_{55f}$ represents a linear or branched alkyl group, or an alkyl group containing a residue having any one of a phenyl structure, a thienyl structure, and a cyclohexyl structure at a terminal thereof.

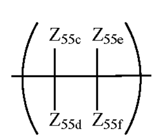

(55)

(C) When the linear alkylene chain has 3 carbon atoms, in the linear alkylene chain structure represented by the chemical formula (56), one of $Z_{56c}$, $Z_{56d}$, $Z_{56e}$, $Z_{56f}$, $Z_{56g}$, and $Z_{56h}$ represents a linear or branched alkyl group, or an alkyl group containing a residue having any one of a phenyl structure, a thienyl structure, and a cyclohexyl structure at a terminal thereof.

(56)

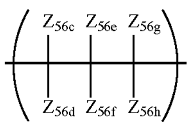

(D) When the linear alkylene chain has 4 carbon atoms, in the linear alkylene chain structure represented by the chemical formula (57), one of $Z_{57c}$, $Z_{57d}$, $Z_{57e}$, $Z_{57f}$, $Z_{57g}$, $Z_{57h}$, $Z_{57i}$, and $Z_{57j}$ represents a linear or branched alkyl group, or an alkyl group containing a residue having any one of a phenyl structure, a thienyl structure, and a cyclohexyl structure at a terminal thereof.

(57)

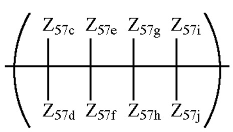

When a substituent selected from $Z_{54c}$, $Z_{54d}$, $Z_{55c}$, $Z_{55d}$, $Z_{55e}$, $Z_{55f}$, $Z_{56c}$, $Z_{56d}$, $Z_{56e}$, $Z_{56f}$, $Z_{56g}$, $Z_{56h}$, $Z_{57c}$, $Z_{57d}$, $Z_{57e}$, $Z_{57f}$, $Z_{57g}$, $Z_{57}$ hr $Z_{57i}$, and $Z_{57j}$ described in the chemical formulae (54), (55), (56), and (57) represents a linear or branched alkyl group, or an alkyl group containing a residue having any one of a phenyl structure, a thienyl structure, and a cyclohexyl structure at a terminal thereof, the substituent is more preferably selected from substituents represented by the chemical formulae (14), (15), (16), and (17).

$$—(CH_2)k_{14}—CH_3 \qquad (14)$$

(In the formula, $k_{14}$ represents an integer selected from 0 to 8. When multiple units exist, $k_{14}$'s each independently have the above meaning for each unit.)

(15)

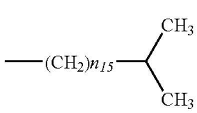

(In the formula, $k_{15}$ represents an integer selected from 0 to 7. When multiple units exist, $k_{15}$'s each independently have the above meaning for each unit.)

$$—(CH_2)k_{16}—R_{16} \qquad (16)$$

(In the formula, $k_{16}$ represents an integer selected from 1 to 8. $R_{16}$ represents a substituent containing a residue having any one of a phenyl structure and a thienyl structure. When multiple units exist, $k_{16}$ and $R_{16}$ each independently have the above meaning for each unit.)

(17)

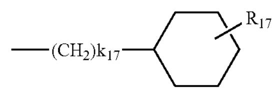

(In the formula, $R_{17}$ represents a substituent to a cyclohexyl group selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group. $k_{17}$ represents an integer selected from 0 to 8. When multiple units exist, $k_{17}$ and $R_{17}$ each independently have the above meaning for each unit.)

In addition, $R_{16}$ in the chemical formula (16), that is, a residue having any one of a phenyl structure and a thienyl structure is selected from the group of residues represented by the chemical formulae (18), (19), (20), (21), (22), (23), (24), (25), (26), (27), and (28).

Here, the chemical formula (18) represents a group of unsubstituted or substituted phenyl groups.

(18)

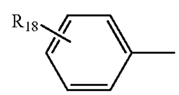

(In the formula, $R_{18}$ represents a substituent to an aromatic ring selected from an H atom, a halogen atom, a CN group, an $NO_2$ group, a $CH_3$ group, a $C_2H_5$ group, a $C_3H_7$ group, a $CH{=}CH_2$ group, $COOR_{18a}$ ($R_{18a}$ represents an H atom, an Na atom, or a K atom.), a $CF_3$ group, a $C_2F_5$ group, and a $C_3F_7$ group. When multiple units exist, $R_{18}$'s may be different for each unit.)

The chemical formula (19) represents a group of unsubstituted or substituted phenoxy groups.

(19)

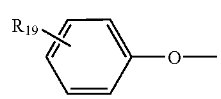

(In the formula, $R_{19}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group. When multiple units exist, $R_{19}$'s may be different for each unit.)

The chemical formula (20) represents a group of unsubstituted or substituted benzoyl groups.

(20)

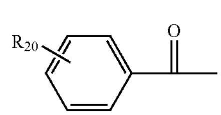

(In the formula, $R_{20}$ represents a substituent to an aromatic ring selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group. When multiple units exist, $R_{20}$'s may be different for each unit.)

The chemical formula (21) represents a group of unsubstituted or substituted phenylsulfanyl groups.

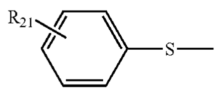

(21)

(In the formula, $R_{21}$ represents a substituent to an aromatic ring selected from an H atom, a halogen atom, a CN group, an $NO_2$ group, $COOR_{21a}$, $SO_2R_{21b}$ ($R_{21a}$ represents H, Na, K, $CH_3$, or $C_2H_5$, and $R_{21b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{21}$'s may be different for each unit.)

The chemical formula (22) represents a group of unsubstituted or substituted (phenylmethyl)sulfanyl groups.

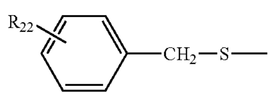

(22)

(In the formula, $R_{22}$ represents a substituent to an aromatic ring selected from an H atom, a halogen atom, a CN group, an $NO_2$ group, $COOR_{22a}$, $SO_2R_{22b}$ ($R_{22a}$ represents H, Na, K, $CH_3$, or $C_2H_5$, and $R_{22b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{22}$'s may be different for each unit.)

The chemical formula (23) represents a 2-thienyl group.

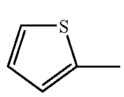

(23)

The chemical formula (24) represents a 2-thienylsulfanyl group.

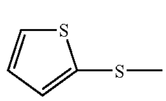

(24)

The chemical formula (25) represents a 2-thienylcarbonyl group.

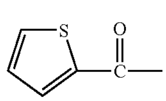

(25)

The chemical formula (26) represents a group of unsubstituted or substituted phenylsulfinyl groups.

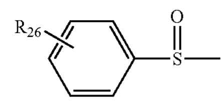

(26)

(In the formula, $R_{26}$ represents a substituent to an aromatic ring selected from an H atom, a halogen atom, a CN group, an $NO_2$ group, $COOR_{26a}$, $SO_2R_{26b}$ ($R_{26a}$ represents H, Na, K, $CH_3$, or $CH_{15}$, and $R_{26b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{26}$'s may be different for each unit.)

The chemical formula (27) represents a group of unsubstituted or substituted phenylsulfonyl groups.

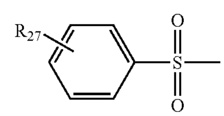

(27)

(In the formula, $R_{27}$ represents a substituent to an aromatic ring selected from an H atom, a halogen atom, a CN group, an $NO_2$ group, $COOR_{27a}$, $SO_2R_{27b}$ ($R_{27a}$ represents H, Na, K, $CH_3$, or $C_2H_5$, and $R_{27b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{27}$'s may be different for each unit.)

The chemical formula (28) represents a (phenylmethyl) oxy group.

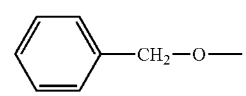

(28)

(Method of Producing Polyhydroxyalkanoate Represented by Chemical Formula (32))

Detailed description will be given of a method of producing the polyhydroxyalkanoate having a unit represented by the chemical formula (32) by hydrolyzing a side chain ester portion of a polyhydroxyalkanoate having a unit represented by the chemical formula (31) in the presence of an acid or an alkali, or by subjecting the polyhydroxyalkanoate to hydrogenolysis including catalytic reduction in the present invention.

In the case where hydrolysis in the presence of an acid or an alkali is employed, the hydrolysis can be performed by using, in an aqueous solution or a hydrophilic organic solvent such as methanol, ethanol, tetrahydrofuran, dioxane, dimethylformamide, or dimethyl sulfoxide as a solvent, an aqueous solution of an inorganic acid such as hydrochloric acid, sulfuric acid, nitric acid, or phosphoric acid, an organic acid such as trifluoroacetic acid, trichloroacetic acid, p-toluenesulfonic acid, or methanesulfonic acid, an aqueous caustic alkali such as sodium hydroxide or potassium hydroxide, an aqueous solution of an alkali carbonate such as sodium carbonate or potassium carbonate, or an alcohol solution of a metal alkoxide such as sodium methoxide or sodium ethoxide. A reaction temperature is generally in the range of 0° C. to 40° C., or preferably in the range of 0° C. to 30° C. A reaction time is generally in the range of 0.5 to 48 hours. When hydrolysis is performed in the presence of an acid or an alkali, in each case, an ester bond of a main chain is also cleaved, and a reduction in molecular weight is observed in some cases.

A method of obtaining a carboxylic acid by way of hydrogenolysis including catalytic reduction is performed as follows. That is, in an appropriate solvent, in the temperature range of −20° C. to the boiling point of the solvent used, or preferably 0 to 50° C., in the presence of a reduction catalyst, hydrogen is allowed to act under normal or increased pressure to perform catalytic reduction. Examples of the solvent used include water, methanol, ethanol, propanol, hexafluoroisopropanol, ethyl acetate, diethyl ether, tetrahydrofuran, dioxane, benzene, toluene, dimethylformamide, pyridine, and N-methylpyrrolidone. A mixed solvent of the above solvents may also be used. A catalyst such as palladium, platinum, or rhodium which is used singly or used while being carried by a carrier, Raney nickel, or the like is used as the reduction catalyst. A reaction time is generally in the range of 0.5 to 72 hours. A thus produced reaction solution containing a polyhydroxyalkanoate having a unit represented by the chemical formula (32) is collected as a crude polymer by: removing the catalyst through filtration; and removing the solvent through distillation or the like. The resultant polyhydroxyalkanoate having a unit represented by the chemical formula (32) can be subjected to isolation purification as required. A method for the isolation purification is not particularly limited, and a method involving reprecipitation using a solvent insoluble in the polyhydroxyalkanoate having a unit represented by the chemical formula (32), a method according to column chromatography, dialysis, or the like can be used. Provided, however, that even in the case where catalytic reduction is employed, an ester bond of a main chain is cleaved, and a reduction in molecular weight is observed in some cases.

In addition, in the polyhydroxyalkanoate having a unit represented by the chemical formula (5) of the present invention, a polyhydroxyalkanoate having a unit represented by the chemical formula (58) can be produced by esterifying a polyhydroxyalkanoate represented by the chemical formula (59) as a staring material by means of an esterifying agent.

(58)

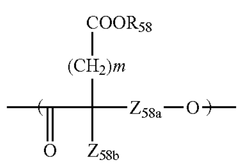

(In the formula, $R_{58}$ represents a linear or branched alkyl or aralkyl group having 1 to 12 carbon atoms. $Z_{58a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{58b}$ represents a hydrogen atom, or a linear or branched alkyl group, aryl group, or aralkyl group which may be substituted by an aryl group. m represents an integer selected from 0 to 8. When multiple units exist, $R_{58}$, $Z_{58a}$, $Z_{58b}$, and m each independently have the above meaning for each unit.)

(59)

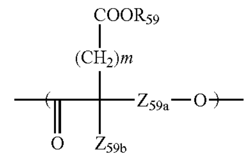

(In the formula, $R_{59}$ represents hydrogen or a group for forming a salt. $Z_{59a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{59b}$ represents a hydrogen atom, or a linear or branched alkyl group, aryl group, or aralkyl group which may be substituted by an aryl group. m represents an integer selected from 0 to 8. When multiple units exist, $R_{59}$, $Z_{59a}$, $Z_{59b}$, and m each independently have the above meaning for each unit.)

More specifically, in each of the compounds represented by the chemical formulae (58) and (59) to be used in the present invention, $Z_{58a}$ and $Z_{59a}$ each represent a linear alkylene chain having 1 to 4 carbon atoms. The linear alkylene chain is arbitrarily substituted by at least one linear or branched alkyl group, or at least one alkyl group containing a residue having any one of a phenyl structure, a thienyl structure, and a cyclohexyl structure at a terminal thereof. The linear alkylene chain structure represented by each of $Z_{58a}$ and $Z_{59a}$ is preferably selected from the following (A) to (D).

(A) When the linear alkylene chain has 1 carbon atom, in the linear alkylene chain structure represented by the chemical formula (60), one of $Z_{60c}$ and $Z_{60d}$ represents a linear or branched alkyl group, or an alkyl group containing a residue having any one of a phenyl structure, a thienyl structure, and a cyclohexyl structure at a terminal thereof.

(60)

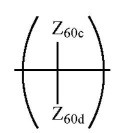

(B) When the linear alkylene chain has 2 carbon atoms, in the linear alkylene chain structure represented by the chemical formula (61), one of $Z_{61c}$, $Z_{61d}$, $Z_{61e}$, and $Z_{61f}$ represents a linear or branched alkyl group, or an alkyl group containing a residue having any one of a phenyl structure, a thienyl structure, and a cyclohexyl structure at a terminal thereof.

(61)

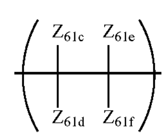

(C) When the linear alkylene chain has 3 carbon atoms, in the linear alkylene chain structure represented by the chemical formula (62), one of $Z_{62c}$, $Z_{62d}$, $Z_{62e}$, $Z_{62f}$, $Z_{62g}$, and $Z_{62h}$ represents a linear or branched alkyl group, or an alkyl group containing a residue having any one of a phenyl structure, a thienyl structure, and a cyclohexyl structure at a terminal thereof.

(62)

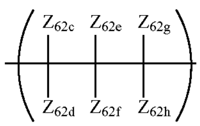

(D) When the linear alkylene chain has 4 carbon atoms, in the linear alkylene chain structure represented by the chemical formula (63), one of $Z_{63c}$, $Z_{63d}$, $Z_{63e}$, $Z_{63f}$, $Z_{63g}$, $Z_{63h}$, $Z_{63i}$, and $Z_{63j}$ represents a linear or branched alkyl group, or an alkyl group containing a residue having any one of a phenyl structure, a thienyl structure, and a cyclohexyl structure at a terminal thereof.

(63)

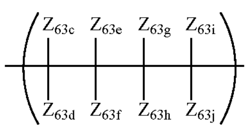

When a substituent selected from $Z_{60c}$, $Z_{60d}$, $Z_{61c}$, $Z_{61d}$, $Z_{61e}$, $Z_{61f}$, $Z_{62c}$, $Z_{62d}$, $Z_{62e}$, $Z_{62f}$, $Z_{62g}$, $Z_{62h}$, $Z_{63c}$, $Z_{63d}$, $Z_{63e}$, $Z_{63f}$, $Z_{63g}$, $Z_{63h}$, $Z_{63i}$, and $Z_{63j}$ described in the chemical formulae (60), (61), (62), and (63) represents a linear or branched alkyl group, or an alkyl group containing a residue having any one of a phenyl structure, a thienyl structure, and a cyclohexyl structure at a terminal thereof, the substituent is more preferably selected from substituents represented by the chemical formulae (14), (15), (16), and (17).

$$—(CH_2)k_{14}—CH_3 \quad (14)$$

(In the formula, $k_{14}$ represents an integer selected from 0 to 8. When multiple units exist, $k_{14}$'s each independently have the above meaning for each unit.)

(15)

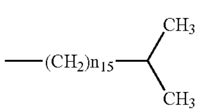

(In the formula, $k_{15}$ represents an integer selected from 0 to 7. When multiple units exist, $k_{15}$'s each independently have the above meaning for each unit.)

$$—(CH_2)n_{16}—R_{16} \quad (16)$$

(In the formula, $k_{16}$ represents an integer selected from 1 to 8. $R_{16}$ represents a substituent containing a residue having any one of a phenyl structure and a thienyl structure. When multiple units exist, $k_{16}$ and $R_{16}$ each independently have the above meaning for each unit.)

(17)

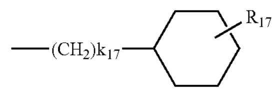

(In the formula, $R_{17}$ represents a substituent to a cyclohexyl group selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group. $k_{17}$ represents an integer selected from 0 to 8. When multiple units exist, $k_{17}$ and $R_{17}$ each independently have the above meaning for each unit.)

In addition, $R_{16}$ in the chemical formula (16), that is, a residue having any one of a phenyl structure and a thienyl structure is selected from the group of residues represented by the chemical formulae (18), (19), (20), (21), (22), (23), (24), (25), (26), (27), and (28).

Here, the chemical formula (18) represents a group of unsubstituted or substituted phenyl groups.

(18)

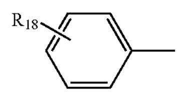

(In the formula, $R_{18}$ represents a substituent to an aromatic ring selected from an H atom, a halogen atom, a CN group, an $NO_2$ group, a $CH_3$ group, a $C_2H_5$ group, a $C_3H_7$ group, a $CH{=}CH_2$ group, $COOR_{18a}$ ($R_{18a}$ represents an H atom, an Na atom, or a K atom.), a $CF_3$ group, a $C_2F_5$ group, and a $C_3F_7$ group. When multiple units exist, $R_{18}$'s may be different for each unit.)

The chemical formula (19) represents a group of unsubstituted or substituted phenoxy groups.

(19)

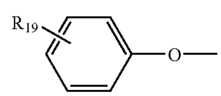

(In the formula, $R_{19}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group. When multiple units exist, $R_{19}$'s may be different for each unit.)

The chemical formula (20) represents a group of unsubstituted or substituted benzoyl groups.

(20)

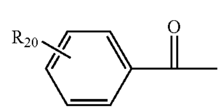

(In the formula, $R_{20}$ represents a substituent to an aromatic ring selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group. When multiple units exist, $R_{20}$'s may be different for each unit.)

The chemical formula (21) represents a group of unsubstituted or substituted phenylsulfanyl groups.

(21)

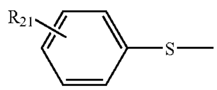

(In the formula, $R_{21}$ represents a substituent to an aromatic ring selected from an H atom, a halogen atom, a CN group, an $NO_2$ group, $COOR_{21a}$, $SO_2R_{21b}$ ($R_{21a}$ represents H, Na, K, $CH_3$, or $C_2H_5$, and $R_{21b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{21}$'s may be different for each unit.)

The chemical formula (22) represents a group of unsubstituted or substituted (phenylmethyl)sulfanyl groups.

(22)

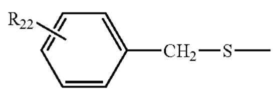

(In the formula, $R_{22}$ represents a substituent to an aromatic ring selected from an H atom, a halogen atom, a CN group, an $NO_2$ group, $COOR_{22a}$, $SO_2R_{22b}$ ($R_{22a}$ represents H, Na, K, $CH_3$, or $C_2H_5$, and $R_{22b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{22}$'s may be different for each unit.)

The chemical formula (23) represents a 2-thienyl group.

(23)

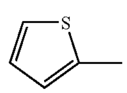

The chemical formula (24) represents a 2-thienylsulfanyl group.

(24)

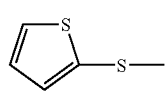

The chemical formula (25) represents a 2-thienylcarbonyl group.

(25)

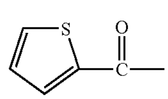

The chemical formula (26) represents a group of unsubstituted or substituted phenylsulfinyl groups.

(26)

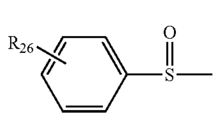

(In the formula, $R_{26}$ represents a substituent to an aromatic ring selected from an H atom, a halogen atom, a CN group, an $NO_2$ group, $COOR_{26a}$, $SO_2R_{26b}$ ($R_{26a}$ represents H, Na, K, $CH_3$, or $C_2H_5$, and $R_{26b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{26}$'s may be different for each unit.)

The chemical formula (27) represents a group of unsubstituted or substituted phenylsulfonyl groups.

(27)

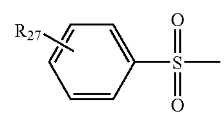

(In the formula, $R_{27}$ represents a substituent to an aromatic ring selected from an H atom, a halogen atom, a CN group, an $NO_2$ group, $COOR_{27a}$, $SO_2R_{27b}$ ($R_{27a}$ represents H, Na, K, $CH_3$, or $C_2H_5$, and $R_{27b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{27}$'s may be different for each unit.)

The chemical formula (28) represents a (phenylmethyl) oxy group.

(28)

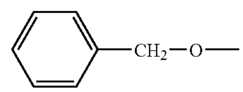

Examples of the esterifying agent to be used include diazomethane and DMF dimethylacetals. For example, the polyhydroxyalkanoate having a unit represented by the chemical formula (59) easily reacts with trimethylsilyldiazomethane, DMF dimethylacetal, DMF diethylacetal, DMF dipropylacetal, DMF diisopropylacetal, DMF-n-butylacetal, DMF-tert-butylacetal, DMF dineopentylacetal, or the like to produce a corresponding ester. Furthermore, the polyhydroxyalkanoate is allowed to react with any one of alcohols such as methanol, ethanol, propanol, isopropyl alcohol, butyl alcohol, sec-butyl alcohol, tert-butyl alcohol, pentyl alcohol, neopentyl alcohol, hexyl alcohol, heptyl alcohol, octyl alcohol, nonyl alcohol, decyl alcohol, and lauryl alcohol, or any one of saccharides for introducing a sugar structure such as D-glucose, D-fructose, and otherwise by using an acid catalyst or a condensing agent such as DCC to produce an esterified polyhydroxyalkanoate.

In addition, in the present invention, a polyhydroxyalkanoate containing a unit represented by the chemical formula (35) can be produced through the steps of: allowing a polyhydroxyalkanoate having a unit represented by the chemical formula (33) to react with a base; and allowing the compound obtained in the foregoing step to react with a compound represented by the chemical formula (34).

(33)

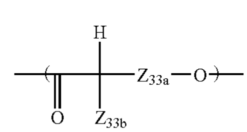

(In the formula, $Z_{33a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{33b}$ represents a hydrogen atom, or a linear or branched alkyl group, aryl group, or aralkyl group which may be substituted by an aryl group. When multiple units exist, $Z_{33a}$ and $Z_{33b}$ each independently have the above meaning for each unit.)

$$X(CH_2)mCOOR_{34} \quad (34)$$

(In the formula, m represents an integer selected from 0 to 8. X represents a halogen atom. $R_{34}$ represents a linear or branched alkyl or aralkyl group having 1 to 12 carbon atoms.)

(35)

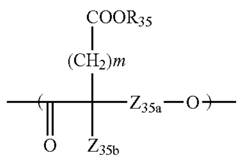

(In the formula, $R_{35}$ represents a linear or branched alkyl or aralkyl group having 1 to 12 carbon atoms. $Z_{35a}$ represents a linear alkylene chain having 1 to 4 carbon atoms. The linear alkylene chain has at least one linear or branched alkyl group, or at least one alkyl group containing a residue having any one of a phenyl structure, a thienyl structure, and a cyclohexyl structure at a terminal thereof. $Z_{35b}$ represents a hydrogen atom, or a linear or branched alkyl group, aryl group, or aralkyl group which may be substituted by an aryl group. In addition, m represents an integer selected from 0 to 8. When multiple units exist, $R_{35}$, $Z_{35a}$, $Z_{35b}$, and m each independently have the above meaning for each unit.)

Alternatively, the compound (33) can be produced via a ring-opening polymerizable cyclic compound.

More specifically, in each of the compounds represented by the chemical formulae (33) and (35) in the present invention, $Z_{33a}$ and $Z_{35a}$ each represent a linear alkylene chain having 1 to 4 carbon atoms. The linear alkylene chain is arbitrarily substituted by at least one linear or branched alkyl group, or at least one alkyl group containing a residue having any one of a phenyl structure, a thienyl structure, and a cyclohexyl structure at a terminal thereof. The linear alkylene chain structure represented by each of $Z_{33a}$ and $Z_{35a}$ is preferably selected from the following (A) to (D).

(A) When the linear alkylene chain has 1 carbon atom, in the linear alkylene chain structure represented by the chemical formula (33), one of $Z_{64c}$ and $Z_{64d}$ represents a linear or branched alkyl group, or an alkyl group containing a residue having any one of a phenyl structure, a thienyl structure, and a cyclohexyl structure at a terminal thereof.

(64)

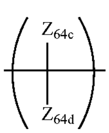

(B) When the linear alkylene chain has 2 carbon atoms, in the linear alkylene chain structure represented by the chemical formula (65), one of $Z_{65c}$, $Z_{65d}$, $Z_{65e}$, and $Z_{65f}$ represents a linear or branched alkyl group, or an alkyl group containing a residue having any one of a phenyl structure, a thienyl structure, and a cyclohexyl structure at a terminal thereof.

(65)

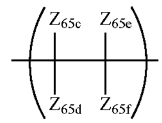

(C) When the linear alkylene chain has 3 carbon atoms, in the linear alkylene chain structure represented by the chemical formula (66), one of $Z_{66c}$, $Z_{66d}$, $Z_{66e}$, $Z_{66f}$, $Z_{66g}$, and $Z_{66h}$ represents a linear or branched alkyl group, or an alkyl group containing a residue having any one of a phenyl structure, a thienyl structure, and a cyclohexyl structure at a terminal thereof.

(66)

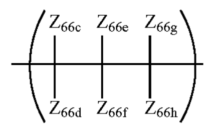

(D) When the linear alkylene chain has 4 carbon atoms, in the linear alkylene chain structure represented by the chemical formula (67), one of $Z_{67c}$, $Z_{67d}$, $Z_{67e}$, $Z_{67f}$, $Z_{67g}$, $Z_{67h}$, $Z_{67i}$, and $Z_{67j}$ represents a linear or branched alkyl group, or an alkyl group containing a residue having any one of a phenyl structure, a thienyl structure, and a cyclohexyl structure at a terminal thereof.

(67)

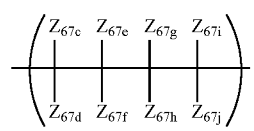

When a substituent selected from $Z_{64c}$, $Z_{64d}$, $Z_{65c}$, $Z_{65d}$, $Z_{65e}$, $Z_{65f}$, $Z_{66c}$, $Z_{66d}$, $Z_{66e}$, $Z_{66f}$, $Z_{66g}$, $Z_{66h}$, $Z_{67c}$, $Z_{67d}$, $Z_{67e}$, $Z_{67f}$, $Z_{67g}$, $Z_{67h}$, $Z_{67i}$, and $Z_{67j}$ described in the chemical formulae (64), (65), (66), and (67) represents an alkyl group containing a residue having any one of a phenyl structure, a thienyl structure, and a cyclohexyl structure at a terminal thereof, the substituent is more preferably selected from substituents represented by the chemical formulae (14), (15), (16), and (17).

$$—(CH_2)k_{14}—CH_3 \quad (14)$$

(In the formula, $k_{14}$ represents an integer selected from 0 to 8. When multiple units exist, $k_{14}$'s each independently have the above meaning for each unit.)

(15)

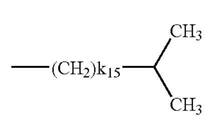

(In the formula, $k_{15}$ represents an integer selected from 0 to 7. When multiple units exist, $k_{15}$'s each independently have the above meaning for each unit.)

$$—(CH_2)k_{16}—R_{16} \quad (16)$$

(In the formula, $k_{16}$ represents an integer selected from 1 to 8. $R_{16}$ represents a substituent containing a residue having any one of a phenyl structure and a thienyl structure. When multiple units exist, $k_{16}$ and $R_{16}$ each independently have the above meaning for each unit.)

(17)

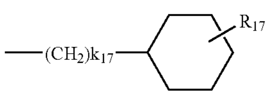

(In the formula, $R_{17}$ represents a substituent to a cyclohexyl group selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group. $k_{17}$ represents an integer selected from 0 to 8. When multiple units exist, $k_{17}$ and $R_{17}$ each independently have the above meaning for each unit.)

In addition, $R_{16}$ in the chemical formula (16), that is, a residue having any one of a phenyl structure and a thienyl structure is selected from the group of residues represented by the chemical formulae (18), (19), (20), (21), (22), (23), (24), (25), (26), (27), and (28).

Here, the chemical formula (18) represents a group of unsubstituted or substituted phenyl groups.

(18)

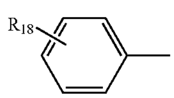

(In the formula, $R_{18}$ represents a substituent to an aromatic ring selected from an H atom, a halogen atom, a CN group, an $NO_2$ group, a $CH_3$ group, a $C_2H_5$ group, a $C_3H_7$ group, a $CH{=}CH_2$ group, $COOR_{18a}$ ($R_{18a}$ represents an H atom, an Na atom, or a K atom.), a $CF_3$ group, a $C_2F_5$ group, and a $C_3F_7$ group. When multiple units exist, $R_{18}$'s may be different for each unit.)

The chemical formula (19) represents a group of unsubstituted or substituted phenoxy groups.

(19)

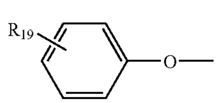

(In the formula, $R_{19}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group. When multiple units exist, $R_{19}$'s may be different for each unit.)

The chemical formula (20) represents a group of unsubstituted or substituted benzoyl groups.

(20)

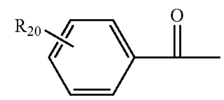

(In the formula, $R_{20}$ represents a substituent to an aromatic ring selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group. When multiple units exist, $R_{20}$'s may be different for each unit.)

The chemical formula (21) represents a group of unsubstituted or substituted phenylsulfanyl groups.

(21)

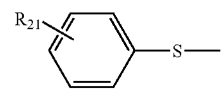

(In the formula, $R_{21}$, represents a substituent to an aromatic ring selected from an H atom, a halogen atom, a CN group, an $NO_2$ group, $COOR_{21a}$, $SO_2R_{21b}$ ($R_{21a}$ represents H, Na, K, $CH_3$, or $C_2H_5$, and $R_{21b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{21}$'s may be different for each unit.)

The chemical formula (22) represents a group of unsubstituted or substituted (phenylmethyl)sulfanyl groups.

(22)

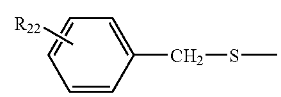

(In the formula, $R_{22}$ represents a substituent to an aromatic ring selected from an H atom, a halogen atom, a CN group, an $NO_2$ group, $COOR_{22a}$, $SO_2R_{22b}$ ($R_{22a}$ represents H, Na, K, $CH_3$, or $C_2H_5$, and $R_{22b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{22}$'s may be different for each unit.)

The chemical formula (23) represents a 2-thienyl group.

(23)

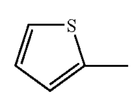

The chemical formula (24) represents a 2-thienylsulfanyl group.

(24)

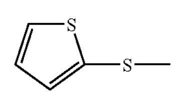

The chemical formula (25) represents a 2-thienylcarbonyl group.

(25)

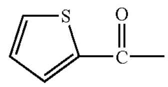

The chemical formula (26) represents a group of unsubstituted or substituted phenylsulfinyl groups.

(26)

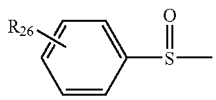

(In the formula, $R_{26}$ represents a substituent to an aromatic ring selected from an H atom, a halogen atom, a CN group, an $NO_2$ group, $COOR_{26a}$, $SO_2R_{26b}$ ($R_{26a}$ represents H, Na, K, $CH_3$, or $C_2H_5$, and $R_{26b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{26}$'s may be different for each unit.)

The chemical formula (27) represents a group of unsubstituted or substituted phenylsulfonyl groups.

(27)

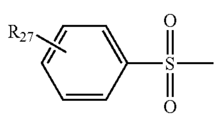

(In the formula, $R_{27}$ represents a substituent to an aromatic ring selected from an H atom, a halogen atom, a CN group, an $NO_2$ group, $COOR_{27a}$, $SO_2R_{27b}$ ($R_{27a}$ represents H, Na, K, $CH_3$, or $CH_{15}$, and $R_{27b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{27}$'s may be different for each unit.)

The chemical formula (28) represents a (phenylmethyl) oxy group.

(28)

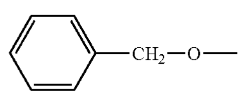

Examples of the compound represented by the chemical formula (34) include methyl chloroformate, ethyl chloroformate, propyl chloroformate, isopropyl chloroformate, butyl chloroformate, cyclohexyl chloroformate, benzyl chloroformate, methyl bromoformate, ethyl bromoformate, propyl bromoformate, isopropyl bromoformate, butyl bromoformate, cyclohexyl bromoformate, benzyl bromoformate, methyl chloroacetate, ethyl chloroacetate, propyl chloroacetate, isopropyl chloroacetate, butyl chloroacetate, cyclohexyl chloroacetate, benzyl chloroacetate, methyl bromoacetate, ethyl bromoacetate, propyl bromoacetate, isopropyl bromoacetate, butyl bromoacetate, cyclohexyl bromoacetate, benzyl bromoacetate, methyl 3-chloropropionate, ethyl 3-chloropropionate, propyl 3-chloropropionate, isopropyl 3-chloropropionate, butyl 3-chloropropionate, cyclohexyl 3-chloropropionate, benzyl 3-chloropropionate, methyl 3-bromopropionate, ethyl 3-bromopropionate, propyl 3-bromopropionate, isopropyl 3-bromopropionate, butyl 3-bromopropionate, cyclohexyl 3-bromopropionate, benzyl 3-bromopropionate, methyl 4-chlorobutyrate, ethyl 4-chlorobutyrate, propyl 4-chlorobutyrate, isopropyl 4-chlorobutyrate, butyl 4-chlorobutyrate, cyclohexyl 4-chlorobutyrate, benzyl 4-chlorobutyrate, methyl 4-bromobutyrate, ethyl 4-bromobutyrate, propyl 4-bromobutyrate, isopropyl 4-bromobutyrate, butyl 4-bromobutyrate, cyclohexyl 4-bromobutyrate, benzyl 4-bromobutyrate, methyl 5-chlorovalerate, ethyl 5-chlorovalerate, propyl 5-chlorovalerate, isopropyl 5-chlorovalerate, butyl 5-chlorovalerate, cyclohexyl 5-chlorovalerate, benzyl 5-chlorovalerate, methyl 5-bromovalerate, ethyl 5-bromovalerate, propyl 5-bromovalerate, isopropyl 5-bromovalerate, butyl 5-bromovalerate, cyclohexyl 5-bromovalerate, benzyl 5-bromovalerate, methyl 6-chlorohexanoate, ethyl 6-chlorohexanoate, propyl 6-chlorohexanoate, isopropyl 6-chlorohexanoate, butyl 6-chlorohexanoate, cyclohexyl 6-chlorohexanoate, benzyl 6-chlorohexanoate, methyl 6-bromohexanoate, ethyl 6-bromohexanoate, propyl 6-bromohexanoate, isopropyl 6-bromohexanoate, butyl 6-bromohexanoate, cyclohexyl 6-bromohexanoate, benzyl 6-bromohexanoate, methyl 7-chloroheptanoate, ethyl 7-chloroheptanoate, propyl 7-chloroheptanoate, isopropyl 7-chloroheptanoate, butyl 7-chloroheptanoate, cyclohexyl 7-chloroheptanoate, benzyl 7-chloroheptanoate, methyl 7-bromoheptanoate, ethyl 7-bromoheptanoate, propyl 7-bromoheptanoate, isopropyl 7-bromoheptanoate, butyl 7-bromoheptanoate, cyclohexyl 7-bromoheptanoate, benzyl 7-bromooctanoate, methyl 8-chlorooctanoate, ethyl 8-chlorooctanoate, propyl 8-chlorooctanoate, isopropyl 8-chlorooctanoate, butyl 8-chlorooctanoate, cyclohexyl 8-chlorooctanoate, benzyl 8-chlorooctanoate, methyl 8-bromooctanoate, ethyl 8-bromooctanoate, propyl 8-bromooctanoate, isopropyl 8-bromooctanoate, butyl 8-bromooctanoate, cyclohexyl 8-bromooctanoate, benzyl 8-bromooctanoate, methyl 9-chlorononanoate, ethyl 9-chlorononanoate, propyl 9-chlorononanoate, isopropyl 9-chlorononanoate, butyl 9-bromononanoate, cyclohexyl 9-chlorononanoate, benzyl 9-chlorononanoate, methyl 9-bromononanoate, ethyl 9-bromononanoate, propyl 9-bromononanoate, isopropyl 9-bromononanoate, butyl 9-bromononanoate, cyclohexyl 9-bromononanoate, and benzyl 9-bromononanoate.

Method of producing polyhydroxyalkanoate represented by chemical formula (35)

A reaction between the polyhydroxyalkanoate containing a unit represented by the chemical formula (33) and the compound represented by the chemical formula (34) in the present invention will be described in detail.

The present invention can be achieved by subjecting a α-methylene or a α-methine adjacent to a carbonyl group in a polymer main chain to an addition reaction with the compound represented by the chemical formula (34). To be specific, the present invention can be achieved by: allowing the polyhydroxyalkanoate containing a unit represented by the chemical formula (33) to react with a base capable of forming a α-methylene or a α-methine, which is adjacent to a carbonyl group in the polymer main chain of the polyhydroxyalkanoate containing a unit represented by the chemical formula (33), into an anion under an addition reaction condition; and allowing the resultant to react with the compound represented by the chemical formula (34). In the present invention, the amount of the compound represented by the chemical formula (34) to be used is 0.001 to 100 times mole, or preferably 0.01 to 10 times mole with respect to the unit represented by the chemical formula (33).

A solvent to be used in the reaction of the present invention is not particularly limited as long as it is inactive to the reaction and dissolves the staring material to some extent. Examples of such a solvent include: aliphatic hydrocarbons such as hexane, cyclohexane, heptane, ligroin, and petroleum ether; aromatic hydrocarbons such as benzene, toluene, and xylene; ethers such as diethyl ether, diisopropyl ether, tetrahydrofuran, dioxane, dimethoxyethane, and diethyleneglycoldimethylether; and amides such as formamide, N,N-dimethylformamide, N,N-dimethylacetamide, N-methyl-2-pyrrolidone, N-methylpyrrolidinone, and hexamethylphosphorotriamide. Of those, tetrahydrofuran is preferable.

The reaction is performed in the presence of a base. Examples of a base to be used include: lithium alkyls such as methyl lithium and butyl lithium; alkali metal disilazides such as lithium hexamethyl disilazide, sodium hexamethyl disilazide, and potassium hexamethyl disilazide; and lithium amides such as lithium diisopropylamide and lithium dicyclohexylamide. Of those, lithium diisopropylamide is preferable. In addition, the amount of the base to be used in the present invention is 0.001 to 100 times mole, or preferably 0.01 to 10 times mole with respect to the unit represented by the chemical formula (33).

In the method of the present invention, a reaction temperature is generally in the range of −78° C. to 40° C., or preferably in the range of −78° C. to 30° C.

In the method of the present invention, a reaction time is generally in the range of 10 minutes to 24 hours. The reaction time is particularly preferably in the range of 10 minutes to 4 hours.

The polyhydroxyalkanoate having a unit represented by the chemical formula (33) included in the chemical formula (5) can be produced according to the above production method.

In addition, a polymer produced by means of a conventionally known method can be arbitrarily used as the polyhydroxyalkanoate containing a unit represented by one of the chemical formulae (33) and (36) to be used in the present invention. Examples of a polyhydroxyalkanoate represented by the chemical formula (68) included in the chemical formulae (33) and (35) include organism-produced polyesters typified by poly-3-hydroxybutyrate ($k_{68}$ in the chemical formula (68) represents 0), poly-3-hydroxyvalerate ($k_{68}$ in the chemical formula (68) represents 1), and the like. For example, JP-B H07-14352 and JP-B H08-19227 each disclose a method of producing a copolymer of 3-hydroxybutyrate and 3-hydroxyvalerate. In addition, JP-A H05-93049 and JP-A H07-265065 each disclose a method of producing a copolymer of 3-hydroxybutyrate and 3-hydroxyhexanoate ($k_{68}$ represents 2). In addition, JP 2642937 B discloses a method of producing a copolymer containing a 3-hydroxyalkanoate having 6 to 12 carbon atoms (that is, from 3-hydroxyhexanoate to 3-hydorxyundecanoate). JP-A 2002-306190 discloses a method of producing a homopolymer of poly-3-hydroxybutyrate. A polyhydroxyalkanoate can be produced in the present invention by means of a similar method. In addition, a polyhydroxyalkanoate containing a unit represented by the chemical formula (69) included in the chemical formulae (33) and (35) can be produced by means of a method disclosed in International Journal of Biological Macromolecules 12 (1990) 92. In addition, a method of producing a polyhydroxyalkanoate containing a unit represented by the chemical formula (70) or (71) included in the chemical formulae (33) and (35) is disclosed in JP-A 2001-288256 and JP-A 2003-319792. A polyhydroxyalkanoate can be produced in the present invention by means of a similar method.

(68)

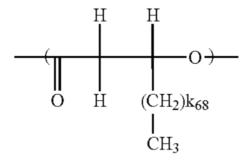

($k_{68}$ represents an integer selected from 0 to 8. When multiple units exist, $k_{68}$'s each independently have the above meaning for each unit.)

(69)

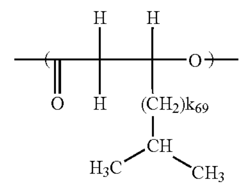

($k_{69}$ represents an integer selected from 0 to 7. When multiple units exist, $k_{69}$'s each independently have the above meaning for each unit.)

(70)

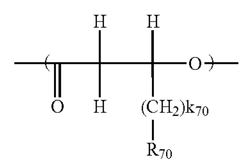

($k_{70}$ represents an integer selected from 1 to 8. $R_{70}$ represents a substituent containing a residue having any one of a phenyl structure and a thienyl structure. When multiple units exist, $k_{70}$ and $R_{70}$ each independently have the above meaning for each unit.)

(71)

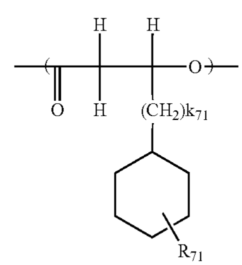

(In the formula, $R_{71}$ represents a substituent to a cyclohexyl group selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group. $k_{71}$ represents an integer selected from 0 to 8. When multiple units exist, $k_{71}$ and $R_{71}$ each independently have the above meaning for each unit.)

In addition, $R_{70}$ in the chemical formula (70), that is, a residue having any one of a phenyl structure and a thienyl structure is selected from the group of residues represented by the chemical formulae (72), (73), (74), (75), (76), (77), (78), (79), (80), (81), and (82).

Here, the chemical formula (72) represents a group of unsubstituted or substituted phenyl groups.

(72)

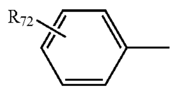

(In the formula, $R_{72}$ represents a substituent to an aromatic ring selected from an H atom, a halogen atom, a CN group, an $NO_2$ group, a $CH_3$ group, a $C_2H_5$ group, a $C_3H_7$ group, a $CH{=}CH_2$ group, $COOR_{72a}$ ($R_{72a}$ represents an H atom, an Na atom, or a K atom.), a $CF_3$ group, a $C_2F_5$ group, and a $C_3F_7$ group. When multiple units exist, $R_{72}$'s may be different for each unit.)

The chemical formula (73) represents a group of unsubstituted or substituted phenoxy groups.

(73)

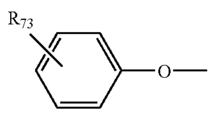

(In the formula, $R_{73}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group. When multiple units exist, $R_{73}$'s may be different for each unit.)

The chemical formula (74) represents a group of unsubstituted or substituted benzoyl groups.

(74)

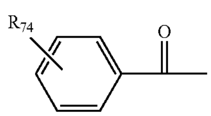

(In the formula, $R_{74}$ represents a substituent to an aromatic ring selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group. When multiple units exist, $R_{74}$'s may be different for each unit.)

The chemical formula (75) represents a group of unsubstituted or substituted phenylsulfanyl groups.

(75)

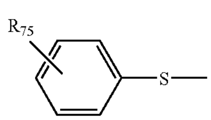

(In the formula, $R_{75}$ represents a substituent to an aromatic ring selected from an H atom, a halogen atom, a CN group, an $NO_2$ group, $COOR_{75a}$, $SO_2R_{75b}$ ($R_{75a}$ represents H, Na, K, $CH_3$, or $C_2H_5$, and $R_{75b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{75}$'s may be different for each unit.)

The chemical formula (76) represents a group of unsubstituted or substituted (phenylmethyl)sulfanyl groups.

(76)

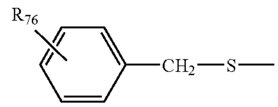

(In the formula, $R_{76}$ represents a substituent to an aromatic ring selected from an H atom, a halogen atom, a CN group, an $NO_2$ group, $COOR_{76a}$, $SO_2R_{76b}$ ($R_{76a}$ represents H, Na, K, $CH_3$, or $C_2H_5$, and $R_{76b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{76}$'s may be different for each unit.)

The chemical formula (77) represents a 2-thienyl group.

(77)

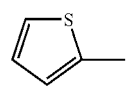

The chemical formula (78) represents a 2-thienylsulfanyl group.

(78)

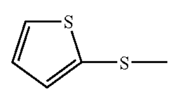

The chemical formula (79) represents a 2-thienylcarbonyl group.

(79)

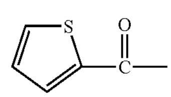

The chemical formula (80) represents a group of unsubstituted or substituted phenylsulfinyl groups.

(80)

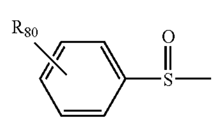

(In the formula, $R_{80}$ represents a substituent to an aromatic ring selected from an H atom, a halogen atom, a CN group, an $NO_2$ group, $COOR_{80a}$, $SO_2R_{80b}$ ($R_{80a}$ represents H, Na, K, $CH_3$, or $C_2H_5$, and $R_{80b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{80}$'s may be different for each unit.)

The chemical formula (81) represents a group of unsubstituted or substituted phenylsulfonyl groups.

(81)

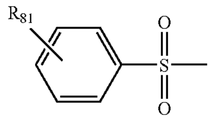

(In the formula, $R_{81}$ represents a substituent to an aromatic ring selected from an H atom, a halogen atom, a CN group, an $NO_2$ group, $COOR_{81a}$, $SO_2R_{81b}$ ($R_{81a}$ represents H, Na, K, $CH_3$, or $C_2H_5$, and $R_{81b}$ represents OH, ONa, OK, a halogen atom, $OCH_3$, or $OC_2H_5$.), a $CH_3$ group, a $C_2H_5$ group, a $C_3H_7$ group, a $(CH_3)_2$—CH group, and a $(CH_3)_3$—C group. When multiple units exist, $R_{81}$'s may be different for each unit.)

The chemical formula (82) represents a group of unsubstituted or substituted (phenylmethyl)oxy groups.

(82)

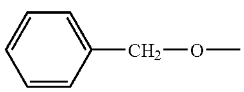

The novel polyhydroxyalkanoate and the method of producing the same shown in the present invention are provided by using a polyhydroxyalkanoate containing a unit represented by the chemical formula (33) or (35) including the chemical formulae (68), (69), (70), and (71) as a starting material. However, the present invention is not limited to the method described above.

The molecular weight of the polyhydroxyalkanoate of the present invention can be measured as a relative molecular weight or an absolute molecular weight. The molecular weight can be simply measured by means of, for example, gel permeation chromatography (GPC). A specific measurement method by means of GPC is as follows. The polyhydroxyalkanoate is dissolved in advance into a solvent into which the polyhydroxyalkanoate is soluble, and the molecular weight is measured in a mobile phase of the same solvent. A differential refractometer (RI) or an ultraviolet (UV) detector can be used as a detector depending on the polyhydroxyalkanoate to be measured. The molecular weight is determined as a result of relative comparison with a standard sample (such as polystyrene or polymethyl methacrylate). The solvent can be selected from solvents into each of which a polymer is soluble such as dimethylformamide (DMF), dimethyl sulfoxide (DMSO), chloroform, tetrahydrofuran (THF), toluene, and hexafluoroisopropanol (HFIP). In the case of a polar solvent, the molecular weight can be measured through addition of a salt.

The number average molecular weight of a polyhydroxyalkanoate to be produced by the present invention can vary widely by changing conditions including a reaction time, a reaction temperature, and a reaction time. The optimum number average molecular weight of the polyhydroxyalkanoate, which varies depending on a target function, is in the range of 1,000 to 1,000,000 when one attempts to use the polyhydroxyalkanoate for a medical soft member or the like. In addition, a polyhydroxyalkanoate having a ratio (Mw/Mn) between a weight average molecular weight (Mw) and the number average molecular weight (Mn) in the range of 1 to 10 is preferable.

A reaction solvent, a reaction temperature, a reaction time, a purification method, and the like in a chemical reaction of the present invention are not limited to those described above.

EXAMPLES

Hereinafter, the present invention will be described in more detail by way of examples. However, the present invention is not limited to these examples.

In each of Examples 1 to 4, a microorganism is used to produce a polyhydroxyalkanoate. The microorganisms used in those examples are a Ralstonia eutropha TB64 strain (disclosed in JP-A 2000-166587) and a *Pseudomonas cichorii* YN2 strain (FERM BP-7375, disclosed in JP-A 2001-288256). Those 2 microorganisms are deposited in the National Institute of Advanced Industrial Science and Technology, International Patent Organism Depositary.

The mineral salt medium (M9 medium) used in each of Examples 1 to 4 has the following composition. M9 medium composition (in 1 L)

| | |
|---|---|
| $Na_2HPO_4$ | 6.2 g |
| $KH_2PO_4$ | 3.0 g |
| NaCl | 0.5 g |
| $NH_4Cl$ | 1.0 g |
| Water | Balance |
| (pH 7.0) | |

For better proliferation of a microorganism and better production of a polyhydroxyalkanoate at the time of culture, the above mineral salt is added with about 0.3% (volume/volume) of a trace component solution shown below.

(Trace component solution composition: unit g/L) Nitrilotriacetic acid: 1.5; $MgSO_4$: 3.0; $MnSO_4$: 0.5; NaCl: 1.0; $FeSO_4$: 0.1; $CaCl_2$: 0.1; $CoCl_2$: 0.1; $ZnSO_4$: 0.1; $CuSO_4$: 0.1; AlK$(SO_4)_2$: 0.1; $H_3BO_3$: 0.1; $Na_2MoO_4$: 0.1; $NiCl_2$: 0.1

Example 1

(Synthesis of poly-3-Hydroxybutyric Acid Represented by Chemical Formula (101))

(101)

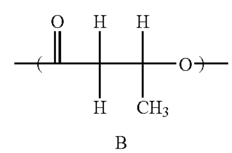

Poly-3-hydroxybutyric acid represented by the chemical formula (101) was synthesized by means of the method disclosed in Example 1 of JP-A 2002-306190.

A colony of a TB 64 strain on an M9 agar medium containing 0.1% of sodium malate was inoculated in 50 ml of an M9 medium containing 0.5% of sodium malate in a 500-mL shaking flask, and the whole was shake cultured at 30° C. 24 hours after that, 5 ml of the culture solution were added to 1 L of a production medium prepared by incorporating 0.5% of sodium malate into an M9 medium with the concentration of only $NH_4Cl$ as a nitrogen source reduced to 1/10, and the whole was shaken in the same manner to accumulate PHB in the cells. 48 hours after that, the cells were recovered by centrifugal separation, washed with methanol, and then freeze-dried. After the dried cells had been weighed, chloroform was added, and the whole was stirred at 60° C. for 24 hours to extract a polymer.

After filtrating the extracted chloroform solution through a filter, it was concentrated by means of an evaporator. After that, a portion precipitated and solidified with cold methanol was collected and dried under reduced pressure to prepare 1.83 g of a polymer per L of the production medium. NMR analysis was performed under the following conditions to determine the structure of the resultant polymer.

<Measuring equipment> FT-NMR: Bruker DPX 400

Resonance frequency: $^1H$=400 MHz

<Measurement conditions> Measured nuclear species: $^1H$

Solvent used: $CDCl_3$

Measurement temperature: room temperature

The analysis confirmed that the resultant polymer was a polyhydroxyalkanoate containing a unit of 3-hydroxybutyric acid represented by the chemical formula (1). The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, polystyrene conversion). As a result, the resultant polyhydroxyalkanoate was found to have a number average molecular weight Mn of 549,500 and a weight average molecular weight Mw of 1,263,900.

45.6 g of the polyhydroxyalkanoate to be used in each of Examples 5 to 8 was prepared from 50 L of the production medium by means of the above method.

Example 2

Synthesis of poly-3-hydroxy-5-phenylvaleric acid Represented by Chemical Formula (102)

(102)

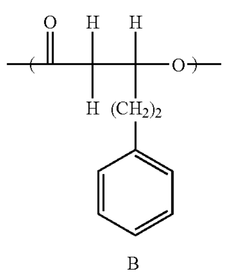

Poly-3-hydroxy-5-phenylvaleric acid represented by the chemical formula (102) was synthesized by means of the method disclosed in Example 1 of JP-A 2003-319792. 200 mL of an M9 medium containing 0.5% (weight/volume (w/v)) of polypeptone (Wako Pure Chemical Industries, Ltd.) and 0.1% (weight/volume (w/v)) of 5-phenylvaleric acid were prepared as a production medium. 1 mL of a culture solution prepared in advance by shake culturing a *Pseudomonas cichorii* YN2 strain in an M9 medium containing 0.5% of polypeptone at 30° C. for 8 hours was added to the production medium, and the whole was cultured in a 500-mL shaking flask at 30° C. for 24 hours. After the culture, the cells were recovered by centrifugal separation, washed with methanol, and then freeze-dried. After the dried cells had been weighed, chloroform was added, and the whole was stirred at 50° C. for 24 hours to extract a polymer. After filtrating the extracted chloroform solution through a filter, it was concentrated by means of an evaporator. After that, a portion precipitated and solidified with cold methanol was collected and dried under reduced pressure to prepare 0.60 g of a polymer per L of the production medium. NMR analysis was performed under the same conditions as those of Example 1 to determine the structure of the resultant polymer. The analysis confirmed that the resultant polymer was substantially a homopolymer of a unit of poly-3-hydroxy-5-phenylvaleric acid represented by the chemical formula (102) as a monomer unit. The average molecular weight of the resultant polyhydroxyalkanoate was measured under the same conditions as those of Example 1. As a result, the resultant polyhydroxyalkanoate was found to have a number average molecular weight Mn of 91,000 and a weight average molecular weight Mw of 172,900.

60.1 g of the polyhydroxyalkanoate to be used in each of Examples 9 to 12 was prepared from 100 L of the production medium by means of the above method.

Example 3

Synthesis of poly-3-hydroxy-5-phenoxyvaleric acid Represented by Chemical Formula (103)

(103)

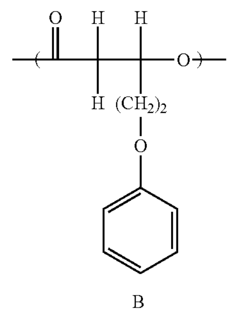

Poly-3-hydroxy-5-phenylvaleric acid represented by the chemical formula (103) was synthesized by means of the method disclosed in Example 4 of JP-A 2003-319792.

200 mL of an M9 medium containing 0.5% (weight/volume (w/v)) of polypeptone (Wako Pure Chemical Industries, Ltd.) and 0.1% (weight/volume (w/v)) of 5-phenoxyvaleric acid was prepared as a production medium. 1 mL of a culture solution prepared in advance by shake culturing a *Pseudomonas cichorii* YN2 strain in an M9 medium containing 0.5% of polypeptone at 30° C. for 8 hours was added to the production medium, and the whole was cultured in a 500-mL shaking flask at 30° C. for 45 hours. After the culture, the cells were recovered by centrifugal separation, washed with methanol, and then freeze-dried. After the dried cells had been weighed, chloroform was added, and the whole was stirred at 50° C. for 24 hours to extract a polymer. After filtrating the extracted chloroform solution through a filter, it was concentrated by means of an evaporator. After that, a portion precipitated and solidified with cold methanol was collected and dried under reduced pressure to prepare 0.36 g of a polymer per L of the production medium. NMR analysis was performed under the same conditions as those of Example 1 to determine the structure of the resultant polymer. The analysis confirmed that the resultant polymer was substantially a homopolymer of a unit of poly-3-hydroxy-5-phenoxyvaleric acid represented by the chemical formula (103) as a monomer unit. The average molecular weight of the resultant polyhydroxyalkanoate was measured under the same conditions as those of Example 1. As a result, the resultant polyhydroxyalkanoate was found to have a number average molecular weight Mn of 201,000 and a weight average molecular weight Mw of 422,100.

44.8 g of the polyhydroxyalkanoate to be used in each of Examples 13 to 16 was prepared from 125 L of the production medium by means of the above method.

Example 4

Synthesis of poly-3-hydroxy-4-cyclohexylbutyric acid Represented by Chemical Formula (104)

(104)

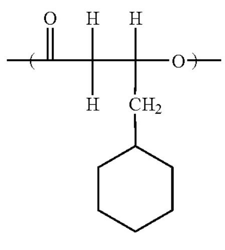

Poly-3-hydroxy-4-cyclohexylbutyric acid represented by the chemical formula (104) was synthesized by means of the method disclosed in Example 9 of JP-A 2003-319792.

200 mL of an M9 medium containing 0.5% (weight/volume (w/v)) of polypeptone (Wako Pure Chemical Industries, Ltd.) and 0.1% (weight/volume (w/v)) of 4-cyclohexylbutyric acid was prepared as a production medium. 1 mL of a culture solution prepared in advance by shake culturing a *Pseudomonas cichorii* YN2 strain in an M9 medium containing 0.5% of polypeptone at 30° C. for 8 hours was added to the production medium, and the whole was cultured in a 500-mL shaking flask at 30° C. for 48 hours. After the culture, the cells were recovered by centrifugal separation, washed with methanol, and then freeze-dried. After the dried cells had been weighed, chloroform was added, and the whole was stirred at 50° C. for 24 hours to extract a polymer. After filtrating the extracted chloroform solution through a filter, it was concentrated by means of an evaporator. After that, a portion precipitated and solidified with cold methanol was collected and dried under reduced pressure to prepare 0.48 g of a polymer per L of the production medium. NMR analysis was performed under the same conditions as those of Example 1 to determine the structure of the resultant polymer. The analysis confirmed that the resultant polymer was substantially a homopolymer of a unit of poly-3-hydroxy-4-cyclohexylbutyric acid represented by the chemical formula (104) as a monomer unit. The average molecular weight of the resultant polyhydroxyalkanoate was measured under the same conditions as those of Example 1. As a result, the resultant polyhydroxyalkanoate was found to have a number average molecular weight Mn of 70,500 and a weight average molecular weight Mw of 155,100.

47.9 g of the polyhydroxyalkanoate to be used in each of Examples 17 and 18 was prepared from 100 L of the production medium by means of the above method.

Example 5

10.00 g of the polyhydroxyalkanoate composed of the unit represented by the chemical formula (101) synthesized in Example 1 was placed in a round-bottomed flask, and 500 ml of THF was added to dissolve this. The flask was placed under a nitrogen atmosphere, and the solution was stirred at −78° C. Next, 58.08 ml (116.2 mmol) of a solution of 2 M of lithium diisopropylamide in THF was gradually added to the flask, and the whole was stirred at −78° C. for 30 minutes. Next, 19.82 g (232.3 mmol) of benzyl chloroformate was added to the flask, and the whole was stirred at room temperature for 30 minutes. After the completion of the reaction, the reaction solution was poured into 1,000 ml of an aqueous solution of ammonium chloride, and 500 ml of dichloromethane was added to extract the organic layer. The extracted organic layer was washed with 250 ml of water 3 times. After the organic layer had been collected, the solvent was distilled off to collect a crude polymer. Next, the polymer was dissolved into 60 ml of THF, and reprecipitated in methanol in an amount 50 times that of THF necessary for the dissolution. The precipitate was collected and dried under reduced pressure to prepare 8.44 g of a polymer. NMR analysis was performed under the same conditions as those of Example 1 to determine the structure of the resultant polymer. The analysis confirmed that the polymer was a polyhydroxyalkanoate containing a unit represented by the following chemical formula (105) as a monomer unit. The analysis also confirmed that an A unit accounted for 10 mol % of the monomer unit and a B unit accounted for 90 mol % thereof.

(105)

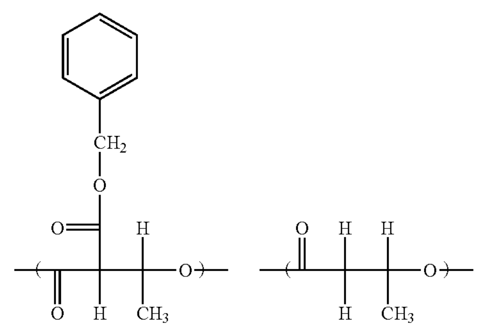

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, polystyrene conversion). As a result, the resultant polyhydroxyalkanoate was found to have a number average molecular weight Mn of 325,400 and a weight average molecular weight Mw of 764,700.

5.00 g of the polyhydroxyalkanoate copolymer represented by the chemical formula (105) synthesized here was dissolved into 500 ml of a mixed solvent of dioxane-ethanol (75:25), and 1.10 g of a 5% palladium/carbon catalyst was added to the solution. The inside of the reaction system was filled with hydrogen, and the whole was stirred at room temperature for 1 day. After the completion of the reaction, in order to remove the catalyst, the resultant was filtered through a 0.25-μm membrane filter to collect a reaction solution. After the solution had been concentrated, the concentrate was dissolved into chloroform, and reprecipitated in methanol in an amount 10 times that of chloroform. The resultant polymer was collected and dried under reduced pressure to prepare 3.59 g of a polymer. NMR analysis was performed under the same conditions as those of Example 6 to determine the structure of the resultant polymer. The analysis confirmed that the polymer was a polyhydroxyalkanoate copolymer containing a unit represented by the following chemical formula (106) as a monomer unit. The analysis also confirmed that a C unit accounted for 10 mol % of the monomer unit and a D unit accounted for 90 mol % thereof.

(106)

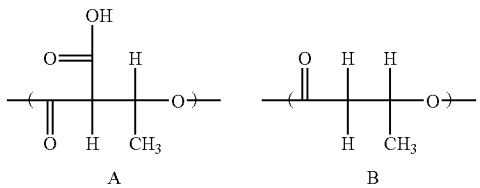

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, polystyrene conversion). As a result, the resultant polyhydroxyalkanoate was found to have a number average molecular weight Mn of 298,000 and a weight average molecular weight Mw of 715,200.

Furthermore, 30 mg of the polyhydroxyalkanoate synthesized here was placed in a 100-ml round-bottomed flask, and 2.1 ml of chloroform and 0.7 ml of methanol were added to dissolve this. 0.5 ml of a 2-mol/L trimethylsilyldiazomethane-hexane solution was added to the solution, and the whole was stirred at room temperature for 1 hour. After the completion of the reaction, the solvent was distilled off to collect a polymer. The polymer was washed with 50 ml of methanol to collect a polymer. The polymer was dried under reduced pressure to prepare 29 mg of a polyhydroxyalkanoate. The resultant polyhydroxyalkanoate was subjected to NMR analysis in the same manner as in Example 1. The analysis confirmed that a carboxyl group of the C unit was transformed into methyl carboxylate, and that the resultant polymer can be esterified again:

Example 6

9.40 g of a polymer was prepared in the same manner as in Example 5 except that 26.61 g (232.3 mmol) of benzyl bromoacetate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (107). The analysis also confirmed that an A unit accounted for 11 mol % of the monomer unit and a B unit accounted for 89 mol % thereof.

(107)

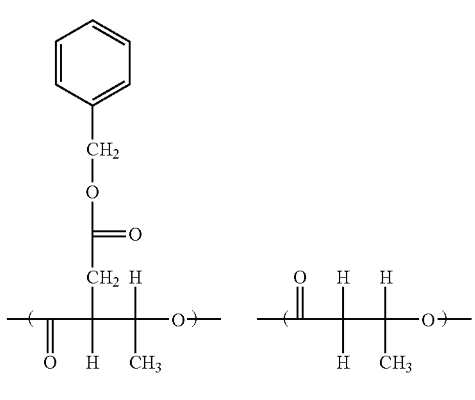

The average molecular weight of the resultant polyhydroxyalkanoate was measured under the same conditions as those of Example 1. As a result, the resultant polyhydroxyalkanoate was found to have a number average molecular weight Mn of 300,300 and a weight average molecular weight Mw of 723,700.

The above polymer was subjected to hydrogenolysis in the same manner as in Example 5 to prepare 3.66 g of a polymer. The resultant polymer was subjected to NMR analysis under the same conditions as those of Example 1. The analysis confirmed that the polymer was a polyhydroxyalkanoate copolymer containing a unit represented by the following chemical formula (108) as a monomer unit. The analysis also confirmed that a C unit accounted for 11 mol % of the monomer unit and a D unit accounted for 89 mol % thereof.

(108)

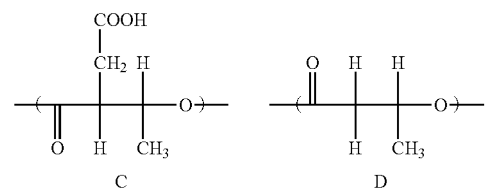

The average molecular weight of the resultant polyhydroxyalkanoate was measured under the same conditions as those of Example 1. As a result, the resultant polyhydroxyalkanoate was found to have a number average molecular weight Mn of 286,000 and a weight average molecular weight Mw of 700,700.

Example 7

8.49g of a polymer was prepared in the same manner as in Example 5 except that 22.66 g(232.3 mmol) of ethyl 4-bromobutyrate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (109). The analysis also confirmed that an A unit accounted for 10 mol % of the monomer unit and a B unit accounted for 90 mol % thereof.

(109)

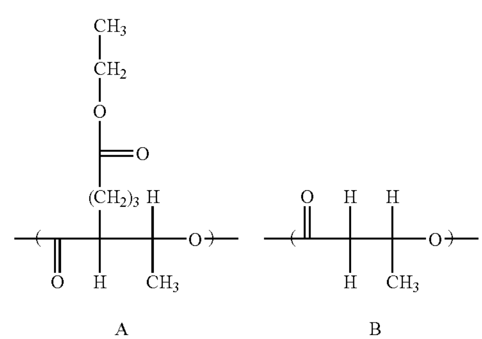

The average molecular weight of the resultant polyhydroxyalkanoate was measured under the same conditions as those of Example 1. As a result, the resultant polyhydroxyalkanoate was found to have a number average molecular weight Mn of 300,300 and a weight average molecular weight Mw of 723,700.

The above polymer was subjected to hydrogenolysis in the same manner as in Example 5 to prepare 3.93 g of a polymer. The resultant polymer was subjected to NMR analysis under the same conditions as those of Example 1. The analysis confirmed that the polymer was a polyhydroxyalkanoate copolymer containing a unit represented by the following chemical formula (110) as a monomer unit. The analysis also confirmed that a C unit accounted for 10 mol % of the monomer unit and a D unit accounted for 90 mol % thereof.

(110)

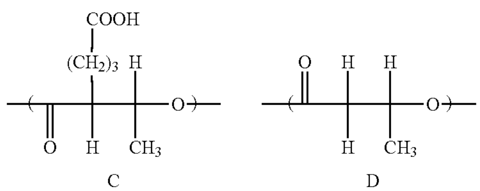

The average molecular weight of the resultant polyhydroxyalkanoate was measured under the same conditions as those of Example 1. As a result, the resultant polyhydroxyalkanoate was found to have a number average molecular weight Mn of 286,000 and a weight average molecular weight Mw of 700,700.

Example 8

8.83 g of a polymer was prepared in the same manner as in Example 5 except that 29.17 g (232.3 mmol) of ethyl 8-bromooctanoate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (111). The analysis also confirmed that an A unit accounted for 9 mol % of the monomer unit and a B unit accounted for 91 mol % thereof.

(111)

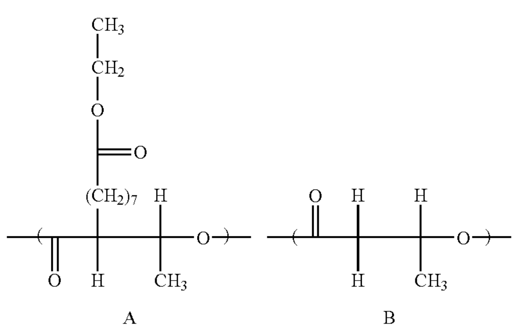

The average molecular weight of the resultant polyhydroxyalkanoate was measured under the same conditions as those of Example 1. As a result, the resultant polyhydroxyalkanoate was found to have a number average molecular weight Mn of 321,000 and a weight average molecular weight Mw of 776,800.

The above polymer was subjected to hydrogenolysis in the same manner as in Example 5 to prepare 3.85 g of a polymer. The resultant polymer was subjected to NMR analysis under the same conditions as those of Example 1. The analysis confirmed that the polymer was a polyhydroxyalkanoate copolymer containing a unit represented by the following chemical formula (112) as a monomer unit. The analysis also confirmed that a C unit accounted for 9 mol % of the monomer unit and a D unit accounted for 91 mol % thereof.

(112)

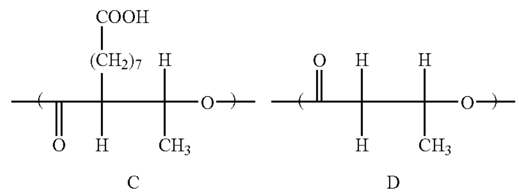

The average molecular weight of the resultant polyhydroxyalkanoate was measured under the same conditions as those of Example 1. As a result, the resultant polyhydroxyalkanoate was found to have a number average molecular weight Mn of 298,100 and a weight average molecular weight Mw of 715,400.

Example 9

8.51 g of a polymer was prepared in the same manner as in Example 5 except that 10.00 g of the polyhydroxyalkanoate composed of the unit represented by the chemical formula (102) synthesized in Example 2 instead of the polyhydroxyalkanoate composed of the unit represented by the chemical formula (101), 28.38 ml (56.8 mmol) of a solution of 2 M of lithium diisopropylamide in THF, and 9.68 g (113.5 mmol) of benzyl chloroformate were used. The resultant polymer was subjected to NMR analysis under the same conditions as those of Example 1. The analysis confirmed that the polymer was a polyhydroxyalkanoate containing a unit represented by the following chemical formula (113). The analysis also confirmed that an A unit accounted for 12 mol % of the monomer unit and a B unit accounted for 88 mol % thereof.

(113)

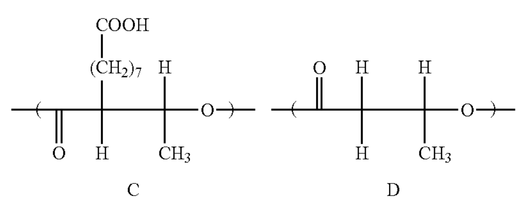

The average molecular weight of the resultant polyhydroxyalkanoate was measured under the same conditions as those of Example 1. As a result, the resultant polyhydroxyalkanoate was found to have a number average molecular weight Mn of 72,500 and a weight average molecular weight Mw of 141,400.

The above polymer was subjected to hydrogenolysis in the same manner as in Example 5 to prepare 3.72 g of a polymer. The resultant polymer was subjected to NMR analysis under the same conditions as those of Example 1. The analysis confirmed that the polymer was a polyhydroxyalkanoate copolymer containing a unit represented by the following chemical formula (114) as a monomer unit. The analysis also confirmed that a C unit accounted for 12 mol % of the monomer unit and a D unit accounted for 88 mol % thereof.

(114)

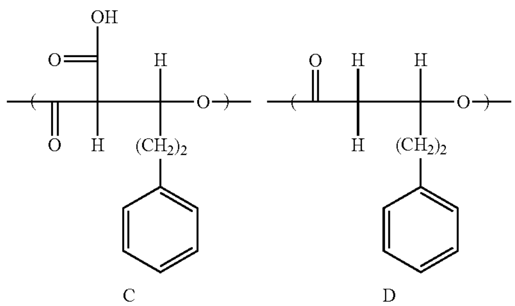

The average molecular weight of the resultant polyhydroxyalkanoate was measured under the same conditions as those of Example 1. As a result, the resultant polyhydroxyalkanoate was found to have a number average molecular weight Mn of 69,500 and a weight average molecular weight Mw of 139,700.

Example 10

8.37 g of a polymer was prepared in the same manner as in Example 9 except that 13.00 g (113.5 mmol) of benzyl bromoacetate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (115). The analysis also confirmed that an A unit accounted for 12 mol % of the monomer unit and a B unit accounted for 88 mol % thereof.

(115)

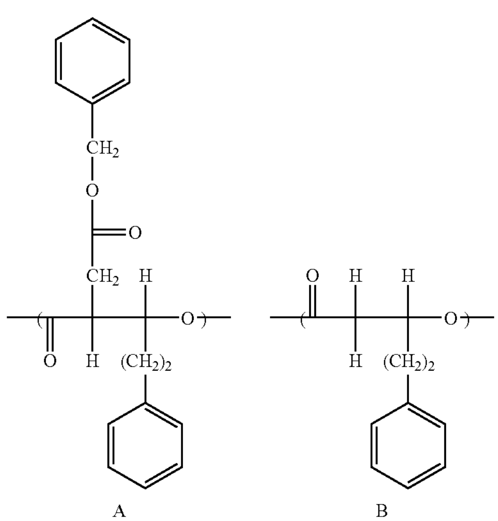

The average molecular weight of the resultant polyhydroxyalkanoate was measured under the same conditions as those of Example 1. As a result, the resultant polyhydroxyalkanoate was found to have a number average molecular weight Mn of 71,000 and a weight average molecular weight Mw of 131,400.

The above polymer was subjected to hydrogenolysis in the same manner as in Example 5 to prepare 3.87 g of a polymer. The resultant polymer was subjected to NMR analysis under the same conditions as those of Example 1. The analysis confirmed that the polymer was a polyhydroxyalkanoate copolymer containing a unit represented by the following chemical formula (116) as a monomer unit. The analysis also confirmed that a C unit accounted for 12 mol % of the monomer unit and a D unit accounted for 88 mol % thereof.

(116)

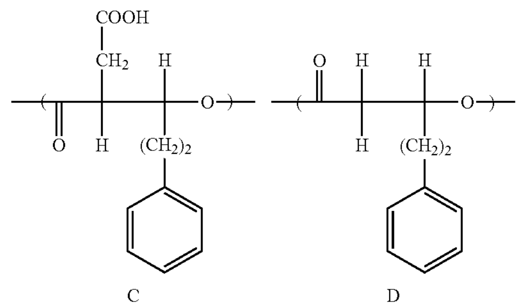

The average molecular weight of the resultant polyhydroxyalkanoate was measured under the same conditions as those of Example 1. As a result, the resultant polyhydroxyalkanoate was found to have a number average molecular weight Mn of 68,000 and a weight average molecular weight Mw of 132,600.

Example 11

7.80 g of a polymer was prepared in the same manner as in Example 9 except that 9.48 g (113.5 mmol) of methyl 3-bromopropionate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (117). The analysis also confirmed that an A unit accounted for 11 mol % of the monomer unit and a B unit accounted for 89 mol % thereof.

(117)

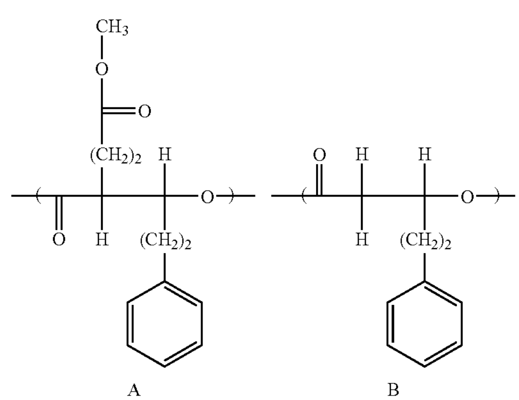

The average molecular weight of the resultant polyhydroxyalkanoate was measured under the same conditions as those of Example 1. As a result, the resultant polyhydroxyalkanoate was found to have a number average molecular weight Mn of 68,500 and a weight average molecular weight Mw of 130,800.

The above polymer was subjected to hydrogenolysis in the same manner as in Example 5 to prepare 4.01 g of a polymer. The resultant polymer was subjected to NMR analysis under the same conditions as those of Example 1. The analysis confirmed that the polymer was a polyhydroxyalkanoate copolymer containing a unit represented by the following chemical formula (118) as a monomer unit. The analysis also confirmed that a C unit accounted for 11 mol % of the monomer unit and a D unit accounted for 89 mol % thereof.

(118)

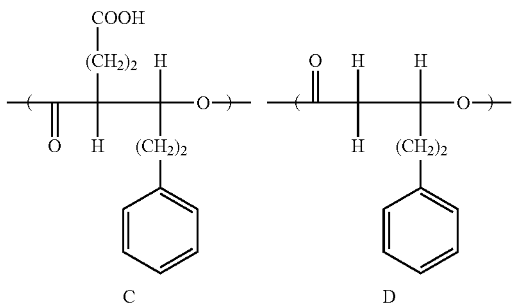

The average molecular weight of the resultant polyhydroxyalkanoate was measured under the same conditions as those of Example 1. As a result, the resultant polyhydroxyalkanoate was found to have a number average molecular weight Mn of 67,000 and a weight average molecular weight Mw of 127,300.

Example 12

7.87 g of a polymer was prepared in the same manner as in Example 9 except that 12.86 g (113.5 mmol) of ethyl 6-bromohexanoate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (119). The analysis also confirmed that an A unit accounted for 8 mol % of the monomer unit and a B unit accounted for 92 mol % thereof.

(119)

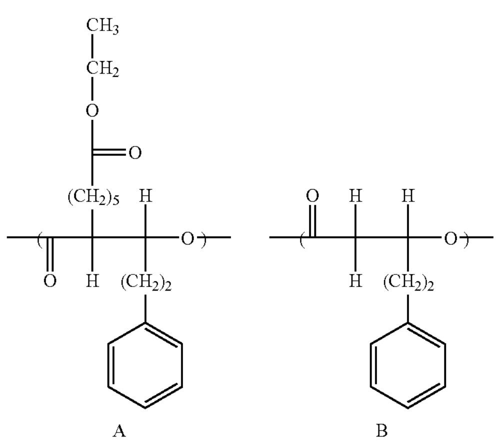

The average molecular weight of the resultant polyhydroxyalkanoate was measured under the same conditions as those of Example 1. As a result, the resultant polyhydroxyalkanoate was found to have a number average molecular weight Mn of 71,000 and a weight average molecular weight Mw of 134,900.

The above polymer was subjected to hydrogenolysis in the same manner as in Example 5 to prepare 3.95 g of a polymer. The resultant polymer was subjected to NMR analysis under the same conditions as those of Example 1. The analysis confirmed that the polymer was a polyhydroxyalkanoate copolymer containing a unit represented by the following chemical formula (120) as a monomer unit. The analysis also confirmed that a C unit accounted for 8 mol % of the monomer unit and a D unit accounted for 92 mol % thereof.

(120)

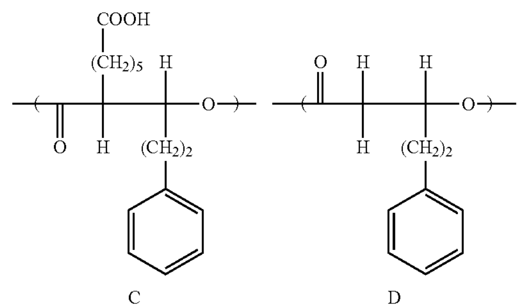

The average molecular weight of the resultant polyhydroxyalkanoate was measured under the same conditions as those of Example 1. As a result, the resultant polyhydroxyalkanoate was found to have a number average molecular weight Mn of 68,500 and a weight average molecular weight Mw of 133,600.

Example 13

8.29 g of a polymer was prepared in the same manner as in Example 5 except that 10.00 g of the polyhydroxyalkanoate composed of the unit represented by the chemical formula (103) synthesized in Example 3 instead of the polyhydroxyalkanoate composed of the unit represented by the chemical formula (101) in Example 5, 26.01 ml (52.0 mmol) of a solution of 2 M of lithium diisopropylamide in THF, and 8.88 g (104.1 mmol) of benzyl chloroformate were used. The resultant polymer was subjected to NMR analysis under the same conditions as those of Example 1. The analysis confirmed that the polymer was a polyhydroxyalkanoate containing a unit represented by the following chemical formula (121). The analysis also confirmed that an A unit accounted for 11 mol % of the monomer unit and a B unit accounted for 89 mol % thereof.

(121)

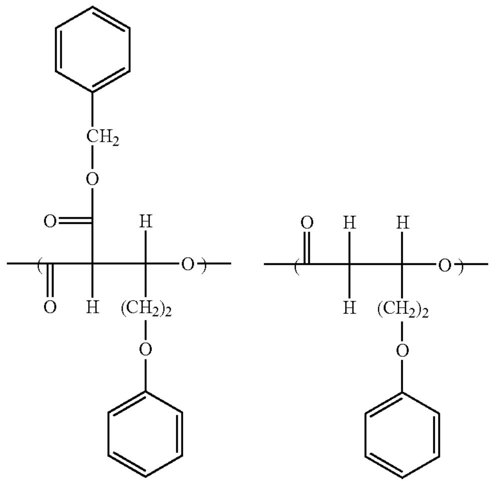

A B

The average molecular weight of the resultant polyhydroxyalkanoate was measured under the same conditions as those of Example 1. As a result, the resultant polyhydroxyalkanoate was found to have a number average molecular weight Mn of 131,500 and a weight average molecular weight Mw of 282,700.

The above polymer was subjected to hydrogenolysis in the same manner as in Example 5 to prepare 3.75 g of a polymer. The resultant polymer was subjected to NMR analysis under the same conditions as those of Example 1. The analysis confirmed that the polymer was a polyhydroxyalkanoate copolymer containing a unit represented by the following chemical formula (122) as a monomer unit. The analysis also confirmed that a C unit accounted for 11 mol % of the monomer unit and a D unit accounted for 89 mol % thereof.

(122)

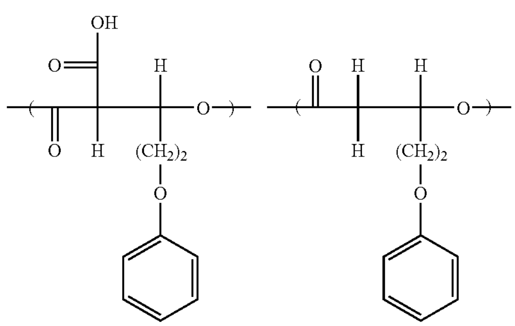

C D

The average molecular weight of the resultant polyhydroxyalkanoate was measured under the same conditions as those of Example 1. As a result, the resultant polyhydroxyalkanoate was found to have a number average molecular weight Mn of 121,000 and a weight average molecular weight Mw of 260,200.

Example 14

7.70 g of a polymer was prepared in the same manner as in Example 13 except that 11.92 g (104.1 mmol) of benzyl bromoacetate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (123). The analysis also confirmed that an A unit accounted for 11 mol % of the monomer unit and a B unit accounted for 89 mol % thereof.

(123)

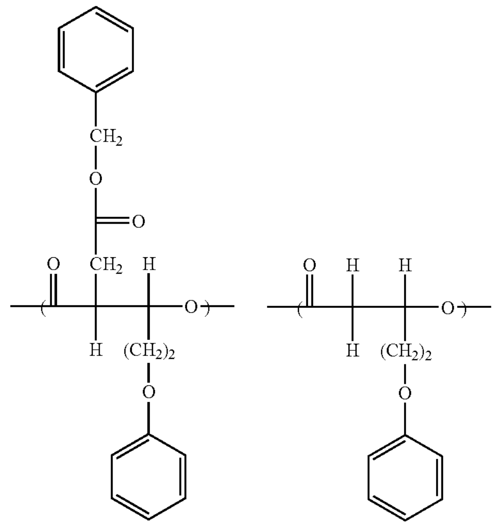

A B

The average molecular weight of the resultant polyhydroxyalkanoate was measured under the same conditions as those of Example 1. As a result, the resultant polyhydroxyalkanoate was found to have a number average molecular weight Mn of 126,500 and a weight average molecular weight Mw of 265,700.

The above polymer was subjected to hydrogenolysis in the same manner as in Example 5 to prepare 3.86 g of a polymer. The resultant polymer was subjected to NMR analysis under the same conditions as those of Example 1. The analysis confirmed that the polymer was a polyhydroxyalkanoate copolymer containing a unit represented by the following chemical formula (124) as a monomer unit. The analysis also confirmed that a C unit accounted for 11 mol % of the monomer unit and a D unit accounted for 89 mol % thereof.

(124)

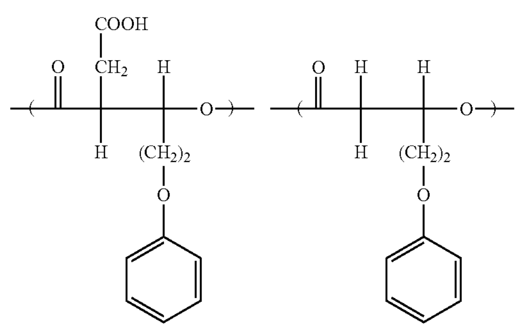

C D

The average molecular weight of the resultant polyhydroxyalkanoate was measured under the same conditions as those of Example 1. As a result, the resultant polyhydroxyalkanoate was found to have a number average molecular weight Mn of 116,500 and a weight average molecular weight Mw of 256,300.

Example 15

7.56 g of a polymer was prepared in the same manner as in Example 13 except that 10.88 g (104.1 mmol) of ethyl 5-bromovalerate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (125). The analysis also confirmed that an A unit accounted for 9 mol % of the monomer unit and a B unit accounted for 91 mol % thereof.

(125)

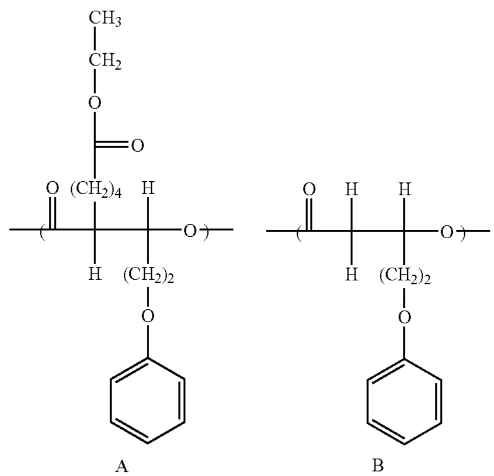

The average molecular weight of the resultant polyhydroxyalkanoate was measured under the same conditions as those of Example 1. As a result, the resultant polyhydroxyalkanoate was found to have a number average molecular weight Mn of 122,000 and a weight average molecular weight Mw of 270,800. The above polymer was subjected to hydrogenolysis in the same manner as in Example 5 to prepare 3.95 g of a polymer. The resultant polymer was subjected to NMR analysis under the same conditions as those of Example 1. The analysis confirmed that the polymer was a polyhydroxyalkanoate copolymer containing a unit represented by the following chemical formula (126) as a monomer unit. The analysis also confirmed that a C unit accounted for 9 mol % of the monomer unit and a D unit accounted for 91 mol % thereof.

(126)

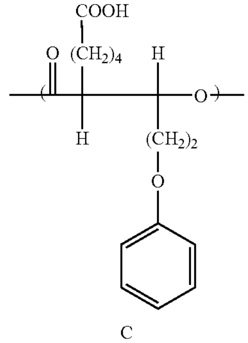

-continued

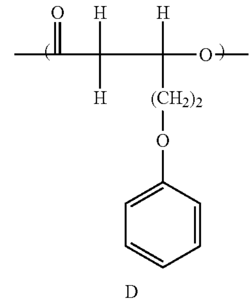

The average molecular weight of the resultant polyhydroxyalkanoate was measured under the same conditions as those of Example 1. As a result, the resultant polyhydroxyalkanoate was found to have a number average molecular weight Mn of 116,500 and a weight average molecular weight Mw of 256,300.

Example 16

7.60 g of a polymer was prepared in the same manner as in Example 13 except that 13.07 g (104.1 mmol) of ethyl 8-bromooctanoate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (127). The analysis also confirmed that an A unit accounted for 8 mol % of the monomer unit and a B unit accounted for 92 mol % thereof.

(127)

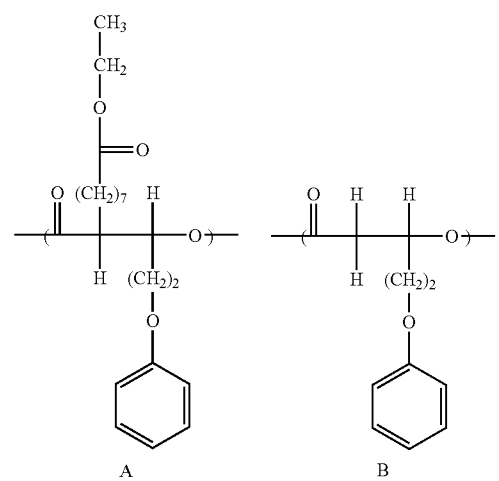

The average molecular weight of the resultant polyhydroxyalkanoate was measured under the same conditions as those of Example 1. As a result, the resultant polyhydroxyalkanoate was found to have a number average molecular weight Mn of 134,500 and a weight average molecular weight Mw of 289,200. The above polymer was subjected to hydrogenolysis in the same manner as in Example 5 to prepare 4.01 g of a polymer. The resultant polymer was subjected to NMR analysis under the same conditions as those of Example 1. The analysis confirmed that the polymer was a polyhydroxyalkanoate copolymer containing a unit represented by the following chemical formula (128) as a monomer unit. The analysis also confirmed that a C unit accounted for 8 mol % of the monomer unit and a D unit accounted for 92 mol % thereof.

(128)

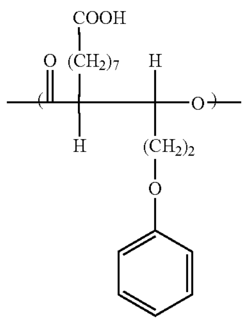

C

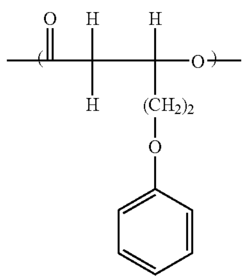

D

The average molecular weight of the resultant polyhydroxyalkanoate was measured under the same conditions as those of Example 1. As a result, the resultant polyhydroxyalkanoate was found to have a number average molecular weight Mn of 121,000 and a weight average molecular weight Mw of 266,200.

Example 17

7.66 g of a polymer was prepared in the same manner as in Example 6 except that 10.00 g of the polyhydroxyalkanoate composed of the unit represented by the chemical formula (104) synthesized in Example 4 instead of the polyhydroxyalkanoate composed of the unit represented by the chemical formula (101) in Example 5, 29.72 ml (59.4 mmol) of a solution of 2 M of lithium diisopropylamide in THF, and 10.14 g (118.9 mmol) of benzyl chloroformate were used. The resultant polymer was subjected to NMR analysis under the same conditions as those of Example 1. The analysis confirmed that the polymer was a polyhydroxyalkanoate containing a unit represented by the following chemical formula (129). The analysis also confirmed that an A unit accounted for 10 mol % of the monomer unit and a B unit accounted for 90 mol % thereof.

(129)

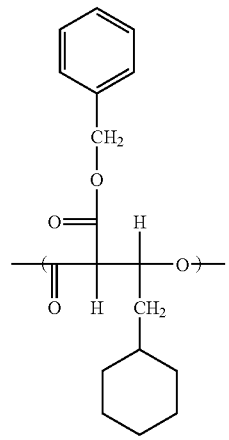

A

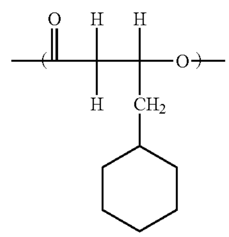

B

The average molecular weight of the resultant polyhydroxyalkanoate was measured under the same conditions as those of Example 1. As a result, the resultant polyhydroxyalkanoate was found to have a number average molecular weight Mn of 54,400 and a weight average molecular weight Mw of 11,700. The above polymer was subjected to hydrogenolysis in the same manner as in Example 5 to prepare 3.85 g of a polymer. The resultant polymer was subjected to NMR analysis under the same conditions as those of Example 1. The analysis confirmed that the polymer was a polyhydroxyalkanoate copolymer containing a unit represented by the following chemical formula (130) as a monomer unit. The analysis also confirmed that a C unit accounted for 10 mol % of the monomer unit and a D unit accounted for 90 mol % thereof.

(130)

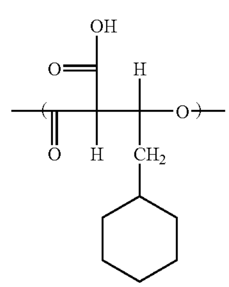

C

-continued

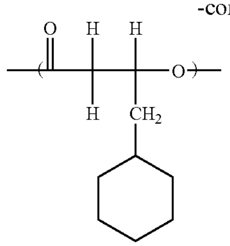

D

The average molecular weight of the resultant polyhydroxyalkanoate was measured under the same conditions as those of Example 1. As a result, the resultant polyhydroxyalkanoate was found to have a number average molecular weight Mn of 47,500 and a weight average molecular weight Mw of 103,600.

Example 18

7.27 g of a polymer was prepared in the same manner as in Example 17 except that 12.43 g (118.9 mmol) of ethyl 5-bromovalerate was used instead of benzyl chloroformate. The resultant polymer was subjected to NMR analysis under the same conditions as those of Example 1. The analysis confirmed that the polymer was a polyhydroxyalkanoate containing a unit represented by the following chemical formula (131). The analysis also confirmed that an A unit accounted for 9 mol % of the monomer unit and a B unit accounted for 91 mol % thereof.

(131)

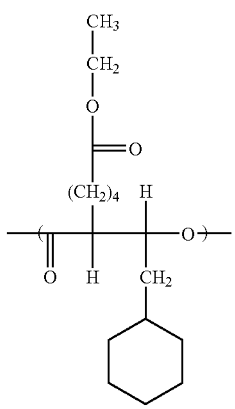

A

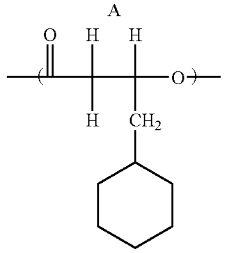

B

The average molecular weight of the resultant polyhydroxyalkanoate was measured under the same conditions as those of Example 1. As a result, the resultant polyhydroxyalkanoate was found to have a number average molecular weight Mn of 58,500 and a weight average molecular weight Mw of 128,700. The above polymer was subjected to hydrogenolysis in the same manner as in Example 5 to prepare 4.07 g of a polymer. The resultant polymer was subjected to NMR analysis under the same conditions as those of Example 1. The analysis confirmed that the polymer was a polyhydroxyalkanoate copolymer containing a unit represented by the following chemical formula (132) as a monomer unit. The analysis also confirmed that a C unit accounted for 9 mol % of the monomer unit and a D unit accounted for 91 mol % thereof.

(132)

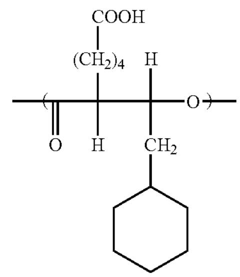

C

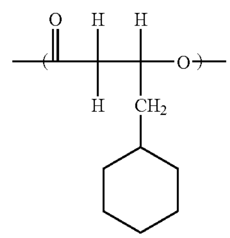

D

The average molecular weight of the resultant polyhydroxyalkanoate was measured under the same conditions as those of Example 1. As a result, the resultant polyhydroxyalkanoate was found to have a number average molecular weight Mn of 52,100 and a weight average molecular weight Mw of 114,600.

Example 19

Under a nitrogen atmosphere, 0.40 g of the polyhydroxyalkanoate copolymer composed of the unit represented by the chemical formula (106) synthesized in Example 5 (C: 10 mol %, D: 90 mol %) and 0.24 g (1.4 mmol) of 2-aminobenzenesulfonic acid were placed in a 100-ml three-necked flask. 15.0 ml of pyridine was added to the flask, and the mixture was stirred. After that, 0.71 ml (2.7 mmol) of triphenyl phosphite was added, and the whole was heated at 120° C. for 6 hours. After the completion of the reaction, the resultant was reprecipitated in 150 ml of ethanol, followed by collection. The resultant polymer was washed with 1N hydrochloric acid for 1 day, stirred in water for 1 day to wash the polymer, and dried under reduced pressure to prepare 0.35 g of a polymer. The structure of the resultant polymer was determined through analysis according to $^1$H-NMR (FT-NMR: Bruker DPX 400;

resonance frequency: 400 MHz; measured nuclear species: $^{1}H$; solvent used: DMSO-$d_6$; measurement temperature: room temperature) and Fourier transformation-infrared absorption (FT-IR) spectrum (Nicolet AVATAR 360FT-IR). As a result of IR measurement, a peak at 1,695 $cm^{-1}$ derived from a carboxylic acid reduced, and a peak derived from an amide group was newly observed at 1,658 $cm^{-1}$.

$^{1}H$-NMR confirmed that the resultant polymer was a polyhydroxyalkanoate containing a unit represented by the following chemical formula (133) as a monomer unit because a peak derived from an aromatic ring of the 2-aminobenzenesulfonic acid structure shifted.

(133)

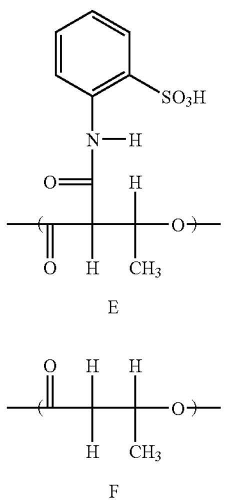

It was also confirmed that the polyhydroxyalkanoate was a copolymer in which an E unit accounted for 10 mol % of the unit of the polyhydroxyalkanoate represented by the chemical formula (133). The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1% (w/v), in terms of polystyrene). As a result, the resultant polymer was found to have a number average molecular weight Mn of 226,000 and a weight average molecular weight Mw of 497,200.

Example 20

0.33 g of a polymer was prepared in the same manner as in Example 19 except that 0.28 g (1.4 mmol) of 4-methoxyaniline-2-sulfonic acid was used instead of 2-aminobenzenesulfonic acid in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (134), and that the polyhydroxyalkanoate was a copolymer in which an E unit accounted for 9 mol % of the unit.

(134)

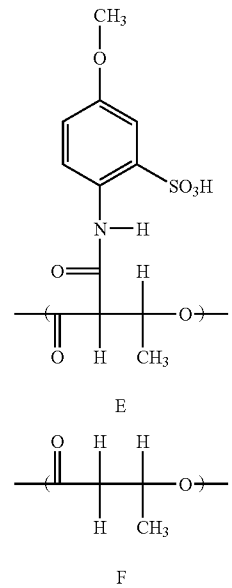

The average molecular weight of the resultant polymer was measured under the same conditions as those of Example 19. As a result, the resultant polymer was found to have a number average molecular weight Mn of 218,000 and a weight average molecular weight Mw of 512,300.

Example 21

0.33 g of a polymer was prepared in the same manner as in Example 19 except that 0.31 g (1.4 mmol) of 2-amino-1-naphthalene sulfonic acid was used instead of 2-aminobenzenesulfonic acid. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (135), and that the polyhydroxyalkanoate was a copolymer in which an E unit accounted for 8 mol % of the unit.

(135)

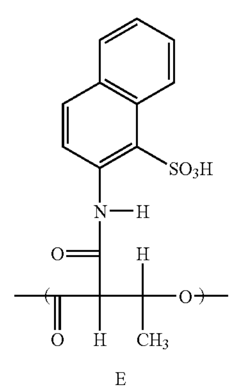

-continued

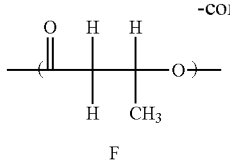

The average molecular weight of the resultant polymer was measured under the same conditions as those of Example 19. As a result, the resultant polymer was found to have a number average molecular weight Mn of 165,000 and a weight average molecular weight Mw of 371,300.

Example 22

Under a nitrogen atmosphere, 0.40 g of the polyhydroxyalkanoate copolymer composed of the unit represented by the chemical formula (108) synthesized in Example 6 (C: 11 mol %, D: 89 mol %) and 0.26 g (1.5 mmol) of 4-aminobenzenesulfonic acid were placed in a 100-ml three-necked flask. 15.0 ml of pyridine was added to the flask, and the mixture was stirred. After that, 0.78 ml (3.0 mmol) of triphenyl phosphite was added. After that, 0.34 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (136), and that the polyhydroxyalkanoate was a copolymer in which an E unit accounted for 10 mol % of the unit.

(136)

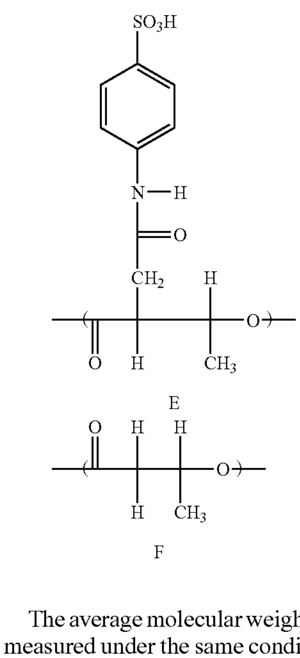

The average molecular weight of the resultant polymer was measured under the same conditions as those of Example 19. As a result, the resultant polymer was found to have a number average molecular weight Mn of 218,000 and a weight average molecular weight Mw of 545,000.

Example 23

0.31 g of a polymer was prepared in the same manner as in Example 22 except that 0.23 g (1.5 mmol) of 2-amino-2-methylpropane sulfonic acid was used instead of 4-aminobenzenesulfonic acid in Example 22. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (137), and that the polyhydroxyalkanoate was a copolymer in which an E unit accounted for 9 mol % of the unit.

(137)

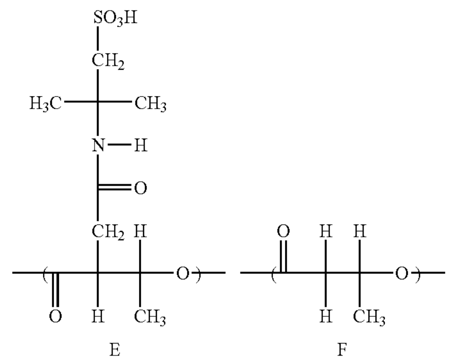

The average molecular weight of the resultant polymer was measured under the same conditions as those of Example 19. As a result, the resultant polymer was found to have a number average molecular weight Mn of 225,000 and a weight average molecular weight Mw of 540,000.

Example 24

0.35 g of a polymer was prepared in the same manner as in Example 22 except that 0.33 g (1.5 mmol) of 1-naphthylamine-8-sulfonic acid was used instead of 4-aminobenzenesulfonic acid in Example 22. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (138), and that the polyhydroxyalkanoate was a copolymer in which an E unit accounted for 8 mol % of the unit.

(138)

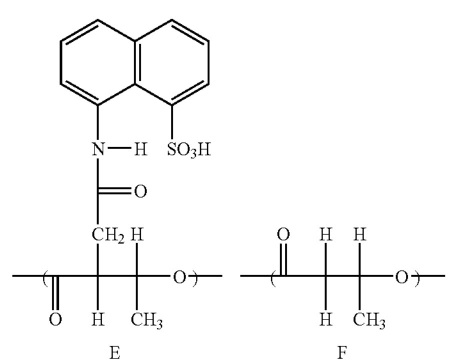

The average molecular weight of the resultant polymer was measured under the same conditions as those of Example 19. As a result, the resultant polymer was found to have a number average molecular weight Mn of 178,000 and a weight average molecular weight Mw of 445,000.

Example 25

0.37 g of a polymer was prepared in the same manner as in Example 22 except that 0.37 g (1.5 mmol) of 2-aminobenzenesulfonic acid phenyl ester was used instead of 4-aminobenzenesulfonic acid in Example 22. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (139), and that the polyhydroxyalkanoate was a copolymer in which an E unit accounted for 9 mol % of the unit.

(139)

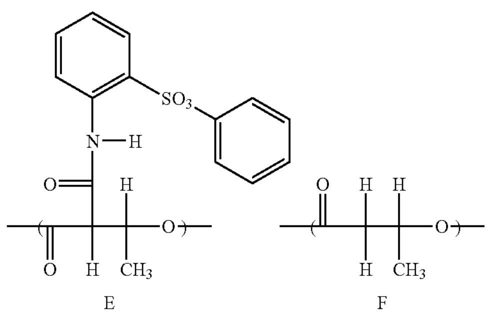

The average molecular weight of the resultant polymer was measured under the same conditions as those of Example 19. As a result, the resultant polymer was found to have a number average molecular weight Mn of 210,500 and a weight average molecular weight Mw of 509,400.

Example 26

Under a nitrogen atmosphere, 0.40 g of the polyhydroxyalkanoate copolymer composed of the unit represented by the chemical formula (110) synthesized in Example 7 (C: 10 mol %, D: 90 mol %) and 0.23 g (1.3 mmol) of 2-aminobenzenesulfonic acid were placed in a 100-ml three-necked flask. 15.0 ml of pyridine was added to the flask, and the mixture was stirred. After that, 0.69 ml (2.7 mmol) of triphenyl phosphite was added. After that, 0.34 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (140), and that the polyhydroxyalkanoate was a copolymer in which an E unit accounted for 10 mol % of the unit.

(140)

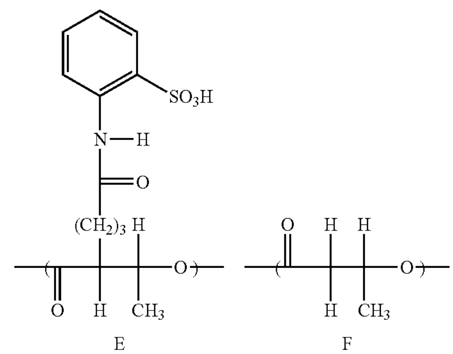

The average molecular weight of the resultant polymer was measured under the same conditions as those of Example 19. As a result, the resultant polymer was found to have a number average molecular weight Mn of 208,000 and a weight average molecular weight Mw of 499,200.

Example 27

0.29 g of a polymer was prepared in the same manner as in Example 26 except that 0.17 g (1.3 mmol) of taurine was used instead of 2-aminobenzenesulfonic acid in Example 26. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (141), and that the polyhydroxyalkanoate was a copolymer in which an E unit accounted for 7 mol % of the unit.

(141)

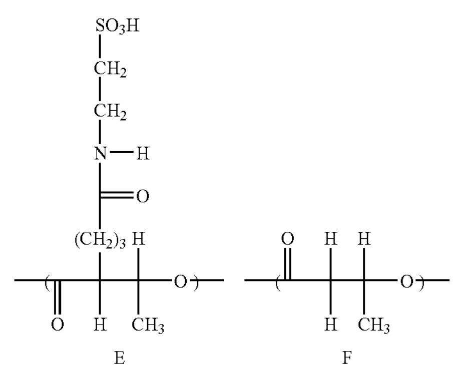

The average molecular weight of the resultant polymer was measured under the same conditions as those of Example 19. As a result, the resultant polymer was found to have a number average molecular weight Mn of 225,000 and a weight average molecular weight Mw of 562,500.

Example 28

Under a nitrogen atmosphere, 0.40 g of the polyhydroxyalkanoate copolymer composed of the unit represented by the chemical formula (112) synthesized in Example 8 (C: 9 mol %, D: 91 mol %) and 0.22 g (1.2 mmol) of p-toluidine-2-sulfonic acid were placed in a 100-ml three-necked flask. 15.0 ml of pyridine was added to the flask, and the mixture was stirred. After that, 0.60 ml (2.3 mmol) of triphenyl phosphite was added. After that, 0.32 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (142), and that the polyhydroxyalkanoate was a copolymer in which an E unit accounted for 8 mol % of the unit.

(142)

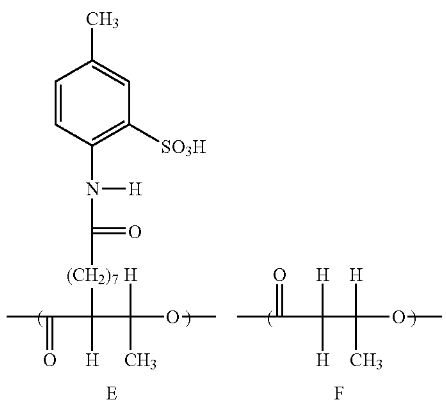

The average molecular weight of the resultant polymer was measured under the same conditions as those of Example 19. As a result, the resultant polymer was found to have a number average molecular weight Mn of 215,500 and a weight average molecular weight Mw of 538,800.

Example 29

0.34 g of a polymer was prepared in the same manner as in Example 28 except that 0.26 g (1.2 mmol) of 2-amino-1-naphthalene sulfonic acid was used instead of p-toluidine-2-sulfonic acid in Example 28. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (143), and that the polyhydroxyalkanoate was a copolymer in which an E unit accounted for 8 mol % of the unit.

(143)

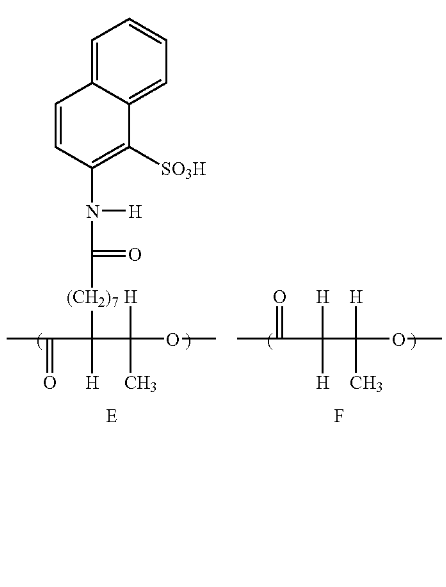

The average molecular weight of the resultant polymer was measured under the same conditions as those of Example 19. As a result, the resultant polymer was found to have a number average molecular weight Mn of 198,100 and a weight average molecular weight Mw of 486,300.

Example 30

Under a nitrogen atmosphere, 0.40 g of the polyhydroxyalkanoate copolymer composed of the unit represented by the chemical formula (114) synthesized in Example 9 (C: 12 mol %, D: 88 mol %) and 0.23 g (1.3 mmol) of 2-aminobenzenesulfonic acid were placed in a 100-ml three-necked flask. 15.0 ml of pyridine was added to the flask, and the mixture was stirred. After that, 0.69 ml (2.6 mmol) of triphenyl phosphite was added. After that, 0.33 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (144), and that the polyhydroxyalkanoate was a copolymer in which an E unit accounted for 11 mol % of the unit.

(144)

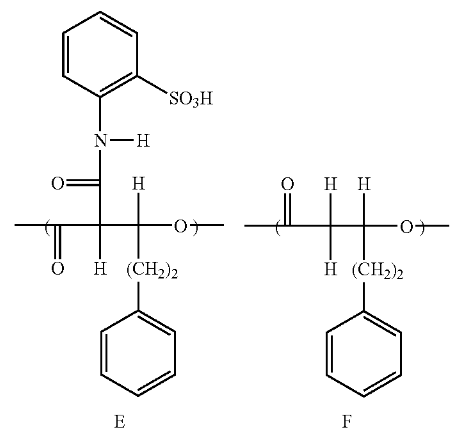

The average molecular weight of the resultant polymer was measured under the same conditions as those of Example 19. As a result, the resultant polymer was found to have a number average molecular weight Mn of 55,300 and a weight average molecular weight Mw of 113,400.

Example 31

0.35 g of a polymer was prepared in the same manner as in Example 30 except that 0.27 g (1.3 mmol) of 4-methoxyaniline-2-sulfonic acid was used instead of 2-aminobenzenesulfonic acid in Example 30. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (145), and that the polyhydroxyalkanoate was a copolymer in which an E unit accounted for 11 mol % of the unit.

(145)

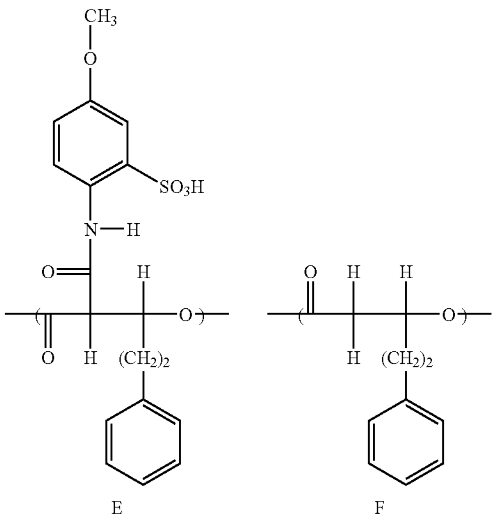

The average molecular weight of the resultant polymer was measured under the same conditions as those of Example 19. As a result, the resultant polymer was found to have a number average molecular weight Mn of 56,000 and a weight average molecular weight Mw of 117,600.

Example 32

0.31 g of a polymer was prepared in the same manner as in Example 30 except that 0.30 g (1.3 mmol) of 2-amino-1-naphthalene sulfonic acid was used instead of 2-aminobenzenesulfonic acid in Example 30. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (146), and that the polyhydroxyalkanoate was a copolymer in which an E unit accounted for 9 mol % of the unit.

(146)

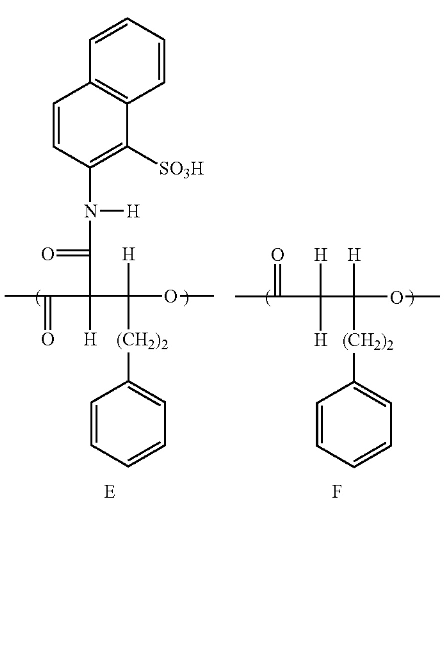

The average molecular weight of the resultant polymer was measured under the same conditions as those of Example 19. As a result, the resultant polymer was found to have a number average molecular weight Mn of 38,500 and a weight average molecular weight Mw of 82,800.

Example 33

Under a nitrogen atmosphere, 0.40 g of the polyhydroxyalkanoate copolymer composed of the unit represented by the chemical formula (116) synthesized in Example 10 (C: 12 mol %, D: 88 mol %) and 0.19 g (1.1 mmol) of 2-aminobenzenesulfonic acid were placed in a 100-ml three-necked flask. 15.0 ml of pyridine was added to the flask, and the mixture was stirred. After that, 0.57 ml (2.2 mmol) of triphenyl phosphite was added. After that, 0.33 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (147), and that the polyhydroxyalkanoate was a copolymer in which an E unit accounted for 10 mol % of the unit.

(147)

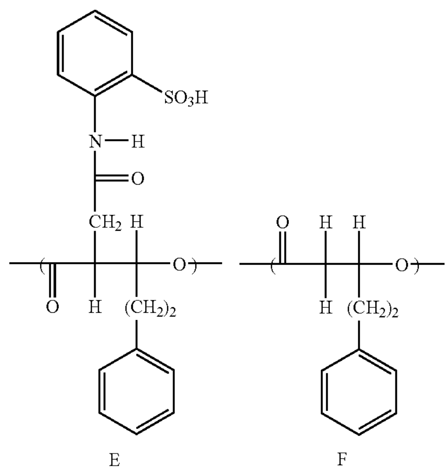

The average molecular weight of the resultant polymer was measured under the same conditions as those of Example 19. As a result, the resultant polymer was found to have a number average molecular weight Mn of 52,500 and a weight average molecular weight Mw of 107,600.

Example 34

0.33 g of a polymer was prepared in the same manner as in Example 33 except that 0.19 g (1.1 mmol) of 3-aminobenzene sulfonic acid was used instead of 2-aminobenzenesulfonic acid in Example 33. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (148), and that the polyhydroxyalkanoate was a copolymer in which an E unit accounted for 9 mol % of the unit.

(148)

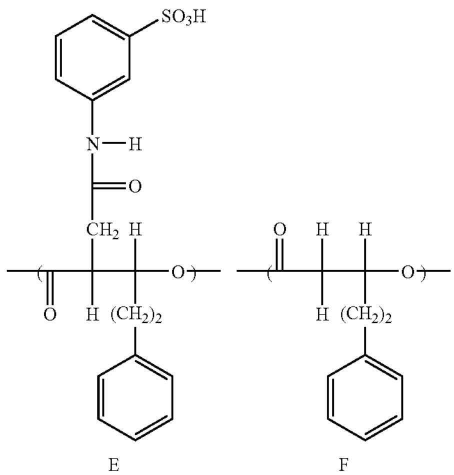

The average molecular weight of the resultant polymer was measured under the same conditions as those of Example 19. As a result, the resultant polymer was found to have a number average molecular weight Mn of 51,800 and a weight average molecular weight Mw of 108,800.

Example 35

0.35 g of a polymer was prepared in the same manner as in Example 33 except that 0.19 g (1.1 mmol) of 4-aminobenzene sulfuric acid was used instead of 2-aminobenzenesulfonic acid in Example 33. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (149), and that the polyhydroxyalkanoate was a copolymer in which an E unit accounted for 10 mol % of the unit.

(149)

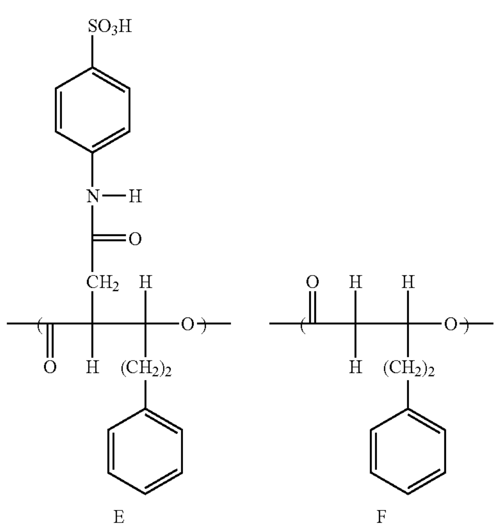

The average molecular weight of the resultant polymer was measured under the same conditions as those of Example 19. As a result, the resultant polymer was found to have a number average molecular weight Mn of 51,500 and a weight average molecular weight Mw of 103,000.

Example 36

0.37 g of a polymer was prepared in the same manner as in Example 33 except that 0.22 g (1.1 mmol) of 4-methoxyaniline-2-sulfonic acid was used instead of 2-aminobenzenesulfonic acid in Example 33. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (150), and that the polyhydroxyalkanoate was a copolymer in which an E unit accounted for 10 mol % of the unit.

(150)

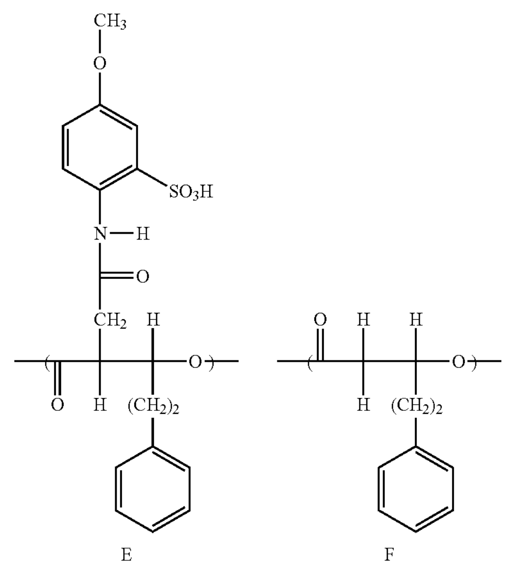

The average molecular weight of the resultant polymer was measured under the same conditions as those of Example 19. As a result, the resultant polymer was found to have a number average molecular weight Mn of 49,800 and a weight average molecular weight Mw of 102,100.

Example 37

0.29 g of a polymer was prepared in the same manner as in Example 33 except that 0.17 g (1.1 mmol) of 2-amino-2-methylpropane sulfonic acid was used instead of 2-aminobenzenesulfonic acid in Example 33. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (151), and that the polyhydroxyalkanoate was a copolymer in which an E unit accounted for 8 mol % of the unit.

(151)

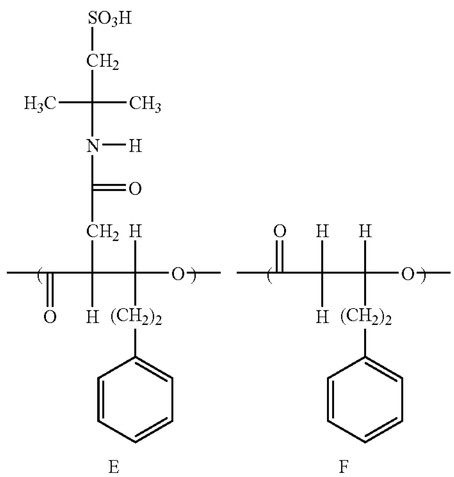

The average molecular weight of the resultant polymer was measured under the same conditions as those of Example 19. As a result, the resultant polymer was found to have a number average molecular weight Mn of 53,200 and a weight average molecular weight Mw of 111,700.

Example 38

Under a nitrogen atmosphere, 0.40 g of the polyhydroxyalkanoate copolymer composed of the unit represented by the chemical formula (118) synthesized in Example 11 (C: 11 mol %, D: 89 mol %) and 0.21 g (1.2 mmol) of 2-aminobenzenesulfonic acid were placed in a 100-ml three-necked flask. 15.0 ml of pyridine was added to the flask, and the mixture was stirred. After that, 0.62 ml (2.4 mmol) of triphenyl phosphite was added. After that, 0.33 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (152), and that the polyhydroxyalkanoate was a copolymer in which an E unit accounted for 11 mol % of the unit.

(152)

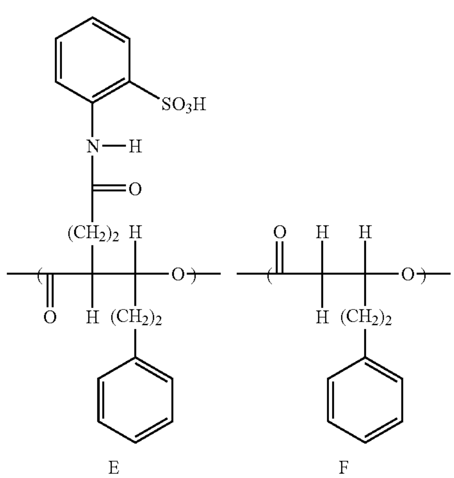

The average molecular weight of the resultant polymer was measured under the same conditions as those of Example 19. As a result, the resultant polymer was found to have a number average molecular weight Mn of 53,500 and a weight average molecular weight Mw of 104,300.

Example 39

0.33 g of a polymer was prepared in the same manner as in Example 38 except that 0.27 g (1.2 mmol) of 2-amino-1-naphthalene sulfonic acid was used instead of 2-aminobenzenesulfonic acid in Example 38. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (153), and that the polyhydroxyalkanoate was a copolymer in which an E unit accounted for 10 mol % of the unit.

(153)

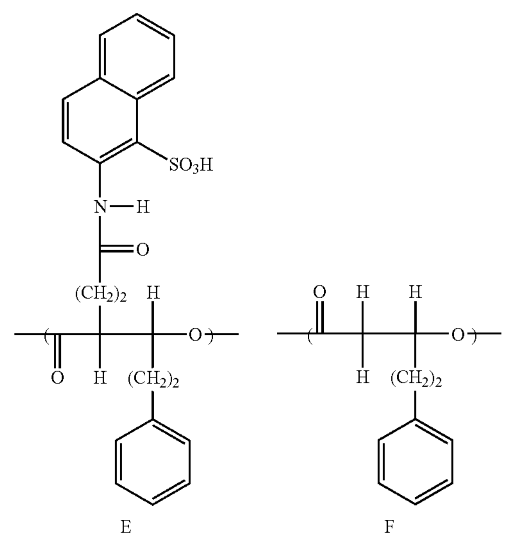

The average molecular weight of the resultant polymer was measured under the same conditions as those of Example 19. As a result, the resultant polymer was found to have a number average molecular weight Mn of 37,600 and a weight average molecular weight Mw of 77,100.

Example 40

Under a nitrogen atmosphere, 0.40 g of the polyhydroxyalkanoate copolymer composed of the unit represented by the chemical formula (120) synthesized in Example 12 (C: 8 mol %, D: 92 mol %) and 0.15 g (0.9 mmol) of 2-aminobenzenesulfonic acid were placed in a 100-ml three-necked flask. 15.0 ml of pyridine was added to the flask, and the mixture was stirred. After that, 0.45 ml (1.7 mmol) of triphenyl phosphite was added. After that, 0.34 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (154), and that the polyhydroxyalkanoate was a copolymer in which an E unit accounted for 7 mol % of the unit.

(154)

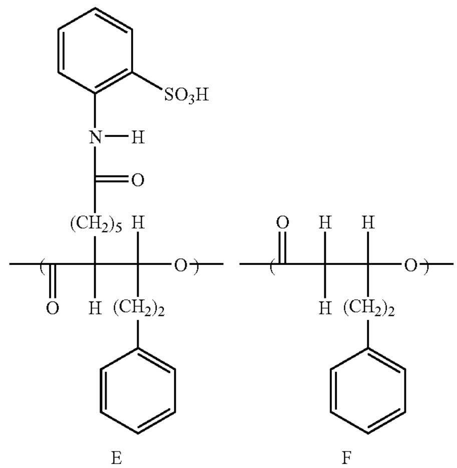

The average molecular weight of the resultant polymer was measured under the same conditions as those of Example 19. As a result, the resultant polymer was found to have a number average molecular weight Mn of 54,200 and a weight average molecular weight Mw of 108,400.

Example 41

0.35 g of a polymer was prepared in the same manner as in Example 40 except that 0.22 g (0.9 mmol) of 2-aminobenzenesulfonic acid phenyl ester was used instead of 2-aminobenzenesulfonic acid in Example 40. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (155), and that the polyhydroxyalkanoate was a copolymer in which an E unit accounted for 7 mol % of the unit.

(155)

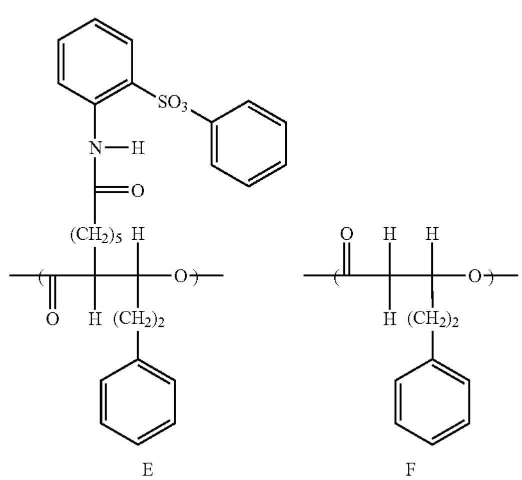

The average molecular weight of the resultant polymer was measured under the same conditions as those of Example 19. As a result, the resultant polymer was found to have a number average molecular weight Mn of 55,000 and a weight average molecular weight Mw of 104,500.

Example 42

Under a nitrogen atmosphere, 0.40 g of the polyhydroxyalkanoate copolymer composed of the unit represented by the chemical formula (122) synthesized in Example 13 (C: 11 mol %, D: 89 mol %) and 0.19 g (1.1 mmol) of 2-aminobenzenesulfonic acid were placed in a 100-ml three-necked flask. 15.0 ml of pyridine was added to the flask, and the mixture was stirred. After that, 0.58 ml (2.2 mmol) of triphenyl phosphite was added. After that, 0.33 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (156), and that the polyhydroxyalkanoate was a copolymer in which an E unit accounted for 10 mol % of the unit.

(156)

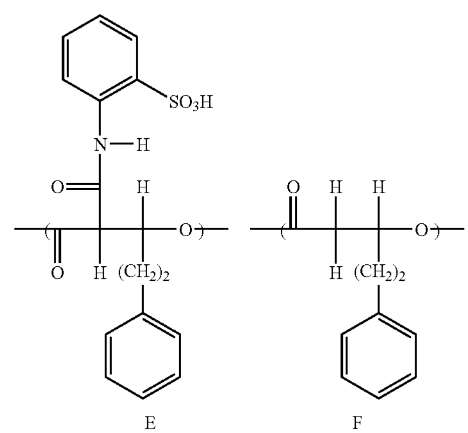

The average molecular weight of the resultant polymer was measured under the same conditions as those of Example 19. As a result, the resultant polymer was found to have a number average molecular weight Mn of 100,500 and a weight average molecular weight Mw of 221,100.

Example 43

0.35 g of a polymer was prepared in the same manner as in Example 42 except that 0.23 g (1.1 mmol) of 4-methoxyaniline-2-sulfonic acid was used instead of 2-aminobenzenesulfonic acid in Example 42. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (157), and that the polyhydroxyalkanoate was a copolymer in which an E unit accounted for 7 mol % of the unit.

(157)

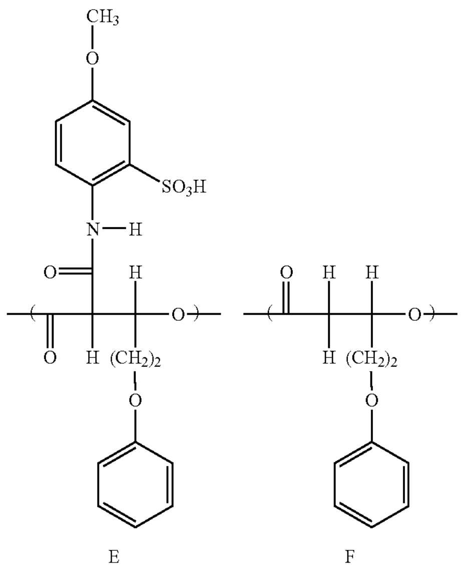

The average molecular weight of the resultant polymer was measured under the same conditions as those of Example 19. As a result, the resultant polymer was found to have a number average molecular weight Mn of 110,200 and a weight average molecular weight Mw of 236,900.

Example 44

Under a nitrogen atmosphere, 0.40 g of the polyhydroxyalkanoate copolymer composed of the unit represented by the chemical formula (124) synthesized in Example 14 (C: 11 mol %, D:89 mol %) and 0.25 g(1.1 mmol) of 2-amino-1-naphthalene sulfonic acid were placed in a 100-ml three-necked flask. 15.0 ml of pyridine was added to the flask, and the mixture was stirred. After that, 0.58 ml (2.2 mmol) of triphenyl phosphite was added. After that, 0.34 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (158), and that the polyhydroxyalkanoate was a copolymer in which an E unit accounted for 11 mol % of the unit.

(158)

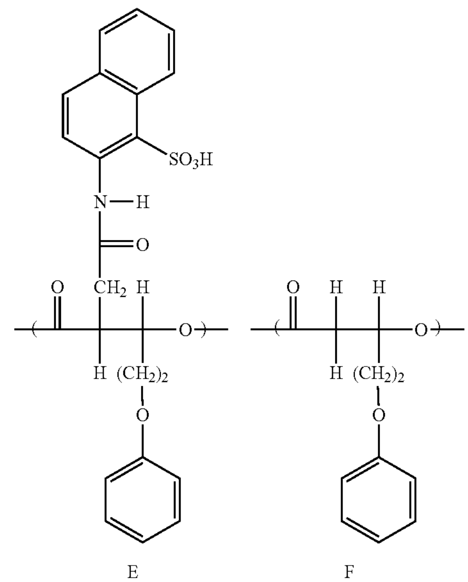

The average molecular weight of the resultant polymer was measured under the same conditions as those of Example 19. As a result, the resultant polymer was found to have a number average molecular weight Mn of 87,500 and a weight average molecular weight Mw of 192,500.

Example 45

0.33 g of a polymer was prepared in the same manner as in Example 44 except that 0.17 g (1.1 mmol) of 2-amino-2-methylpropane sulfonic acid was used instead of 2-aminobenzenesulfonic acid in Example 44. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (159), and that the polyhydroxyalkanoate was a copolymer in which an E unit accounted for 7 mol % of the unit.

(159)

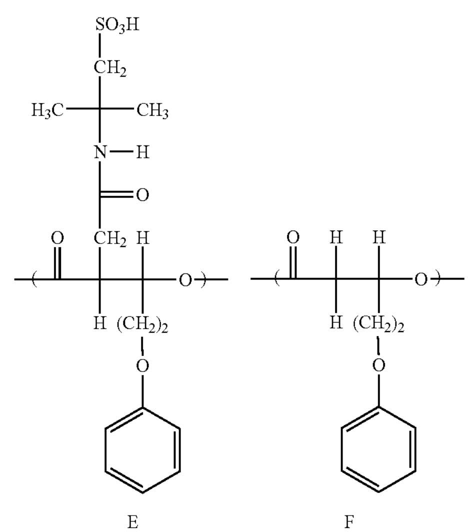

The average molecular weight of the resultant polymer was measured under the same conditions as those of Example 19.

As a result, the resultant polymer was found to have a number average molecular weight Mn of 99,800 and a weight average molecular weight Mw of 214,600.

Example 46

Under a nitrogen atmosphere, 0.40 g of the polyhydroxyalkanoate copolymer composed of the unit represented by the chemical formula (128) synthesized in Example 16 (C: 8 mol %, D: 92 mol %) and 0.15 g (0.9 mmol) of 2-aminobenzenesulfonic acid were placed in a 100-ml three-necked flask. 15.0 ml of pyridine was added to the flask, and the mixture was stirred. After that, 0.46 ml (1.8 mmol) of triphenyl phosphite was added. After that, 0.33 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (160), and that the polyhydroxyalkanoate was a copolymer in which an E unit accounted for 8 mol % of the unit.

(160)

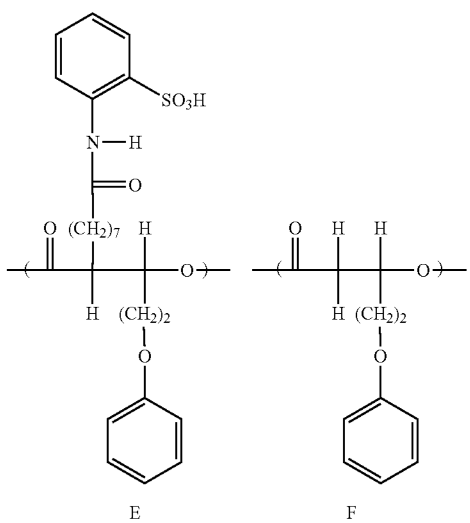

The average molecular weight of the resultant polymer was measured under the same conditions as those of Example 19. As a result, the resultant polymer was found to have a number average molecular weight Mn of 100,100 and a weight average molecular weight Mw of 225,200.

Example 47

0.33 g of a polymer was prepared in the same manner as in Example 46 except that 0.22 g (0.9 mmol) of 4-aminobenezenesulfonic acid phenyl ester was used instead of 2-aminobenzenesulfonic acid in Example 46. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (161), and that the polyhydroxyalkanoate was a copolymer in which an E unit accounted for 7 mol % of the unit.

(161)

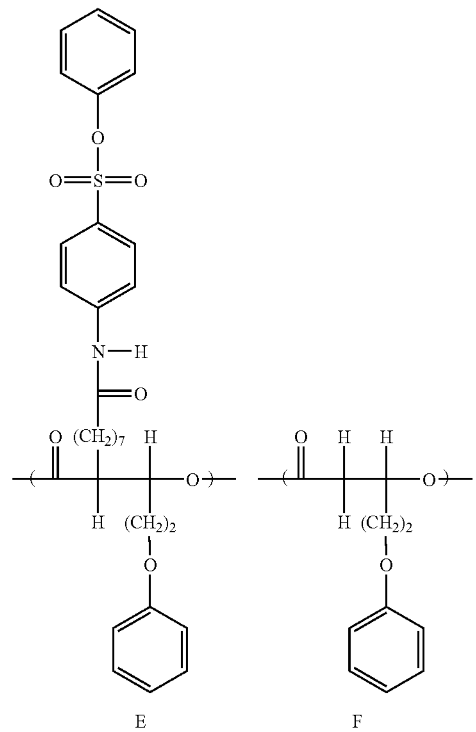

The average molecular weight of the resultant polymer was measured under the same conditions as those of Example 19. As a result, the resultant polymer was found to have a number average molecular weight Mn of 110,500 and a weight average molecular weight Mw of 237,600.

Example 48

Under a nitrogen atmosphere, 0.40 g of the polyhydroxyalkanoate copolymer composed of the unit represented by the chemical formula (130) synthesized in Example 17 (C: 10 mol %, D: 90 mol %) and 0.26 g (1.2 mmol) of 2-amino-1-naphthalene sulfonic acid were placed in a 100-ml three-necked flask. 15.0 ml of pyridine was added to the flask, and the mixture was stirred. After that, 0.60 ml (2.3 mmol) of triphenyl phosphite was added. After that, 0.36 g of a polymer was prepared in the same manner as in Example 19. The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (162), and that the polyhydroxyalkanoate was a copolymer in which an E unit accounted for 9 mol % of the unit.

(162)

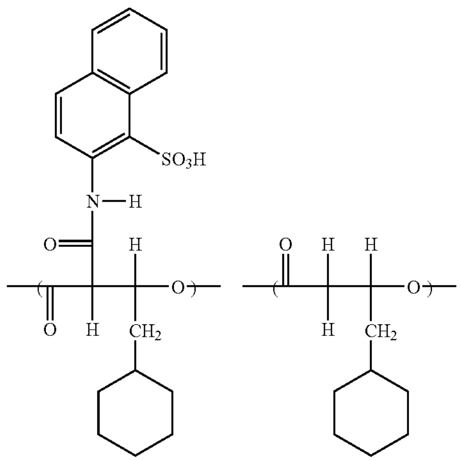

E F

The average molecular weight of the resultant polymer was measured under the same conditions as those of Example 19. As a result, the resultant polymer was found to have a number average molecular weight Mn of 30,500 and a weight average molecular weight Mw of 65,600.

Example 49

Under a nitrogen atmosphere, 0.40 g of the polyhydroxyalkanoate copolymer composed of the unit represented by the chemical formula (132) synthesized in Example 18 (C: 9 mol %, D: 91 mol %) and 0.16 g (1.0 mmol) of 2-amino-2-methylpropane sulfonic acid were placed in a 100-ml three-necked flask. 15.0 ml of pyridine was added to the flask, and the mixture was stirred. After that, 0.52 ml (2.0 mmol) of triphenyl phosphite was added. After that, 0.31 g of a polymer was prepared in the same manner as in Example 19.

The resultant polymer was subjected to NMR analysis and Fourier transformation-infrared absorption spectral analysis under the same conditions as those of Example 19. As a result, it was confirmed that the resultant polymer was a polyhydroxyalkanoate containing a unit represented by the following chemical formula (163), and that the polyhydroxyalkanoate was a copolymer in which an E unit accounted for 8 mol % of the unit.

(163)

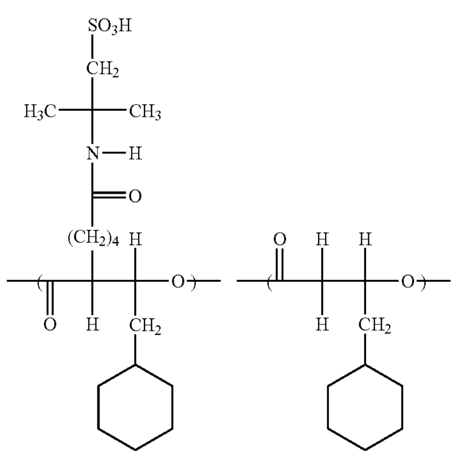

E F

The average molecular weight of the resultant polymer was measured under the same conditions as those of Example 19. As a result, the resultant polymer was found to have a number average molecular weight Mn of 32,500 and a weight average molecular weight Mw of 71,500.

Example 50

0.30 g of the polyhydroxyalkanoate copolymer composed of the unit represented by the chemical formula (133) synthesized in Example 19 was added to a round-bottomed flask. Then, 21.0 ml of chloroform and 7.0 ml of methanol were added to dissolve the polymer, and the solution was cooled to 0° C. 0.93 ml of a 2-mol/L trimethylsilyldiazomethane-hexane solution (manufactured by Aldrich) was added to the solution, and the whole was stirred for 4 hours. After the completion of the reaction, the solvent was distilled off by using an evaporator, and then the polymer was collected. Furthermore, 21.0 ml of chloroform and 7.0 ml of methanol were added to dissolve the polymer again. Then, the solvent was distilled off by using an evaporator. This operation was repeated 3 times. The collected polymer was dried under reduced pressure to prepare 0.30 g of a polymer. The structure of the resultant polymer was determined through analysis according to $^{1}$H-NMR (FT-NMR: Bruker DPX 400; resonance frequency: 400 MHz; measured nuclear species: $^{1}$H; solvent used: DMSO-$d_6$; measurement temperature: room temperature). $^{1}$H-NMR confirmed that the resultant polymer was a polyhydroxyalkanoate containing a unit represented by the following chemical formula (164) as a monomer unit because a peak derived from methyl sulfonate was observed at 3 to 4 ppm.

(164)

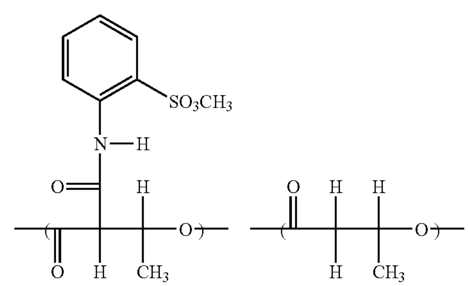

G H

It was also confirmed that a G unit accounted for 10 mol % of the unit of the polyhydroxyalkanoate represented by the chemical formula (164). In addition, there was no peak observed resulted from sulfonic acid in acid value titration using Potentiometric Titrator AT510 (product of Kyoto Electronics Manufacturing Co., Ltd.) and it was also made evident from this that sulfonic acid was converted to methyl sulfonate. The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1% (w/v), in terms of polystyrene). As a result, the resultant polymer was found to have a number average molecular weight Mn of 228,000 and a weight average molecular weight Mw of 513,000.

Example 51

0.29 g of a polymer was prepared in the same manner as in Example 50 except that the polyhydroxyalkanoate represented by the chemical formula (134) synthesized in Example 20 was used instead of the polyhydroxyalkanoate represented by the chemical formula (133) synthesized in Example 50, and 0.83 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (165), and that the polyhydroxyalkanoate was a copolymer in which a G unit accounted for 9 mol % of the unit.

In addition, acid value titration in the same manner as in Example 50 revealed that the sulfonic acid was transformed into methyl sulfonate because no peak derived from the sulfonic acid was observed.

(165)

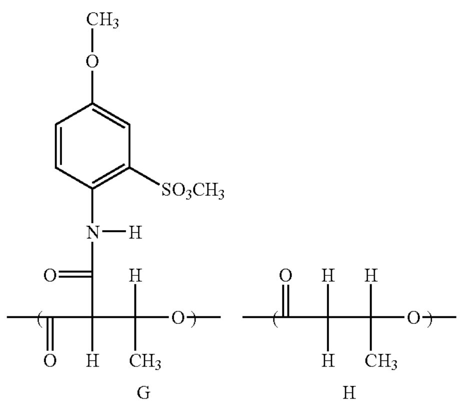

The average molecular weight of the resultant polymer was measured under the same conditions as those of Example 50. As a result, the resultant polymer was found to have a number average molecular weight Mn of 209,000 and a weight average molecular weight Mw of 480,700.

Example 52

0.30 g of a polymer was prepared in the same manner as in Example 50 except that the polyhydroxyalkanoate represented by the chemical formula (135) synthesized in Example 21 was used instead of the polyhydroxyalkanoate represented by the chemical formula (133) synthesized in Example 50, and 0.71 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (166), and that the polyhydroxyalkanoate was a copolymer in which a G unit accounted for 8 mol % of the unit.

In addition, acid value titration in the same manner as in Example 50 revealed that the sulfonic acid was transformed into methyl sulfonate because no peak derived from the sulfonic acid was observed.

(166)

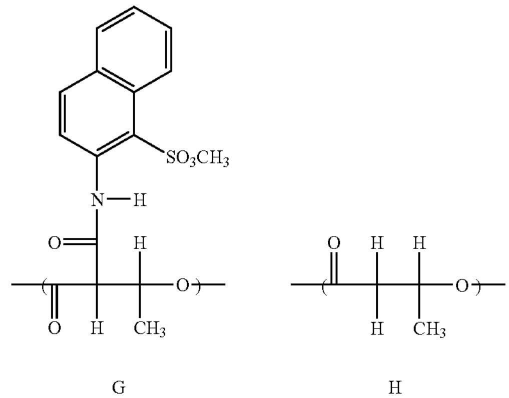

The average molecular weight of the resultant polymer was measured under the same conditions as those of Example 50. As a result, the resultant polymer was found to have a number average molecular weight Mn of 162,500 and a weight average molecular weight Mw of 373,800.

Example 53

0.29 g of a polymer was prepared in the same manner as in Example 50 except that the polyhydroxyalkanoate represented by the chemical formula (137) synthesized in Example 23 was used instead of the polyhydroxyalkanoate represented by the chemical formula (133) synthesized in Example 50, and 0.83 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (167), and that the polyhydroxyalkanoate was a copolymer in which a G unit accounted for 9 mol % of the unit.

In addition, acid value titration in the same manner as in Example 50 revealed that the sulfonic acid was transformed into methyl sulfonate because no peak derived from the sulfonic acid was observed.

(167)

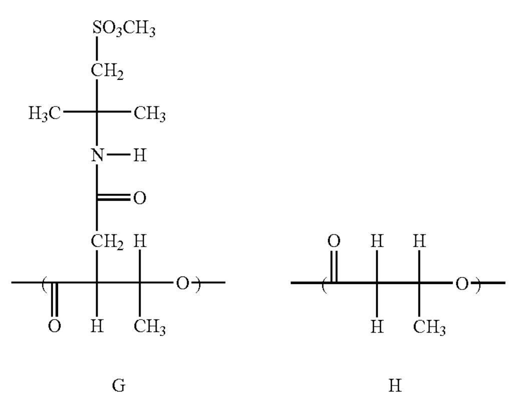

The average molecular weight of the resultant polymer was measured under the same conditions as those of Example 50. As a result, the resultant polymer was found to have a number average molecular weight Mn of 228,500 and a weight average molecular weight Mw of 548,400.

Example 54

0.30 g of a polymer was prepared in the same manner as in Example 50 except that the polyhydroxyalkanoate represented by the chemical formula (142) synthesized in Example 28 was used instead of the polyhydroxyalkanoate represented by the chemical formula (133) synthesized in Example 50, and 0.71 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (168), and that the polyhydroxyalkanoate was a copolymer in which a G unit accounted for 8 mol % of the unit.

In addition, acid value titration in the same manner as in Example 50 revealed that the sulfonic acid was transformed into methyl sulfonate because no peak derived from the sulfonic acid was observed.

(168)

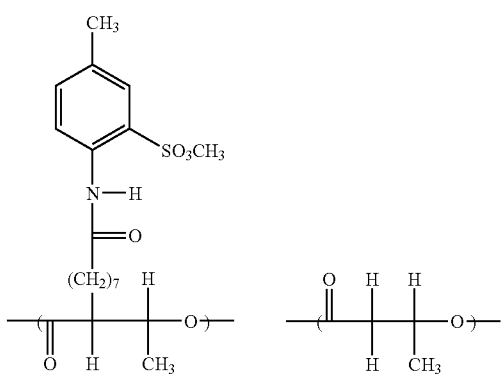

G H

The average molecular weight of the resultant polymer was measured under the same conditions as those of Example 50. As a result, the resultant polymer was found to have a number average molecular weight Mn of 218,000 and a weight average molecular weight Mw of 555,900.

Example 55

0.29 g of a polymer was prepared in the same manner as in Example 50 except that the polyhydroxyalkanoate represented by the chemical formula (144) synthesized in Example 30 was used instead of the polyhydroxyalkanoate represented by the chemical formula (133) synthesized in Example 50, and 0.83 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (169), and that the polyhydroxyalkanoate was a copolymer in which a G unit accounted for 11 mol % of the unit.

In addition, acid value titration in the same manner as in Example 50 revealed that the sulfonic acid was transformed into methyl sulfonate because no peak derived from the sulfonic acid was observed.

(169)

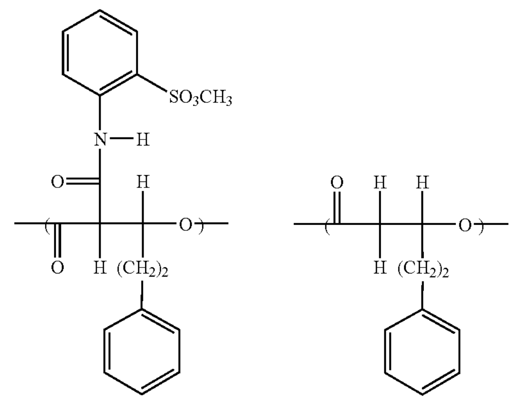

G H

The average molecular weight of the resultant polymer was measured under the same conditions as those of Example 50. As a result, the resultant polymer was found to have a number average molecular weight Mn of 54,500 and a weight average molecular weight Mw of 114,500.

Example 56

0.29 g of a polymer was prepared in the same manner as in Example 50 except that the polyhydroxyalkanoate represented by the chemical formula (149) synthesized in Example 35 was used instead of the polyhydroxyalkanoate represented by the chemical formula (133) synthesized in Example 50, and 0.76 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (170), and that the polyhydroxyalkanoate was a copolymer in which a G unit accounted for 10 mol % of the unit.

In addition, acid value titration in the same manner as in Example 50 revealed that the sulfonic acid was transformed into methyl sulfonate because no peak derived from the sulfonic acid was observed.

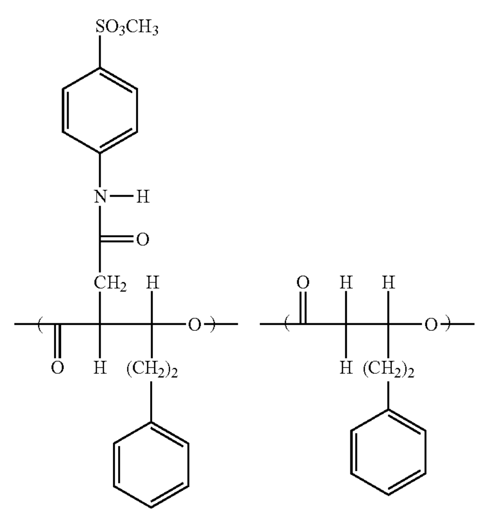

G

H

The average molecular weight of the resultant polymer was measured under the same conditions as those of Example 50. As a result, the resultant polymer was found to have a number average molecular weight Mn of 51,000 and a weight average molecular weight Mw of 104,600.

Example 57

0.30 g of a polymer was prepared in the same manner as in Example 50 except that the polyhydroxyalkanoate represented by the chemical formula (154) synthesized in Example 40 was used instead of the polyhydroxyalkanoate represented by the chemical formula (133) synthesized in Example 50, and 0.54 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (171), and that the polyhydroxyalkanoate was a copolymer in which a G unit accounted for 7 mol % of the unit.

In addition, acid value titration in the same manner as in Example 50 revealed that the sulfonic acid was transformed into methyl sulfonate-because no peak derived from the sulfonic acid was observed.

(171)

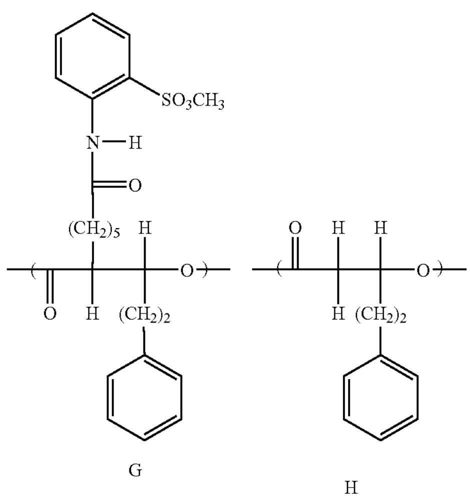

The average molecular weight of the resultant polymer was measured under the same conditions as those of Example 50. As a result, the resultant polymer was found to have a number average molecular weight Mn of 52,500 and a weight average molecular weight Mw of 110,300.

Example 58

0.30 g of a polymer was prepared in the same manner as in Example 50 except that the polyhydroxyalkanoate represented by the chemical formula (156) synthesized in Example 42 was used instead of the polyhydroxyalkanoate represented by the chemical formula (133) synthesized in Example 50, and 0.71 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (172), and that the polyhydroxyalkanoate was a copolymer in which a G unit accounted for 10 mol % of the unit.

In addition, oxidation titration in the same manner as in Example 50 revealed that the sulfonic acid was transformed into methyl sulfonate because no peak derived from the sulfonic acid was observed.

(172)

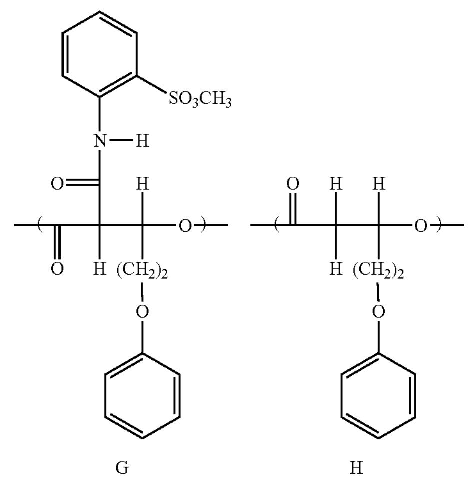

The average molecular weight of the resultant polymer was measured under the same conditions as those of Example 50. As a result, the resultant polymer was found to have a number average molecular weight Mn of 101,000 and a weight average molecular weight Mw of 227,300.

Example 59

0.29 g of a polymer was prepared in the same manner as in Example 50 except that the polyhydroxyalkanoate represented by the chemical formula (156) synthesized in Example 44 was used instead of the polyhydroxyalkanoate represented by the chemical formula (133) synthesized in Example 50, and 0.75 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (173), and that the polyhydroxyalkanoate was a copolymer in which a G unit accounted for 11 mol % of the unit.

In addition, acid value titration in the same manner as in Example 50 revealed that the sulfonic acid was transformed into methyl sulfonate because no peak derived from the sulfonic acid was observed.

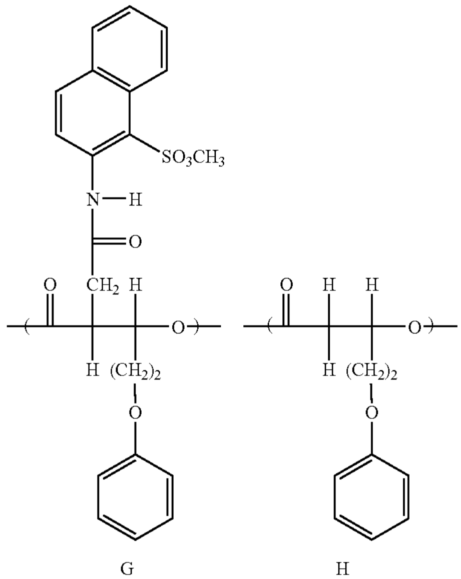

(173)

The average molecular weight of the resultant polymer was measured under the same conditions as those of Example 50. As a result, the resultant polymer was found to have a number average molecular weight Mn of 86,500 and a weight average molecular weight Mw of 186,000.

Example 60

0.28 g of a polymer was prepared in the same manner as in Example 50 except that the polyhydroxyalkanoate represented by the chemical formula (162) synthesized in Example 48 was used instead of the polyhydroxyalkanoate represented by the chemical formula (133) synthesized in Example 50, and 0.71 ml of a 2-mol/L trimethylsilyldiazomethane-hexane solution (manufactured by Aldrich) was used. The resultant polymer was subjected to NMR analysis under the same conditions as those of Example 50. The analysis confirmed that the resultant polymer was a polyhydroxyalkanoate containing a unit represented by the following chemical formula (174), and that the polyhydroxyalkanoate was a copolymer in which a G unit accounted for 9 mol % of the unit.

In addition, acid value titration in the same manner as in Example 50 revealed that the sulfonic acid was transformed into methyl sulfonate because no peak derived from the sulfonic acid was observed.

(174)

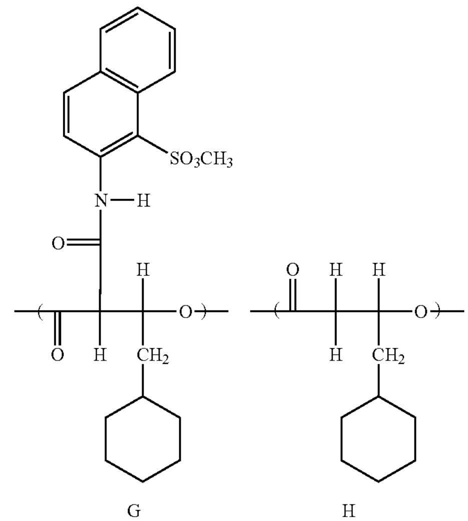

The average molecular weight of the resultant polymer was measured under the same conditions as those of Example 50. As a result, the resultant polymer was found to have a number average molecular weight Mn of 31,000 and a weight average molecular weight Mw of 68,200.

Example 61

2.00 g of the polyhydroxyalkanoate composed of the unit represented by the chemical formula (101) synthesized in Example 1 was placed in a round-bottomed flask, and 100 ml of THF was added to dissolve this. The flask was placed under a nitrogen atmosphere, and the solution was stirred at −78° C. Next, 11.62 ml of a solution of 2 M of lithium diisopropylamide in THF was gradually added to the flask, and the whole was stirred at −78° C. for 30 minutes. Next, 10.19 g of 2-acrylamide-2-methylpropanesulfonic acid methyl ester were added to the flask, and the whole was stirred at room temperature for 30 minutes. After the completion of the reaction, the reaction solution was poured into 400 ml of an aqueous solution of ammonium chloride, and 200 ml of dichloromethane were added to extract the organic layer. The extracted organic layer was washed with 100 ml of water 3 times. After the organic layer had been collected, the solvent was distilled off to collect a crude polymer. Next, the polymer was dissolved into 12 ml of THF, then dissolved into THF, and reprecipitated in methanol in an amount 50 times that of THF necessary for the dissolution. The precipitate was collected and dried under reduced pressure to prepare 1.63 g of a polymer. The structure of the resultant polymer was determined through analysis according to $^{1}$H-NMR (FT-NMR: Bruker DPX 400; resonance frequency: 400 MHz; measured nuclear species: $^{1}$H; solvent used: DMSO-$d_6$; measurement temperature: room temperature). The analysis confirmed that the polymer was a polyhydroxyalkanoate containing a unit represented by the following chemical formula (175) as a monomer unit. The analysis also confirmed that an E unit accounted for 9 mol % of the monomer unit and an F unit accounted for 91 mol % thereof.

(175)

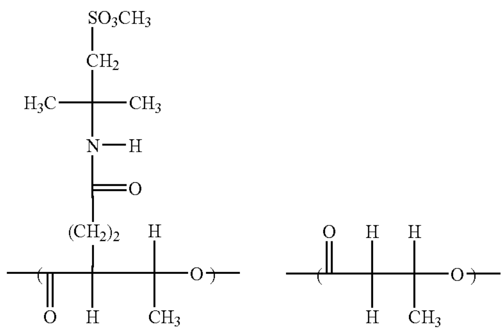

E F

The average molecular weight of the resultant polymer was measured under the same conditions as those of Example 50. As a result, the resultant polyhydroxyalkanoate was found to have a number average molecular weight Mn of 286,500 and a weight average molecular weight Mw of 572,500.

Example 62

2.00 g of the polyhydroxyalkanoate composed of the unit represented by the chemical formula (102) synthesized in Example 2 was placed in a round-bottomed flask, and 100 ml of THF was added to dissolve this. The flask was placed under a nitrogen atmosphere, and the solution was stirred at −78° C. Next, 5.68 ml of a solution of 2 M of lithium diisopropylamide in THF was gradually added to the flask, and the whole was stirred at −78° C. for 30 minutes. Next, 4.98 g of 2-acrylamide-2-methylpropanesulfonic acid methyl ester was added to the flask, and the whole was stirred at room temperature for 30 minutes. After the completion of the reaction, the reaction solution was poured into 400 ml of an aqueous solution of ammonium chloride, and 200 ml of dichloromethane was added to extract the organic layer. The extracted organic layer was washed with 100 ml of water 3 times. After the organic layer had been collected, the solvent was distilled off to collect a crude polymer. Next, the polymer was dissolved into 12 ml of THF, then dissolved into THF, and reprecipitated in methanol in an amount 50 times that of THF necessary for the dissolution. The precipitate was collected and dried under reduced pressure to prepare 1.22 g of a polymer. The structure of the resultant polymer was determined through analysis according to $^1$H-NMR (FT-NMR: Bruker DPX 400; resonance frequency: 400 MHz; measured nuclear species: $^1$H; solvent used: DMSO-$d_6$; measurement temperature: room temperature). The analysis confirmed that the polymer was a polyhydroxyalkanoate containing a unit represented by the following chemical formula (176) as a monomer unit. The analysis also confirmed that an E unit accounted for 8 mol % of the monomer unit and an F unit accounted for 92 mol % thereof.

(176)

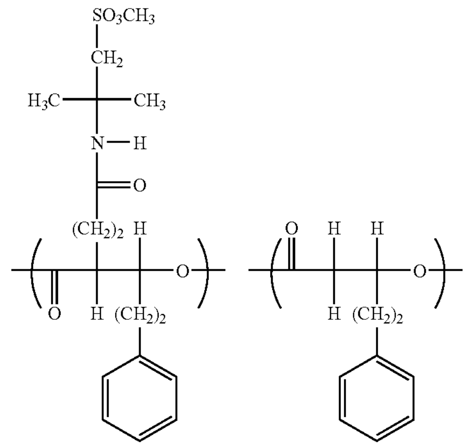

E F

The average molecular weight of the resultant polymer was measured under the same conditions as those of Example 50. As a result, the resultant polyhydroxyalkanoate was found to have a number average molecular weight Mn of 56,500 and a weight average molecular weight Mw of 112,300.

INDUSTRIAL APPLICABILITY

According to the present invention, there is provided: a novel polyhydroxyalkanoate containing, in a molecule, a carboxyl group as a reaction active group at a side chain thereof; a novel polyhydroxyalkanoate containing, in a molecule, a unit having an amide group and a sulfonic group; and a method of producing such a polyhydroxyalkanoate. A novel polyhydroxyalkanoate having a carboxyl group can find applications in functional materials because it can introduce a functional group which provides functionalities by using its reaction active group. Furthermore, a polyhydroxyalkanoate containing, in a molecule, a unit having a carboxyl group, an amide group, or a sulfonic group is expected to find use in applications including medical soft members because it is excellent in melt processability, and is excellent in biocompatibility by virtue of its hydrophilicity.

This application claims priority from Japanese Patent Application Nos. 2004-174783 filed Jun. 11, 2004 and 2005-168916 filed Jun. 8, 2005, which are hereby incorporated by reference herein.

What is claimed is:

1. A polyhydroxyalkanoate comprising one or more units represented by chemical formula (1) in a molecule:

(1)

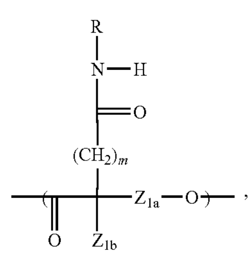

wherein R represents $-A_1-SO_2R_1$, $R_1$ represents OH, a halogen atom, ONa, OK, or $OR_{1a}$, $R_{1a}$ and $A_1$ each independently represent a group having a substituted or unsubstituted aliphatic hydrocarbon structure, a substituted or unsubstituted aromatic ring structure, or a substituted or unsubstituted heterocyclic structure, $Z_{1a}$ represents a linear alkylene chain having 1 to 4 carbon atoms, the linear alkylene chain has at least one linear or branched alkyl group, or at least one alkyl group containing a residue having any one of a phenyl structure, a thienyl structure, and a cyclohexyl structure at a terminal thereof, $Z_{1b}$ represents a hydrogen atom, or a linear or branched alkyl group, aryl group, or aralkyl group, which may be substituted by an aryl group, m represents an integer selected from 0 to 8, and if more than one unit of the chemical formula (1) is present, each of R, $R_1$, $R_{1a}$, $A_1$, $Z_{1a}$, $Z_{1b}$, and m is independently selected for each unit.

2. The polyhydroxyalkanoate according to claim 1, comprising one or more units each represented by chemical formula (2), (3), (4A), or (4B) in a molecule as the one or more units each represented by the chemical formula (1):

(2)

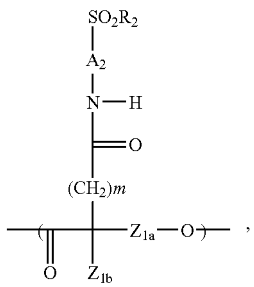

wherein $R_2$ represents OH, a halogen atom, ONa, OK, or $OR_{2a}$, $R_{2a}$ represents a linear or branched alkyl group having 1 to 8 carbon atoms, or a substituted or unsubstituted phenyl group, $A_2$ represents a linear or branched alkylene group having 1 to 8 carbon atoms, $Z_{1a}$ represents a linear alkylene chain having 1 to 4 carbon atoms, the linear alkylene chain has at least one linear or branched alkyl group, or at least one alkyl group containing a residue having any one of a phenyl structure, a thienyl structure, and a cyclohexyl structure at a terminal thereof, $Z_{1b}$ represents a hydrogen atom or a linear or branched alkyl group, aryl group, or aralkyl group, which may be substituted by an aryl group, m represents an integer selected from 0 to 8, and if more than one unit of the chemical formula (2) is present, each of $A_2$, $R_2$, $R_{2a}$, $Z_{1a}$, $Z_{1b}$, and m is independently selected for each unit;

(3)

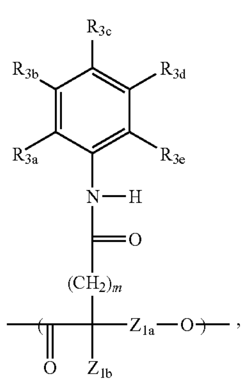

wherein $R_{3a}$, $R_{3b}$, $R_{3c}$, $R_{3d}$, and $R_{3e}$ each independently represent $SO_2R_{3f}$, a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$, an acetamide group, an OPh group, an NHPh group, a $CF_3$ group, a $C_2F_5$ group, or a $C_3F_7$ group, and at least one of these groups represents $SO_2R_{3f}$, $Z_{1a}$ represents a linear alkylene chain having 1 to 4 carbon atoms, the linear alkylene chain has at least one linear or branched alkyl group, or at least one alkyl group containing a residue having any one of a phenyl structure, a thienyl structure, and a cyclohexyl structure at a terminal thereof, $Z_{1b}$ represents a hydrogen atom or a linear or branched alkyl group, aryl group, or aralkyl group, which may be substituted by an aryl group, m represents an integer selected from 0 to 8, and if more than one unit of the chemical formula (3) is present, each of $R_{3a}$, $R_{3b}$, $R_{3c}$, $R_{3d}$, $R_{3e}$, $R_{3f}$, $R_{3f1}$, $R_{3g}$, $Z_{1a}$, $Z_{1b}$, and m is independently selected for each unit, where:

$R_{3f}$ is OH, a halogen atom, ONa, OK, or $OR_{3f1}$;

$R_{3f1}$ is a linear or branched alkyl group having 1 to 8 carbon atoms, or a substituted or unsubstituted phenyl group;

$R_{3g}$ is H, Na, or K; and

Ph is a phenyl group;

(4A)

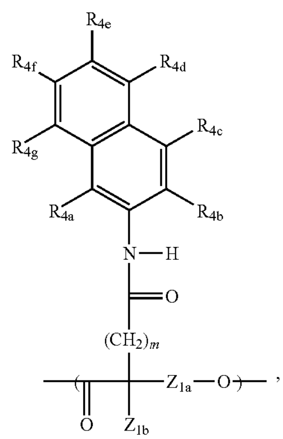

wherein $R_{4a}$, $R_{4b}$, $R_{4c}$, $R_{4d}$, $R_{4e}$, $R_{4f}$, and $R_{4g}$ each independently represent $SO_2R_{4o}$, a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$, an acetamide group, an OPh group, an NHPh group, a $CF_3$ group, a $C_2F_5$ group, or a $C_3F_7$ group, and at least one of these groups represents $SO_2R_{4o}$, $Z_{1a}$ represents a linear alkylene chain having 1 to 4 carbon atoms, the linear alkylene chain has at least one linear or branched alkyl group, or at least one alkyl group containing a residue having any one of a phenyl structure, a thienyl structure, and a cyclohexyl structure at a terminal thereof, $Z_{1b}$ represents a hydrogen atom or a linear or branched alkyl group, aryl group, or aralkyl group, which may be substituted by an aryl group, m represents an integer selected from 0 to 8, and if more than one unit of the chemical formula (4A) is present, each of $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, $Z_{1a}$, and $Z_{1b}$, and m is independently selected for each unit, where:

$R_{4o}$ is OH, a halogen atom, ONa, OK, or $OR_{4o1}$;

$R_{4o1}$ is a linear or branched alkyl group having 1 to 8 carbon atoms, or a substituted or unsubstituted phenyl group;

$R_{4p}$ is H, Na, or K; and

Ph is a phenyl group; and (4B)

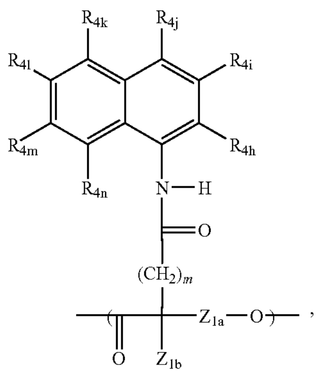

wherein $R_{4h}$, $R_{4i}$, $R_{4j}$, $R_{4k}$, $R_{4l}$, $R_{4m}$, and $R_{4n}$ each independently represent $SO_2R_{4o}$, a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$, an acetamide group, an OPh group, an NHPh group, a $CF_3$ group, a $C_2F_5$ group, or a $C_3F_7$ group, and at least one of these groups represents $SO_2R_{4o}$, m represents an integer selected from 0 to 8, $Z_{1a}$ represents a linear alkylene chain having 1 to 4 carbon atoms, the linear alkylene chain has at least one linear or branched alkyl group, or at least one alkyl group containing a residue having any one of a phenyl structure, a thienyl structure, and a cyclohexyl structure at a terminal thereof, $Z_{1b}$ represents a hydrogen atom or a linear or branched alkyl group, aryl group, or aralkyl group, which may be substituted by an aryl group, and if more than one unit of the chemical formula (4B) is present, each of $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, $Z_{1a}$, $Z_{1b}$, and m is independently selected for each unit, where:

$R_{4o}$ is OH, a halogen atom, ONa, OK, or $OR_{4o1}$;

$R_{4o1}$ is a linear or branched alkyl group having 1 to 8 carbon atoms, or a substituted or unsubstituted phenyl group;

$R_{4p}$ is H, Na, or K; and

Ph is a phenyl group.

3. The polyhydroxyalkanoate according to claim 1, wherein the linear alkylene chain structure represented by $Z_{1a}$ in the chemical formula (1) is selected from the group consisting of (A) to (D):

(A) when the linear alkylene chain has 1 carbon atom, in the linear alkylene chain structure represented by the chemical formula (6), one of $Z_{6c}$ and $Z_{6d}$ represents a linear or branched alkyl group, or an alkyl group containing a residue having any one of a phenyl structure, a thienyl structure, and a cyclohexyl structure at a terminal thereof:

(6)

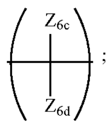

(B) when the linear alkylene chain has 2 carbon atoms, in the linear alkylene chain structure represented by the chemical formula (7), one of $Z_{7c}$, $Z_{7d}$, $Z_{7e}$, and $R_{7f}$ represents a linear or branched alkyl group, or an alkyl group containing a residue having any one of a phenyl structure, a thienyl structure, and a cyclohexyl structure at a terminal thereof:

(7)

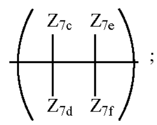

(C) when the linear alkylene chain has 3 carbon atoms, in the linear alkylene chain structure represented by the chemical formula (8), one of $Z_{8c}$, $Z_{8d}$, $Z_{8e}$, $Z_{8f}$, $Z_{8g}$, and $Z_{8h}$ represents a linear or branched alkyl group, or an alkyl group containing a residue having any one of a phenyl structure, a thienyl structure, and a cyclohexyl structure at a terminal thereof:

(8)

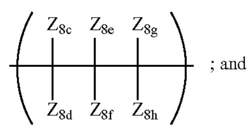

(D) when the linear alkylene chain has 4 carbon atoms, in the linear alkylene chain structure represented by the chemical formula (9), one of $Z_{9c}$, $Z_{9d}$, $Z_{9e}$, $Z_{9f}$, $Z_{9g}$, $Z_{9h}$, $Z_{9i}$, and $Z_{9j}$ represents a linear or branched alkyl group, or an alkyl group containing a residue having any one of a phenyl structure, a thienyl structure, and a cyclohexyl structure at a terminal thereof:

(9)

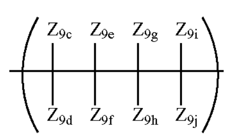

4. The polyhydroxyalkanoate according to claim 3, wherein when a substituent selected from $Z_{6c}$, $Z_{6d}$, $Z_{7c}$, $Z_{7d}$, $Z_{7e}$, $Z_{7f}$, $Z_{8c}$, $Z_{8d}$, $Z_{8e}$, $Z_{8f}$, $Z_{8g}$, $Z_{8h}$, $Z_{9c}$, $Z_{9d}$, $Z_{9e}$, $Z_{9f}$, $Z_{9g}$, $Z_{9h}$, $Z_{9i}$, $Z_{9j}$, in the chemical formulae (6), (7), (8) and (9), represents a linear or branched alkyl group, or an alkyl group containing a residue having any one of a phenyl structure, a thienyl structure, and a cyclohexyl structure at a terminal thereof, the substituent is selected from the group consisting of chemical formulae (14), (15), (16), and (17):

$$—(CH_2)_{k_{14}}—CH_3, \quad (14)$$

wherein $k_{14}$ represents an integer selected from 0 to 8, and if more than one unit of the chemical formula (14) is present, $k_{14}$ is independently selected for each unit;

(15)

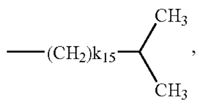

wherein $k_{15}$ represents an integer selected from 0 to 7, and if more than one unit of the chemical formula (15) is present, $k_{15}$ is independently selected for each unit;

(16)

$$—(CH_2)k_{16}—R_{16},$$

wherein $k_{16}$ represents an integer selected from 1 to 8, $R_{16}$ represents a substituent containing a residue having any one of a phenyl structure and a thienyl structure, and if more than one unit of the chemical formula (16) is present, $k_{16}$ is independently selected for each unit; and (17)

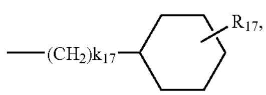

wherein $R_{17}$ represents a substituent to a cyclohexyl group selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group, $k_{17}$ represents an integer selected from 0 to 8, and if more than one unit of the chemical formula (17) is present, each of $k_{17}$ and $R_{17}$ is independently selected for each unit.

5. The polyhydroxyalkanoate according to claim 4, wherein $R_{16}$ in the chemical formula (16), which is a residue having any one of a phenyl structure and a thienyl structure, is selected from the group of consisting of residues represented by chemical formulae (18), (19), (20), (21), (22), (23), (24), (25), (26), (27), and (28):

the chemical formula (18) representing an unsubstituted or substituted phenyl group:

(18)

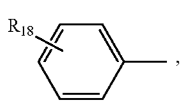

wherein $R_{18}$ represents a substituent to an aromatic ring selected from an H atom, a halogen atom, a CN group, an $NO_2$ group, a $CH_3$ group, a $C_2H_5$ group, a $C_3H_7$ group, a $CH{=}CH_2$ group, a $CF_3$ group, a $C_2F_5$ group, a $C_3F_7$ group, and $COOR_{18a}$ where $R_{18a}$ is H, Na, or K, and a if more than one unit of the chemical formula (18) is present, $R_{18}$ is independently selected for each unit;

the chemical formula (19) representing an unsubstituted or substituted phenoxy group:

(19)

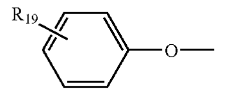

wherein $R_{19}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group, and if more than one unit of the chemical formula (19) is present, $R_{19}$ is independently selected for each unit;

the chemical formula (20) representing an unsubstituted or substituted benzoyl group:

(20)

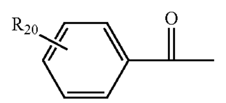

wherein $R_{20}$ represents a substituent to an aromatic ring selected from an H atom, a halogen atom, a CN group, an $NO_2$ group, a $CH_3$ group, a $C_2H_5$ group, a $C_3H_7$ group, a $SCH_3$ group, a $CF_3$ group, a $C_2F_5$ group, and a $C_3F_7$ group, and if more than one unit of the chemical formula (20) is present, $R_{20}$ is independently selected for each unit;

the chemical formula (21) representing an unsubstituted or substituted phenylsulfanyl group:

(21)

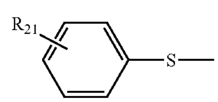

wherein $R_{21}$ represents a substituent to an aromatic ring selected from an H atom, a halogen atom, a CN group, an $NO_2$ group, a $CH_3$ group, a $C_2H_5$ group, a $C_3H_7$ group, a $(CH_3)_2$—CH group, a $(CH_3)_3$—C group, $COOR_{21a}$, and $SO_2R_{21b}$, where $R_{21a}$ is H, Na, K, $CH_3$, or $C_2H_5$, and $R_{21b}$ is OH, ONa, OK, a halogen atom, $OCH_3$, or $OC_2H_5$, and if more than one unit of the chemical formula (21) is present, $R_{21}$ is independently selected for each unit;

the chemical formula (22) representing an unsubstituted or substituted (phenylmethyl)sulfanyl group:

(22)

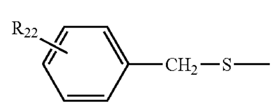

wherein $R_{22}$ represents a substituent to an aromatic ring selected from an H atom, a halogen atom, a CN group, an $NO_2$ group, a $CH_3$ group, a $C_2H_5$ group, a $C_3H_7$ group, a $(CH_3)_2$—CH group, a $(CH_3)_3$—C group, $COOR_{22a}$, and $SO_2R_{22b}$, where $R_{22a}$ is H, Na, K, $CH_3$, or $C_2H_5$, and $R_{22b}$ is OH, ONa, OK, a halogen atom, $OCH_3$, or $OC_2H_5$, and if more than one unit of the chemical formula (22) is present, $R_{22}$ is independently selected for each unit;

the chemical formula (23) representing a 2-thienyl group:

(23)

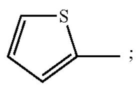

the chemical formula (24) representing a 2-thienylsulfanyl group:

(24)

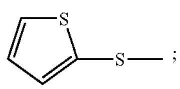

the chemical formula (25) representing a 2-thienylcarbonyl group:

(25)

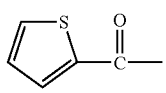

the chemical formula (26) representing an unsubstituted or substituted phenylsulfinyl group:

(26)

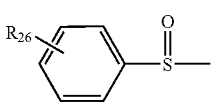

wherein $R_{26}$ represents a substituent to an aromatic ring selected from an H atom, a halogen atom, a CN group, an $NO_2$ group, a $CH_3$ group, a $C_2H_5$ group, a $C_3H_7$ group, a $(CH_3)_2$—CH group, a $(CH_3)_3$—C group, $COOR_{26a}$, and $SO_2R_{26b}$, where $R_{26a}$ is H, Na, K, $CH_3$, or $C_2H_5$, and $R_{26b}$ is OH, ONa, OK, a halogen atom, $OCH_3$, or $OC_2H_5$, and if more than one unit of the chemical formula (26) is present, $R_{26}$ is independently selected for each unit;

the chemical formula (27) representing an unsubstituted or substituted phenylsulfonyl group:

(27)

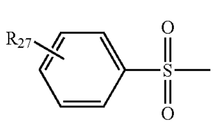

wherein $R_{27}$ represents a substituent to an aromatic ring selected from an H atom, a halogen atom, a CN group, an $NO_2$ group, a $CH_3$ group, a $C_2H_5$ group, a $C_3H_7$ group, a $(CH_3)_2$—CH group, a $(CH_3)_3$—C group, $COOR_{27a}$, and $SO_2R_{27b}$, where $R_{27a}$ is H, Na, K, $CH_3$, or $C_2H_5$, and $R_{27b}$ is OH, ONa, OK, a halogen atom, $OCH_3$, or $OC_2H_5$, and if more than one unit of the chemical formula (27) is present, $R_{27}$ is independently selected for each unit;

the chemical formula (28) representing a (phenylmethyl) oxy group:

(28)

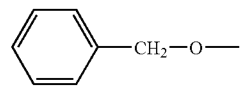

6. A method of producing a polyhydroxyalkanoate containing a unit represented by the chemical formula (1) according to claim 1, comprising the step of subjecting a polyhydroxyalkanoate containing a unit represented by the chemical formula (29) and at least one kind of amine compound represented by the chemical formula (30) to a condensation reaction, (29)

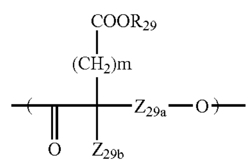

wherein $R_{29}$ represents hydrogen or a group for forming a salt, m represents an integer selected from 0 to 8, $Z_{29a}$ represents a linear alkylene chain having 1 to 4 carbon atoms, the linear alkylene chain has at least one linear or branched alkyl group, or at least one alkyl group containing a residue having any one of a phenyl structure, a thienyl structure, and a cyclohexyl structure at a terminal thereof, $Z_{29b}$ represents a hydrogen atom, or a linear or branched alkyl group, aryl group, or aralkyl group which may be substituted by an aryl group, and when multiple units exist, $R_{29}$, $Z_{29a}$, $Z_{29b}$, and m each independently have the above meaning for each unit, $$H_2N\text{-}A_3\text{-}SO_2R_{30} \quad (30)$$

wherein $R_{30}$ represents OH, a halogen atom, ONa, OK, or $OR_{30a}$, $R_{30a}$ and $A_3$ are each independently selected from groups each having a substituted or unsubstituted aliphatic hydrocarbon structure, a substituted or unsubstituted aromatic ring structure, or a substituted or unsubstituted heterocyclic structure, and when multiple units exist, $R_{30}$, $R_{30a}$, and $A_3$ each independently have the above meaning for each unit.

* * * * *